(12) United States Patent
Vera-Castañeda

(10) Patent No.: US 9,266,059 B2
(45) Date of Patent: Feb. 23, 2016

(54) REGENERATIVE RECOVERY OF CONTAMINANTS FROM EFFLUENT GASES

(71) Applicant: MECS, Inc., Chesterfield, MO (US)

(72) Inventor: Ernesto Vera-Castañeda, Chesterfield, MO (US)

(73) Assignee: MECS, INC., Chesterfield, MO (US)

( * ) Notice: Subject to any disclaimer, the term of this patent is extended or adjusted under 35 U.S.C. 154(b) by 0 days.

(21) Appl. No.: 14/216,077

(22) Filed: Mar. 17, 2014

(65) Prior Publication Data
US 2014/0322118 A1 Oct. 30, 2014

Related U.S. Application Data

(60) Provisional application No. 61/793,571, filed on Mar. 15, 2013.

(51) Int. Cl.
B01D 53/14 (2006.01)
B01D 53/34 (2006.01)
B01D 53/50 (2006.01)
B01D 53/75 (2006.01)
B01D 53/78 (2006.01)

(52) U.S. Cl.
CPC .......... B01D 53/507 (2013.01); B01D 53/1406 (2013.01); B01D 53/1456 (2013.01); B01D 53/1481 (2013.01); B01D 53/75 (2013.01); B01D 53/78 (2013.01); B01D 2252/205 (2013.01); B01D 2257/2045 (2013.01); B01D 2257/302 (2013.01); B01D 2257/304 (2013.01); B01D 2257/404 (2013.01); B01D 2257/406 (2013.01); B01D 2257/504 (2013.01)

(58) Field of Classification Search
CPC ................................ B01D 53/14; B01D 53/34
USPC ........... 423/210, 242.7, 242.1, 228, 220, 235, 423/238, 240 R, 243.11
See application file for complete search history.

(56) References Cited

U.S. PATENT DOCUMENTS 2,031,802 A 2/1936 Tyrer
2,295,587 A 11/1939 Fleming et al.
(Continued)

FOREIGN PATENT DOCUMENTS

CN 101481095 A 7/2009
EP 0500320 A1 8/1992
(Continued)

OTHER PUBLICATIONS

Bae, H.K., et al., "Simulation of CO2 Removal in a Split-Flow Gas Sweeting Process," 2011, Korean J. Chem. Eng., 28/1:643-648.
(Continued)

Primary Examiner — Timothy Vanoy
(74) Attorney, Agent, or Firm — Senniger Powers LLP

(57) ABSTRACT

A contaminant gas is removed from a feed gas in two absorption and stripping circuits operated in tandem. The gas is first passed through a rich gas absorber producing a rich absorption liquor from which contaminant gas is stripped in a rich liquor stripper. A lean gas exiting the rich gas absorber is passed through a lean gas absorber, producing a lean absorption liquor from which contaminant gas is stripper in a lean liquor stripper. Regenerated absorption media exiting the respective strippers are recirculated to the respective absorbers.

61 Claims, 26 Drawing Sheets

(56) References Cited

U.S. PATENT DOCUMENTS

| | | | |
|---|---|---|---|
| 2,368,595 A | 8/1941 | Johnson | |
| 2,399,013 A | 9/1944 | Fleming et al. | |
| 2,615,787 A | 10/1952 | Randlett | |
| 2,729,543 A | 1/1956 | Keller | |
| 2,878,099 A | 3/1959 | Breuing et al. | |
| 3,272,885 A * | 9/1966 | Davison | 62/625 |
| 3,687,624 A | 8/1972 | Terrana et al. | |
| 3,757,488 A | 9/1973 | Austin et al. | |
| 3,833,508 A | 9/1974 | Austin et al. | |
| 3,886,069 A | 5/1975 | Trondheim | |
| 3,911,093 A | 10/1975 | Sherif et al. | |
| 3,991,161 A | 11/1976 | Saitoh et al. | |
| 3,992,508 A | 11/1976 | Saitoh et al. | |
| 4,079,118 A | 3/1978 | Gorai | |
| 4,083,944 A | 4/1978 | Chalmers | |
| 4,087,372 A | 5/1978 | Saitoh et al. | |
| 4,133,650 A | 1/1979 | Germerdonk et al. | |
| 4,181,506 A | 1/1980 | Bengtsson | |
| 4,222,993 A | 9/1980 | Holter et al. | |
| 4,277,268 A | 7/1981 | Spangler | |
| 4,277,451 A | 7/1981 | Wakabayashi et al. | |
| 4,310,691 A | 1/1982 | Bengtsson et al. | |
| 4,366,134 A | 12/1982 | Korosy | |
| 4,444,571 A | 4/1984 | Matson | |
| 4,576,813 A | 3/1986 | McAlister | |
| 4,670,242 A | 6/1987 | McAlister | |
| 4,695,349 A | 9/1987 | Becker et al. | |
| 4,948,572 A | 8/1990 | Erga | |
| 4,968,501 A | 11/1990 | Mason | |
| 4,996,038 A | 2/1991 | McAlister | |
| 5,130,112 A | 7/1992 | McAlister | |
| 5,538,707 A | 7/1996 | McAlister | |
| 5,785,888 A | 7/1998 | Tsai et al. | |
| 6,096,239 A | 8/2000 | Fung et al. | |
| 6,174,348 B1 | 1/2001 | Ahmed et al. | |
| 7,214,358 B2 | 5/2007 | Ravary et al. | |
| 2008/0307968 A1 | 12/2008 | Kang et al. | |
| 2009/0101012 A1 | 4/2009 | Gal et al. | |
| 2009/0158930 A1 * | 6/2009 | Wagner et al. | 95/179 |
| 2009/0249954 A1 | 10/2009 | Gadkaree et al. | |
| 2011/0061533 A1 | 3/2011 | Black et al. | |
| 2012/0107209 A1 | 5/2012 | Vera-Castaneda | |
| 2013/0315807 A1 | 11/2013 | Vera-Castaneda | |
| 2014/0234176 A1 * | 8/2014 | Gal et al. | 422/170 |
| 2014/0329299 A1 * | 11/2014 | Guenther | 435/266 |

FOREIGN PATENT DOCUMENTS

| | | | |
|---|---|---|---|
| EP | 1078676 A2 | 2/2001 | |
| GB | 371888 A | 4/1932 | |
| GB | 400998 A | 11/1933 | |
| JP | 2010-207727 A * | 9/2010 | B01D 53/18 |
| WO | 2012058558 A2 | 5/2012 | |
| WO | 2013166301 A1 | 11/2013 | |

OTHER PUBLICATIONS

Becker, H., "Concepts of Flue Gas Desulfurization by the Linde-Solinox Process", 1987, Chem-Ing-Tech, 4, S, 346-347, with machine translation, 4 pages.

Heisel, M.P., et al., "Options Available in the Solinox Vent Gas Purification Process," 1991, Gas Sep & Pur, 5:111-113.

Lyddon, L., et al., "Analysis of Various Flow Schemes for Sweetening with Amines," 2006, Bryan Research and Engineering, Inc., Technical Papers, 16 pages.

Sporer, J., "The Linde Solinox Process: Gypsum-free Flue-Gas Desulphurization," 1992, Gas Sep & Pur, 6/3:133-140.

International Search Report, PCT/US2014/029103, dated Jul. 31, 2014, 4 pages.

Written Opinion, PCT/US2014/029103, dated Jul. 31, 2014, 8 pages.

\* cited by examiner

REGENERATIVE RECOVERY OF CONTAMINANTS FROM EFFLUENT GASES

REFERENCE TO RELATED APPLICATIONS

This application claims the benefit of U.S. Provisional Application Ser. No. 61/793,571, filed Mar. 15, 2013, the entire disclosure of which is incorporated herein by reference.

FIELD OF THE INVENTION

This invention relates to processes for the selective removal of contaminants from effluent gases. More particularly, various embodiments of the present invention relate to selective removal and recovery of sulfur dioxide from effluent gases in a regenerative sulfur dioxide absorption/desorption process that achieves favorable energy efficiency. The recovery schemes of the invention are applicable to the removal and recovery of other acid gases such as hydrogen sulfide, carbon dioxide, and hydrogen chloride, as well as other contaminant gases such as ammonia.

BACKGROUND OF THE INVENTION

Gaseous effluents containing contaminant gases are produced by a variety of operations. For example, sulfur dioxide is generated in various chemical and metallurgical operations, including sulfur-burning sulfuric acid processes, spent sulfuric acid plants, roasting or smelting of sulfidic metal ores, Claus plants, and concentrates and the combustion of sulfur-containing fuels (e.g., flue gases from coal-fired power plants). Carbon fuels play a significant role in the generation of electricity, providing energy for heating and fuels for transportation. Most carbon fuels contain sulfur that when burned turns into sulfur dioxide. The sulfur dioxide emitted contributes to a wide range of environmental and health problems. As the emerging economies expand, their demands for energy rapidly increase and as lower sulfur content carbon fuels are depleted, more and more oil and coal reserves having increasingly higher levels of sulfur will be utilized leading to increased sulfur dioxide emissions.

There are also increasing regulatory pressures to reduce sulfur dioxide emissions around the world. The most commonly used method to remove sulfur dioxide is through absorption or adsorption techniques. One common approach is to contact sulfur dioxide with an aqueous stream containing an inexpensive base. The sulfur dioxide dissolves in water forming sulfurous acid ($H_2SO_3$) that in turn reacts with the base to form a salt. Common bases are sodium hydroxide, sodium carbonate and lime (calcium hydroxide, $Ca(OH)_2$). The pH starts at about 9 and is lowered to about 6 after the reaction with sulfur dioxide. A one stage wet scrubbing system usually removes over 95% of the sulfur dioxide. Wet scrubbers and similar dry scrubbing approaches require a capital investment, variable costs due to lime consumption and solids disposal plus the energy consumption and utility consumption used to operate the sulfur dioxide removal system.

Instead of reacting with a base like lime, sulfur dioxide in effluent gases that otherwise may be emitted to the atmosphere may be recovered to be sold as a refined sulfur dioxide product, used as part of the feed gas to a contact sulfuric acid plant and recovered as sulfuric acid and/or oleum to meet the growing global demand of the fertilizer industry or fed to a Claus plant for the preparation of elemental sulfur. In addition to addressing the environmental and health problems associated with sulfur dioxide emissions, this approach recovers the sulfur values from coal and other sulfur-containing carbon fuels. However, these gas streams frequently have relatively low sulfur dioxide concentration and a high concentration of water vapor. Where sulfur dioxide concentration in the gas fed to a sulfuric acid plant is less than about 4 to 5 percent by volume, problems may arise with respect to both the water balance and the energy balance in the acid plant. More particularly, the material balance of a conventional sulfuric acid plant requires that the $H_2O/SO_2$ molar ratio in the sulfur dioxide-containing gas stream fed to the plant be no higher than the $H_2O/SO_2$ molar ratio in the product acid. If the desired product acid concentration is 98.5 percent or above, this ratio cannot be more than about 1.08 in the sulfur dioxide-containing gas stream fed to the plant. As generated, effluent gases from metallurgical processes and flue gases from the combustion of sulfurous fuels often have a water vapor content well above the 1.1 ratio which cannot be sufficiently reduced by cooling the gas without significant capital and energy expenditures. Moreover, if the sulfur dioxide gas strength of the source gas is below about 4 to 5 percent by volume, it may not be sufficient for autothermal operation of the catalytic converter. That is, the heat of conversion of sulfur dioxide to sulfur trioxide may not be great enough to heat the incoming gases to catalyst operating temperature and, as a consequence, heat from some external source must be supplied. This in turn also increases both operating costs and capital requirements for the sulfuric acid facility.

One way of enhancing the sulfur dioxide strength of gaseous effluents is by selectively absorbing the sulfur dioxide in a suitable solvent and subsequently stripping the absorbed sulfur dioxide to produce regenerated solvent and a gas enriched in sulfur dioxide content. A variety of aqueous and organic solvents have been used in regenerative sulfur dioxide absorption/desorption processes. For example, aqueous solutions of alkali metals (e.g., sodium sulfite/bisulfite solution), amines (e.g., alkanolamines, tetrahydroxyethylalkylenediamines, etc.), amine salts and salts of various organic acids have been used as regenerable sulfur dioxide absorbents.

Inorganic aqueous buffer solutions are also effective in absorbing sulfur dioxide. Fung et al. (2000) provides data on the solubility of sulfur dioxide for a solution 1 Molar of phosphoric acid and sodium carbonate in a ratio of about 1.57 $Na/PO_4$ as a function of temperature. Data are for the virgin mixture and the mixture where 1,000 ppm of adipic acid is added to enhance sulfur dioxide solubility. Fung et al. also indicate that when taken to a boiling temperature, 95% and 65% of the sulfur dioxide is removed from the solution. Calculations on the pH of the solution show that the pH changes from 6 to about 3 once that the sulfur dioxide is absorbed. As with organic solvents there is a slight reaction of sulfur dioxide with oxygen forming sulfur trioxide. This reaction is very limited and when $Na_2CO_3$ is used it is further inhibited by its reaction with the free radicals formed during oxidation. The sulfur trioxide that is formed leads to the formation of sodium sulfate, which if its removed by crystallization is removed as the sodium sulfate decahydrate ($Na_2SO_4.10H_2O$) also known as Glauber's salt. This salt can be removed by taking a slipstream and cooling it to force the precipitation of the Glauber's salt that is easily crystallized and removed by a screen, filtration, centrifugation or other solid liquid separation technique.

U.S. Pat. No. 4,133,650 (Gamerdonk et al.) discloses a regenerative process for recovering sulfur dioxide from exhaust gases using a regenerable, aqueous dicarboxylic acid (e.g., phthalic acid, maleic acid, malonic acid and glutaric acid and mixtures thereof) scrubbing solution buffered to a pH of from about 2.8 to 9. The recovered sulfur dioxide can be used in the production of sulfuric acid.

Similarly, U.S. Pat. No. 2,031,802 (Tyrer) suggests using salts of substantially non-volatile acids having a disassociation constant lying between $1\times10^{-2}$ and $1\times10^{-5}$ measured at a dilution of 40 liters per gram molecule and a temperature of 25° C. (e.g., lactic acid, glycolic acid, citric acid and orthophosphoric acid) in a regenerative process for the recovery of sulfur dioxide from effluent gases.

U.S. Pat. No. 4,366,134 (Korosy) discloses a regenerative flue gas desulfurization process that utilizes an aqueous solution of potassium citrate buffered to a pH of from about 3 to about 9.

Organic solvents used in sulfur dioxide absorption/desorption processes include dimethyl aniline, tetraethylene glycol dimethyl ether and dibutyl butyl phosphonate. Like most solvents, the capacity of organic solvents is enhanced by higher pressures and lower temperatures. The sulfur dioxide gas is then recovered (and the solvent regenerated) by lowering the pressure and/or increasing the temperature. These organic solvents require the use of metallic construction and often require solvent regeneration due to the formation of sulfuric acid and in some cases due to the reaction of the solvent with sulfur trioxide formed by the side-reaction of sulfur dioxide with oxygen during the absorption/desorption process and usually are more expensive than the inorganic absorption media. The significantly large flue gas flow rates emitted from a coal-fired power generation plant, lead to very large equipment size to recover the sulfur dioxide. Organic solvents that require metallic construction generally do not compete well economically with the wet scrubbers that commonly use fiber reinforced plastic (FRP) construction, coated vessels or low cost alloys.

Conventional organic solvents are also hampered by one or more shortcomings with regard to the characteristics desirable in an absorbent used in a sulfur dioxide absorption/desorption cycle. Many of the solvents currently employed have relatively low sulfur dioxide absorption capacity, especially at the sulfur dioxide partial pressures typically encountered in weak sulfur dioxide-containing effluents (e.g., from about 0.1 to about 5 kPa). Conventional organic solvents often absorb substantial quantities of water vapor from the sulfur dioxide-containing effluent resulting in a significant reduction in the sulfur dioxide absorption capacity of the solvent. As a result, the molar flow rates of conventional solvents needed to satisfy the desired sulfur dioxide absorption efficiency is increased. Furthermore, the absorption of large quantities of water vapor in the solvent may lead to excessive corrosion of process equipment used in the sulfur dioxide absorption/desorption process. Moreover, some conventional organic solvents are susceptible to excessive degradation, such as hydrolysis, or other side reactions or decomposition when the solvent is exposed to high temperatures in acidic environments and/or suffer from high volatility, leading to large solvent losses.

Copending and co-assigned U.S. Ser. No. 13/283,671, filed Oct. 28, 2011 describes a sulfur dioxide recovery process that utilizes a buffered aqueous absorption solution comprising certain weak inorganic or organic acids or salts thereof, preferably certain polyprotic carboxylic acids or salts thereof, to selectively absorb sulfur dioxide from the effluent gas. The absorbed sulfur dioxide is subsequently stripped to regenerate the absorption solution and produce a gas enriched in sulfur dioxide content. The sulfur dioxide-enriched gas may be used as part of the feed gas to a contact sulfuric acid plant or to a Claus plant for the preparation of elemental sulfur or can be used for the production of refined sulfur dioxide. The process of U.S. Ser. No. 13/283,671 is particularly useful in producing a sulfur dioxide-enriched gas from effluent gases relatively weak in sulfur dioxide content. The application also describes processes for simultaneous removal of sulfur dioxide and nitrogen oxides ($NO_x$) from effluent gases and recovery of sulfur dioxide. The process utilizes a buffered aqueous absorption solution further including a metal chelate to absorb sulfur dioxide and NO from the gas and subsequently reducing the absorbed NO to form nitrogen.

Although the process of U.S. Ser. No. 13/283,671 operates at high energy efficiency, a need has remained for further economies in the use of energy in regenerative sulfur dioxide recovery processes.

SUMMARY OF THE INVENTION

The present invention is directed to novel processes comprising features that enhance energy efficiency in regenerative absorption/desorption cycles for the recovery of sulfur dioxide and other contaminants from gaseous effluents. In certain embodiments of the process, energy is recovered from a wet contaminant gas stream produced in the desorption cycle. In these and other embodiments, the absorption zone may optionally and advantageously be cooled to enhance the capacity of an aqueous absorption medium for absorption of a contaminant gas, thereby lowering the volume of aqueous absorption medium and contaminant-enriched absorption liquor that must be pumped, handled, heated and cooled in the absorption/desorption cycle.

A prominent application of the processes of the invention is in the recovery of sulfur dioxide from various chemical and metallurgical effluent gases, as mentioned above. However, the improvements described herein are also applicable to the recovery of other acid gases such as, e.g., $H_2S$, $CO_2$, $NO_x$, or HCl, and also to the recovery of other contaminant gases such as ammonia.

Briefly, therefore, the present invention is directed to a process for removing a contaminant from a contaminant-containing source gas and recovering the contaminant in which a feed gas stream comprising the source gas is contacted in a contaminant absorber with an aqueous absorption medium comprising a sorbent for contaminant, thereby absorbing contaminant from the feed gas stream into the absorption medium and producing an exhaust gas from which contaminant has been removed and a contaminant-enriched absorption liquor. The contaminant-enriched absorption liquor is contacted with stripping steam in an absorption liquor stripper to desorb contaminant from the contaminant-enriched absorption liquor and thereby produce a regenerated contaminant absorption medium and a primary stripper gas effluent comprising water vapor and contaminant. Regenerated absorption medium is withdrawn from a liquid outlet of the absorption liquor stripper and primary stripper gas effluent is withdrawn from a vapor outlet of the absorption liquor stripper. Water is condensed from the primary stripper gas effluent by indirect transfer of heat from the primary stripper gas effluent to a cooling medium in a primary stripper gas cooler/condenser to thereby produce a contaminant-bearing condensate. The contaminant-bearing condensate exiting the primary stripper gas cooler/condenser is contacted with steam in a condensate stripper to produce a stripped condensate and a condensate stripper gas effluent containing water vapor and contaminant. The cooling medium to which heat is transferred from the primary stripper gas effluent in the primary stripper gas cooler/condenser comprises at least a portion of the stripped condensate, thereby generating steam from the stripped condensate. The steam generated from the stripped condensate in the primary stripper gas cooler/condenser is introduced into the absorption liquor stripper as stripping steam for contact with contaminant-enriched absorption liquor to desorb contaminant therefrom.

In certain embodiments of the present invention, the primary stripper gas effluent withdrawn from the absorption liquor stripper is compressed and water is condensed from the primary stripper gas effluent by indirect transfer of heat from the compressed primary stripper gas effluent to the cooling medium comprising at least a portion of the stripped condensate in the primary stripper gas cooler/condenser, thereby generating steam from the stripped condensate at a pressure in excess of the pressure within the absorption liquor stripper at the liquid outlet thereof. The steam generated from the stripped condensate in the primary stripper gas cooler/condenser is then introduced into the absorption liquor stripper as stripping steam for contact with contaminant-enriched absorption liquor to desorb contaminant therefrom.

In accordance with other embodiments of the present invention, the steam generated from the stripped condensate in the primary stripper gas cooler/condenser is compressed at a pressure in excess of the pressure within the absorption liquor stripper at the liquid outlet thereof. The compressed steam is then introduced into the absorption liquor stripper as stripping steam for contact with contaminant-enriched absorption liquor to desorb contaminant therefrom.

In these and other embodiments, the absorption zone may be cooled to enhance the capacity of an aqueous absorption medium for absorption of a contaminant gas. In such embodiments, a portion of the contaminant gas-enriched absorption liquor is circulated between the absorber and a heat exchanger where heat of absorption is removed by transfer to a cooling fluid.

Disclosed herein is a process for removing a contaminant gas from a source gas and recovering the contaminant gas. In the process, a feed gas comprising the source gas is contacted in a rich gas absorber with a rich gas aqueous absorption medium comprising a sorbent for a contaminant gas, thereby absorbing contaminant gas from the feed gas stream into the absorption medium and producing a lean gas from which contaminant gas has been removed and a rich absorption liquor containing sorbed contaminant. The lean gas exiting the rich gas stripper is contacted in a lean gas absorber with a lean gas aqueous absorption medium comprising a sorbent for the contaminant gas, thereby absorbing residual contaminant gas from the lean gas into the lean gas absorption medium and producing an exhaust gas from which additional contaminant gas has been removed and a lean absorption liquor containing sorbed contaminant. The rich absorption liquor is heated in a rich liquor stripper to desorb the contaminant from the rich liquor and thereby produce a regenerated rich gas absorption medium and a rich liquor stripper gas effluent from the rich liquor stripper, the rich liquor stripper gas comprising water vapor and contaminant gas. The lean absorption liquor is heated in a lean liquor stripper to desorb contaminant gas from the lean liquor and thereby produce a regenerated lean gas absorption medium and a lean liquor stripper gas effluent from the lean liquor stripper, said lean stripper gas comprising water vapor and the contaminant gas. The regenerated rich gas absorption medium is recirculated to the rich gas absorber for removal of contaminant gas from further flow of the feed gas and the regenerated lean gas absorption medium is recirculated to the lean gas absorber for removal of contaminant gas from further flow of lean gas.

Further described herein is a process for removing sulfur dioxide from a sulfur dioxide-containing source gas and recovering the sulfur dioxide in which a feed stream comprising the source gas is contacted in a rich gas absorber with a rich gas absorption medium comprising a sorbent for sulfur dioxide, thereby absorbing sulfur dioxide from the feed gas stream into the absorption medium and producing a lean gas from which sulfur dioxide has been removed and a rich absorption liquor contain sorbed sulfur dioxide. The lean gas exiting the rich gas absorber is contacted with a lean gas absorption medium comprising a sorbent for sulfur dioxide, thereby absorbing residual sulfur dioxide from the lean gas into the lean gas absorption medium and producing an exhaust gas from which additional sulfur dioxide has been removed and a lean absorption liquor containing sorbed sulfur dioxide. The rich absorption liquor is contacted with stripping steam in a rich liquor stripper to desorb sulfur dioxide from the rich liquor and thereby produce a regenerated rich gas absorption medium and a rich stripper gas from the rich liquor, the rich stripper gas comprising water vapor and sulfur dioxide. The lean absorption liquor is contacted with stripping steam in a lean liquor stripper to desorb sulfur dioxide from the lean liquor and thereby produce a regenerated lean gas absorption medium and a lean stripper gas effluent from the lean liquor stripper, the lean stripper gas comprising water vapor and sulfur dioxide. The regenerated rich gas absorption medium is recirculated to the rich gas absorber for removal of sulfur dioxide from further flow of the feed gas and the regenerated lean gas absorption medium is recirculated to the lean absorber for removal of sulfur dioxide from further flow of said lean gas.

Still further disclosed is a process for removing a contaminant gas from a contaminant-containing source gas and recovering the contaminant gas. In the process a feed gas stream comprising a source gas is contacted in a contaminant gas absorber with an aqueous absorption medium comprising a sorbent for the contaminant gas, thereby absorbing contaminant gas from the feed gas stream into the absorption medium and producing an exhaust gas from which contaminant gas has been removed and a contaminant-enriched absorption liquor. The contaminant-enriched absorption liquor is contacted with stripping steam in an absorption liquor stripper to desorb the contaminant from the contaminant-enriched absorption liquor and thereby produce a regenerated contaminant absorption medium and a primary stripper gas effluent comprising water vapor and contaminant gas. The regenerated absorption medium is withdrawn from a liquid outlet of the absorption liquor stripper and primary stripper gas effluent from a vapor outlet of the absorption liquor stripper. The pH of the absorption medium is adjusted in the absorber to a value differing from the pH which affords the most favorable equilibrium for absorption but at which steam consumption in the stripper for reducing the contaminant gas content of the regenerated absorption medium to a target level is lower than the steam consumption for reducing the contaminant gas content of the regenerated absorption medium to such level in a comparative operation conducted under conditions essentially identical to the conditions under which the process is conducted except that in the comparative operation the pH of the absorption medium is maintained at a value which affords the most favorable equilibrium for absorption.

Other objects and features will be in part apparent and in part pointed out hereinafter.

BRIEF DESCRIPTION OF THE DRAWINGS

Corresponding reference numerals indicate corresponding components throughout the drawings.

DESCRIPTION OF THE PREFERRED EMBODIMENTS

Figure 1:
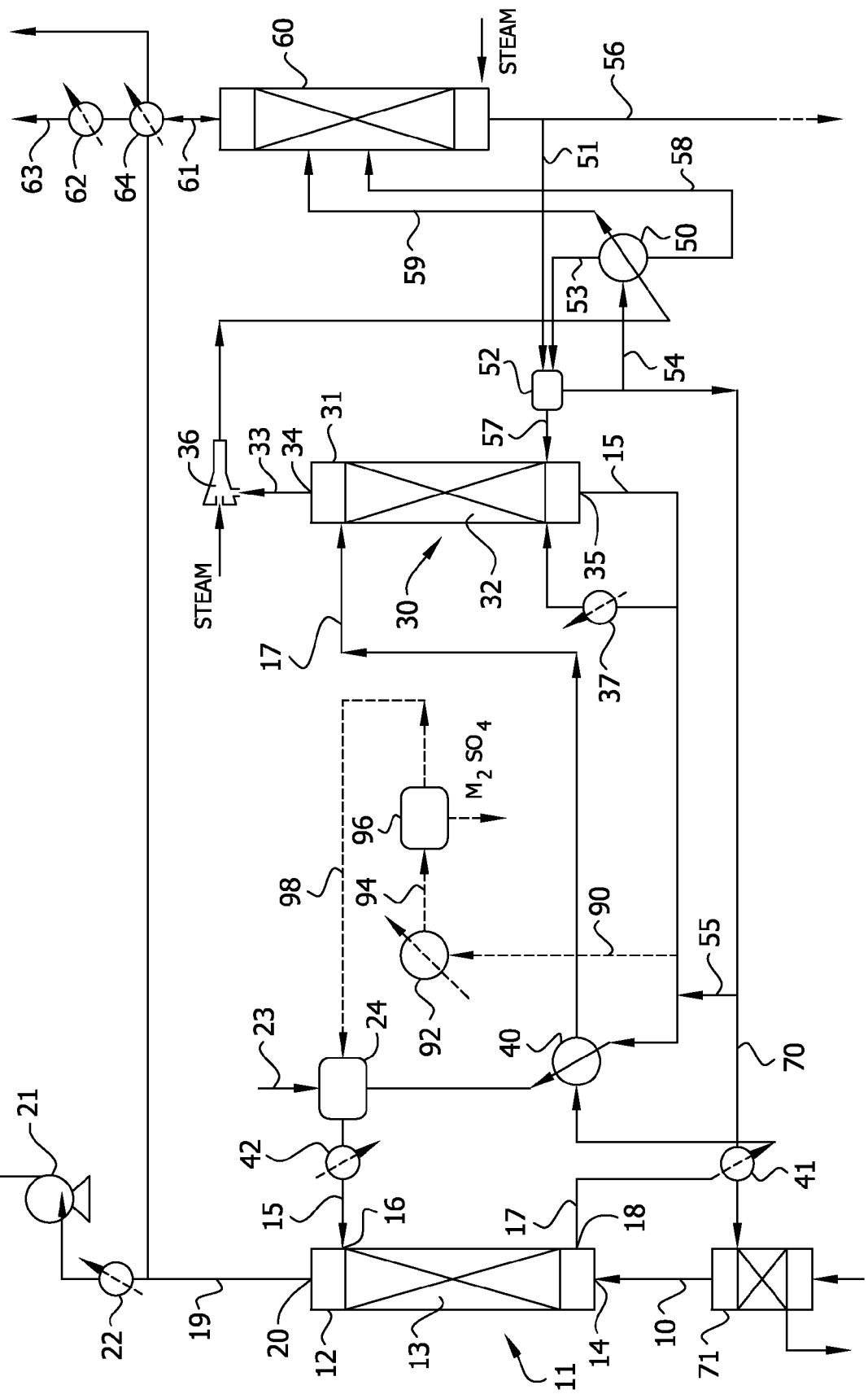
FIGS. 1 and 2 are alternative schematic flow sheets of absorption/desorption processes for selectively removing and recovering sulfur dioxide from a sulfur dioxide-containing source gas in which desorption of sulfur dioxide from the absorption liquor is achieved by contact with live steam in a stripping column, and the live steam is generated by indirect transfer of heat from the stripper overhead gas to a cooling medium comprising a boiling water stream in a stripper gas cooler/condenser.

In accordance with the invention, several novel process schemes have been developed for recovery of a contaminant gas from a source gas at relatively high energy efficiency. The processes of the invention are particularly applicable to the recovery of acid gases such as sulfur dioxide, oxides of nitrogen, hydrogen sulfide, carbon dioxide, and the like, but are also useful and valuable in the recovery of other contaminant gases such as, e.g., ammonia. The generic term "contaminant" is used herein because typically the processes of the invention are used in cleaning up effluent gas streams from chemical, metallurgical or power generation facilities in order to minimize emissions of acid gases or other gas components that would otherwise be contaminants in the atmosphere. However, as recognized by those skilled in the art, the contaminant gases that are removed from the gas effluent streams are often of economic value and are recovered by the processes of the invention and then applied to commercially valuable uses such as, e.g., conversion of sulfur dioxide to sulfur trioxide and sulfuric acid, recovery of elemental sulfur from sulfur dioxide and hydrogen sulfide, recovery of hydrochloric acid or aqueous ammonia for use in chemical processing, recovery and conversion of hydrogen chloride to elemental chlorine and hydrogen, etc.

The processes of the invention may be illustrated by the particular case of sulfur dioxide recovery. In the practice of the present invention, a variety of aqueous and organic solvents can be used as the sulfur dioxide absorption medium. For example, the absorption medium may comprise aqueous solutions of alkali metals (e.g., sodium sulfite/bisulfite solution), amines (e.g., alkanolamines, tetrahydroxyethylalkylenediamines, etc.), amine salts or salts of various organic acids. Alternatively, the sulfur dioxide absorption medium may comprise an organic solvent, including, for example, dimethyl aniline, tetraethylene glycol dimethyl ether or dibutyl butyl phosphonate. Some organic solvents require the use of metallic construction and often require solvent regeneration due to the formation of sulfuric acid and in some cases due to the reaction of the solvent with sulfur trioxide formed by the side-reaction of sulfur dioxide with oxygen during the absorption/desorption process and usually are more expensive than the inorganic absorption media. The significantly large flue gas flow rates emitted from a coal-fired power generation plant, lead to very large equipment size to recover the sulfur dioxide. Conventional organic solvents may also be hampered by one or more shortcomings with regard to the characteristics desirable in sulfur dioxide absorption media, including: relatively low sulfur dioxide absorption capacity, especially at the sulfur dioxide partial pressures encountered in weak sulfur dioxide-containing effluents; reduced sulfur dioxide absorption capacity as a result of absorbing substantial quantities of water vapor from the sulfur dioxide-containing effluent, which may also lead to excessive corrosion of process equipment; susceptibility to excessive degradation, such as hydrolysis, or other side reactions or decomposition when the solvent is exposed to high temperatures in acidic environments; and/or high volatility, leading to large solvent losses.

In light of these and other considerations, in accordance with a preferred embodiment of the present invention as implemented in recovery of sulfur dioxide, the sulfur dioxide absorption medium comprises a buffered aqueous solution of a salt of a relatively weak polyprotic carboxylic acid (e.g., sodium malate) as described in U.S. Ser. No. 13/283,671, entitled REGENERATIVE RECOVERY OF SULFUR DIOXIDE FROM EFFLUENT GASES and filed Oct. 28, 2011, the entire content of which is expressly incorporated herein by reference. In the following description, reference is made to the preferred absorption medium comprising a salt of a polyprotic carboxylic acid as well as to an absorption medium comprising tetraethylene glycol dimethyl ether (tetraglyme). However, it should be understood that the various features of the processes described herein are readily adapted to systems in which other absorption media are employed. As noted above, it should also be understood that the improvements described herein are likewise applicable to systems for the removal and recovery of other acid gases and contaminants using appropriate conventional contaminant absorption media known in the art. For example, the processes described herein can be used in the regenerative absorption and desorption of various contaminants from effluent gas streams, including hydrogen sulfide, carbon dioxide, and hydrogen chloride, nitrogen oxides, as well as other contaminant gases such as ammonia.

As shown in FIG. 1, the optionally conditioned process feed gas stream 10 comprising the sulfur dioxide-containing source gas is introduced into a sulfur dioxide absorber 11 having one or more theoretical stages where it is contacted with an aqueous absorption medium comprising a sorbent for sulfur dioxide to absorb the sulfur dioxide. Sulfur dioxide absorber 11 comprises a vertical column or tower 12 containing a gas/liquid contact zone 13 comprising means for promoting mass transfer between the gas and liquid phases that may comprise a bed of random packings such as saddles or rings, structured packing, or other contacting device. Preferably, in order to maximize transfer of sulfur dioxide, the process feed gas stream is contacted countercurrently with the aqueous absorption solution. As shown in FIG. 1, process feed gas stream 10 is introduced through a gas inlet 14 near the bottom of tower 12 and enters the bottom of gas/liquid contact zone 13, while a stream 15 comprising regenerated aqueous absorption medium recirculated from sulfur dioxide stripper 30 is introduced through a liquid inlet 16 near the top of the tower and is distributed over and enters the top of the gas/liquid contact zone. A sulfur dioxide-enriched absorption liquor stream 17 exiting the bottom of gas/liquid contact zone 13 is withdrawn from a liquid outlet 18 near the bottom of tower 12 and an exhaust gas stream 19 substantially free of sulfur dioxide exiting the top of zone 13 is withdrawn from a gas outlet 20 near the top of the tower. Although a conventional, randomly packed tower may be employed as absorber 11, those skilled in the art will appreciate that other configurations may be suitably employed. For example, tower 12 may contain structured packing or comprise a tray tower, in either of which the process streams preferably flow countercurrently. Although countercurrent flow between the process feed gas stream 10 and the aqueous absorption medium in the absorber is preferred, the absorber may be operated co-currently. However, such an arrangement tends to negatively impact absorption capacity and efficiency and is generally less preferred.

Where an acid salt absorbent or other species that combines chemically with sulfur dioxide is present as the principal sorbent in the aqueous absorption medium, concentration of sorbent in the absorption medium and the rate of absorption medium flow should be such that, at the temperature prevailing at the liquid exit of the absorber, excess absorptive capacity remains in the absorption liquor. Preferably, the remaining capacity is at least 10%, preferably at least 20% of the total absorptive capacity entering the absorber. For this purpose, the sorbent concentration and absorption medium flow rate entering the absorber should be sufficient to provide stoichiometric excess in the rate of sorbent flowing through the absorber relative to the rate at which sulfur dioxide is to be recovered from the process feed gas stream, preferably in excess relative to the total sulfur dioxide content of the feed stream, thus to compensate for several factors such as the sulfur dioxide content remaining in the absorption medium after the regeneration thereof, the concentration of sulfur dioxide in the sulfur dioxide-enriched stripper gas, the possible presence of slightly acidic components such as carbon dioxide and mainly to compensate for desirably relatively weak absorptive affinity of preferred sorbents such as an aqueous polyprotic carboxylic acid/salt absorption system. A relatively weak absorptive affinity is preferred in order to facilitate the subsequent desorption of sulfur dioxide via a mild temperature increase and/or reduction of pressure. Accordingly, the concentration of sorbent in the aqueous absorption medium necessary to attain the desired removal efficiency varies with the acid employed, the concentration of sulfur dioxide in the gas to be treated as well as the mass transfer characteristics of the absorber and can be readily determined by one skilled in the art. Typically, the stoichiometric equivalents ratio of sulfur dioxide absorbed per mole of polyprotic carboxylic acid salt in the absorption solution ranges from about 0.1 to about 1. In the case of an aqueous absorption medium comprising the sodium salt of malic acid as the absorption solvent used in treating a gas comprising about 2600 ppmv sulfur dioxide, the concentration of malate in the absorption solution can suitably range from about 1 mole % to about 7 mole percent.

The mass flow rate ratio (L/G) of aqueous absorption solution stream 15 and process feed gas stream 10 introduced into sulfur dioxide absorber 11 necessary to achieve substantial transfer of sulfur dioxide from the source gas to the absorption medium may be determined by conventional design practice. More particularly, the L/G can be selected based on the contaminant content of the gas stream entering the absorber, the concentration of sorbent in the aqueous absorption medium, and the unit absorptive capacity of the sorbent at liquid/gas temperature prevailing in the absorber. Typically, the L/G is selected such that the flow of sorbent into the absorber is in at least 10 to 20% excess over the flow of contaminant gas into the absorber. The optimal extent of excess depends on the rate of mass transfer and heat transfer in the gas/liquid contact zone.

Preferably, the sulfur dioxide absorber is designed and operated such that the sulfur dioxide content of exhaust gas stream 19 exiting the absorber is less than about 500 ppmv, more preferably less than about 200 ppmv (e.g., as low as 10-20 ppmv). This trace amount of sulfur dioxide along with carbon dioxide, oxygen, nitrogen and other inerts contained in the process feed gas stream are eliminated from the system as part of the exhaust gas stream vented from the top of the absorber. The exhaust gas is in substantial equilibrium with the absorption solution and depending on the water vapor content of the process feed gas stream fed to the absorber and the absorber conditions, there may be a net gain or loss of water in the absorber. If necessary, a blower 21 is used to drive the gases to the stack. In order to achieve satisfactory emission standards, exhaust gas stream 19 may be passed through a mist eliminator or similar device for recovery of entrained liquid before being discharged through the stack. In addition or alternatively, in some cases exhaust gas stream 19 may be heated by indirect heat exchange in a heat exchanger 22 with the incoming flow of process feed gas or using other heating media or in heat exchanger 64 as described below so that any plume will not have the tendency to descend after being emitted through the stack.

As shown in FIG. 1, where the sorbent comprises a polyprotic carboxylic acid, a make-up source of metal base 23 such as sodium hydroxide, potassium hydroxide, sodium carbonate, etc., is combined with stream 15 comprising regenerated aqueous absorption medium in a solvent tank 24 before being introduced near the top of absorber tower 12. The metal base reacts with the polyprotic carboxylic acid and forms the metal salt absorbent. In accordance with the disclosure in copending U.S. Ser. No. 13/283,671, sufficient metal base is introduced to neutralize at least some of the acid groups such that the acid is neutralized to within about 20%, more preferably to within about 10%, of the equivalence point of the acid dissociation having a pKa value of from about 3 to about 10 at 25° C., preferably from about 4 to about 7 at 25° C. One skilled in the art can use known pH control techniques and instrumentation to add base to the regenerated absorption medium prior to contact with the sulfur dioxide-containing gas in the absorber to maintain the desired degree of neutralization with respect to the equivalence point of the pKa value. Furthermore, sufficient base should be added to maintain the metal ion concentration. For example, as described below, some of the metal ion is lost with the sulfate salt removed in a crystallizer operation. Two moles of the base (e.g., sodium hydroxide), are added per mole of sodium sulfate removed. The metal ion concentration can be suitably monitored and controlled by taking samples and running metal analysis in the plant laboratory.

The sulfur dioxide-enriched absorption liquor 17 exiting absorber 11 is heated to an intermediate temperature (as described below) and the preheated absorption liquor is introduced into sulfur dioxide stripper 30 wherein sulfur dioxide is dissociated from the sorbent and desorbed from the absorption liquor. Stripper 30 comprises a vertical column or tower 31 containing a vapor/liquid contact zone 32 comprising means for promoting mass transfer between the gas and liquid phases. Like absorber 11, stripper 30 can be configured in the form of a packed tower containing a bed of conventional random packing, structured packing, trays or any other gas-liquid contacting device. The lower (stripping) section of vapor/liquid contact zone 32 within tower 31 may be fed with live steam generated in accordance with the present invention (as described below) and used to remove the sulfur dioxide from the absorption liquor. A primary sulfur dioxide-enriched stripper gas effluent 33, comprising sulfur dioxide substantially saturated with water vapor, is produced in the overhead of stripper 30 above vapor/liquid contact zone 32 and withdrawn from vapor outlet 34 at the top of tower 31; and regenerated absorption medium 15 exiting the vapor/liquid contact zone is withdrawn from a liquid outlet 35 at the bottom of the tower and recirculated back to absorber 11 completing the cycle. Although countercurrent flow between the sulfur dioxide-enriched absorption liquor and stripping steam in the stripper as shown in FIG. 1 is preferred, the stripper may be operated co-currently. However, such an arrangement tends to negatively impact stripping efficiency and is generally less preferred.

The average temperature of the sulfur dioxide absorption medium in absorber 11 is generally maintained in the range of from about 10° C. to about 70° C. In accordance with the present invention, the average temperature of the sulfur dioxide absorption liquor in the absorber is preferably maintained from about 20° C. to about 60° C. Although in general the absorption of sulfur dioxide is enhanced at lower absorption medium temperatures, the absorption liquor needs to be heated from the absorption temperature to a temperature sufficiently high and/or under reduced pressure to release the sulfur dioxide and providing this sensible heat leads to higher energy demands. During regeneration, it is also desirable to reduce the amount of water vaporized to lower the energy consumed and avoid low water concentrations in the absorption medium that may cause the precipitation of the sulfur dioxide sorbent (e.g., weak polycarboxylic acid or salts). The overall efficiency of the sulfur dioxide absorption/desorption process is improved when the absorption is relatively strongly dependent on temperature and within a narrower range of temperatures between the absorption and desorption stages of the cycle.

The average temperature of the sulfur dioxide absorption liquor in stripper 30 is generally maintained in the range of from about of 60° C. up to the boiling point of the absorption solution at the stripper operating pressure.

The absorption and desorption of sulfur dioxide may be enhanced by increasing or decreasing the operating pressures of absorber 11 and stripper 30, respectively. Suitable operating pressures in absorber 11 are from about 70 to about 200 kPa absolute. Higher pressures can be used where necessary, up to 700 kPa or higher. Increased pressure in the absorber increases the fraction of sulfur dioxide which the absorption medium can absorb, but the absorption is preferably carried out at relatively low pressure thereby reducing equipment costs. Similarly, suitable operating pressures in stripper 30 are from about 40 to about 200 kPa absolute, but higher or lower operating pressures may be employed.

Temperature control within absorber 11 and stripper 30 may be achieved by controlling the temperature and volume of various process streams fed to these operations. Preferably, the temperature in stripper 30 is maintained within the desired range by controlling the temperature of the sulfur dioxide-enriched absorption liquor 17 and steam introduced near the bottom of the stripper in the stripping section of vapor/liquid contact zone 32. Again referring to FIG. 1, the sulfur dioxide-enriched absorption liquor 17 exiting absorber 11 at a temperature of from about 10° C. to about 70° C., more preferably from about 20° C. to about 60° C. is passed through a heat interchanger 40 where it is preheated to an intermediate temperature by indirect transfer of heat from regenerated absorption medium 15 being recirculated from stripper 30 to the sulfur dioxide absorber. Transfer of heat from the regenerated absorption medium to the absorption liquor within the interchanger increases the absorptive capacity of the regenerated absorption medium and heats the absorption liquor to help promote stripping of sulfur dioxide therefrom. If further heating is required in order to achieve the desired temperature in the stripper, sulfur dioxide-enriched liquor 17 may be passed through a solvent heater 41, where it is preheated (e.g., by indirect transfer of heat from a recovered sulfur dioxide product stream exiting the process), and/or further heated by indirect heat exchange with steam or with hot condensate stream 70. In certain advantageous embodiments, the sulfur dioxide-enriched absorption liquor is heated by transferring heat from process feed gas stream and/or regenerated sulfur dioxide absorption medium without the addition of extraneous heat. In such an embodiment, the temperature of the process feed gas stream is preferably not reduced to below about 50° C. and the difference in temperature between the sulfur dioxide-enriched absorption liquor introduced to the stripper and the regenerated absorption medium is less than about 40° C.

Regenerated aqueous absorption medium 15 exiting the bottom of stripper 30 at a temperature from about 60° C. to about 140° C. is cooled in interchanger 40 by transfer of heat to sulfur dioxide-enriched absorption liquor 17 exiting sulfur dioxide absorber 11. Similarly, if further cooling is required in order to maintain the desired temperature in the absorber, regenerated absorption medium leaving interchanger 40 may be passed through solvent cooler 42 and further cooled by indirect heat exchange with cooling tower water. Use of heat interchanger 40 reduces the energy demands of the system such that use of a solvent heater and/or solvent cooler may not be required.

In preferred embodiments of the present invention, sulfate salt contaminant levels in an aqueous absorption solution comprising a salt of a polyprotic carboxylic acid are maintained at an acceptable level by optionally diverting at least a purge fraction 90 of the regenerated absorption medium 15 exiting stripper 30 for treatment to remove sulfate. The relative volume of the purge fraction varies with the concentration of sorbent in the regenerated absorption medium and the susceptibility of the sulfur dioxide to oxidation in the course of absorption and stripping. Typically, in an operation using malate as an absorbent, the purge fraction may represent less than about 10.1% of the regenerated absorption medium stream.

Treatment of the purge fraction comprises evaporating water from purge fraction 90 in an evaporative crystallizer 92 to produce a concentrated solution supersaturated in the sulfate salt. Sulfate salt crystals are then precipitated from the concentrated aqueous absorption solution in the crystallizer to form a crystallization slurry 94 comprising precipitated sulfate salt crystals and a mother liquor. Sodium sulfate crystals are separated from the slurry in a conventional solid/liquid separation device 96 such as a vacuum filter or centrifuge and the mother liquor fraction 98 recirculated to solvent tank 24 where it is mixed with the main stream of regenerated absorption medium for return to the absorber 11. Concentration of the aqueous absorption solution can be suitably achieved by heating and/or reducing the pressure, or increasing steam flow to the reboiler, to flash evaporate water. Typically, the aqueous absorption solution is heated to a temperature of at least about 40° C., more preferably at least about 60° C. and preferably to the boiling point of the absorption solution at the stripper operating pressure, during concentration to inhibit formation and precipitation of sodium sulfate decahydrate or Glauber's salt ($Na_2SO_4 \cdot 10H_2O$). Glauber's salt tends to form a gelatinous or sticky precipitate that is not readily separated from the mother liquor by centrifugation or filtration.

The crystallizer may be operated at atmospheric pressure or under vacuum. As an alternative to separation of the sodium sulfate salt crystals by centrifugation or filtration, the crystallizer can be designed to continuously decant mother liquor from the crystallization slurry. Furthermore, the sulfate salt crystals may be washed with water and the resulting wash water comprising the polyprotic carboxylic acid salt absorbent likewise directed to the solvent tank for return to the absorber. The overhead vapor stream from the crystallizer may be condensed and returned to the absorber. Alternatively, the overhead stream from the crystallizer may be routed to the stripper as a source of stripping steam.

Although the treatment described above is effective for maintaining acceptable sulfate salt levels in the circulating absorption solution, in accordance with some embodiments of the present invention, an oxidation inhibitor can be included in the absorption solution to reduce oxidation of bisulfite and sulfite to bisulfate and sulfate contaminants, respectively. There are several different types of oxidation inhibitors that may be useful in the practice of the present invention, including: oxygen scavengers and free radical trappers such as p-phenylenediamine and hydroquinone; inhibitors of $NO_x$-catalyzed oxidation such as ascorbic acid; and chelating agents such as ethylenediaminetetraacetic acid (EDTA) which sequester and inhibit metal-catalyzed oxidation. Such oxidation inhibitors can be employed individually or in various combinations and can be added as needed to the regenerated aqueous absorption solution introduced to the absorber. Depending on the type of inhibitor(s) employed, the concentration in the absorption solution typically ranges from a few ppm to from about 1 to about 10 percent by weight. An excess is typically added (e.g., at least about 1000 ppm) since the inhibitors will gradually be consumed by oxidation. Ascorbic acid and hydroquinone are particularly effective in inhibiting oxidation in a sodium malate absorption solution. EDTA is expected to be effective as an oxidation inhibitor when metals are present in the absorption solution.

Increased acidity in the absorption solution has the effect of increasing sulfur dioxide stripping efficiency. Thus, leaving a small concentration of dissolved sulfur dioxide or maintaining some sulfate in the absorption solution leads to higher efficiency in the stripper. For example, a small concentration of sodium sulfate and/or sulfurous acid in the stripper makes the regeneration of the absorbing solution less energy intensive. However, the presence of $SO_2$ in the regenerated absorption medium adversely affects the equilibrium in the absorber. Accordingly, if acidity is regulated by allowing accumulating of components of the circulating absorption medium/absorption liquor, it is preferable to accomplish this by allowing sulfate ion to accumulate than accumulating any appreciable steady state level of $SO_2$. In accordance with various embodiments of the invention, the concentration of sulfate salt is maintained at from about 0.5 to about 11 weight percent, preferably from about 3 to about 11 weight percent in the absorption solution and a small fraction of sulfur dioxide is left in the regenerated aqueous absorption solution thus making the solution slightly more acidic and consequently making the desorption of sulfur dioxide less energy intensive.

Generation of Stripping Steam from Stripped Condensate

To provide a source of energy for generating stripping steam, primary stripper gas effluent 33 from absorption liquor stripper 30 is compressed in an apparatus suitable for increasing the pressure of the primary stripper gas effluent. Suitable apparatus include mechanical compressors and thermal compressors (i.e., steam-jet ejectors). As shown in FIG. 1, the primary stripper gas effluent is preferably compressed by passage through a steam-jet ejector 36. Where sulfur dioxide is recovered from the tail gas of a contact sulfuric acid plant, steam generated in sulfur trioxide absorption heat recovery may provide the motive steam for the ejector.

Although absorption/desorption systems for recovery of sulfur dioxide are known in which the wet sulfur dioxide stripper gas is compressed and the latent heat of condensation of water vapor is transferred from the compressed gas to the sulfur dioxide-enriched absorption liquor, in such systems the condensate exits the system saturated with sulfur dioxide. Unless the sulfur dioxide emanating from the condensate is captured in a separate system, this scheme creates unacceptable emissions that also equate to loss of sulfur dioxide values.

In the process described in U.S. Ser. No. 13/283,671, sulfur dioxide is recovered from the condensate in a condensate stripping column, but this entails additional energy consumption.

According to a preferred process of the present invention, the energy required for stripping the condensate is substantially recovered by use of the stripped condensate as a source of stripping steam for the absorption liquor stripper. Further energy input is required to vaporize the condensate at a pressure sufficient for it to flow into the base of the stripper. In the process of the invention, the latent heat in the water vapor component of the stripper gas provides that source of energy. Modest compression of the stripper gas exiting the absorption liquor stripper creates the modest temperature differential sufficient for transfer of heat from the compressed stripper gas to the stripped condensate, thereby vaporizing the stripped condensate at a pressure sufficient to drive the resulting steam into the stripper.

Compression of the wet sulfur dioxide-containing gas effluent from the stripper preferably increases the pressure of the stream by an increment of from about 30 kPa to about 65 kPa. Higher pressure increments can readily be achieved using a mechanical compressor. Separation of sulfur dioxide is enhanced if stripper 30 is operated at lower pressures (e.g., under vacuum) to increase the relative volatility of sulfur dioxide with respect to water and enhance desorption and decrease the number of theoretical stages needed for a given reflux. In addition, lower pressures lead to lower temperatures in the system allowing the use of lower pressure steam for heating the sulfur dioxide-enriched absorption liquor. However, recovery of energy is optimized at moderately higher operating pressures, and this also reduces the requisite diameter of tower 31 and associated capital cost. By way of example, operating the stripper under a slight vacuum (e.g., −35 kPa gauge) and modestly increasing the pressure of the sulfur dioxide-enriched stripper gas exiting the stripper (e.g., to about 20 kPa gauge) represents one economic approach. Nevertheless, operating the stripper at or above atmospheric pressure may also be an attractive approach. Economic optimization can determine the specific operating conditions. Balancing these considerations, the pressure of the primary stripper gas effluent exiting the absorption liquor stripper is most preferably maintained from about 40 to about 170 kPa absolute).

The pressurized flow of sulfur dioxide-containing stripper gas is directed to a primary stripper gas cooler/condenser 50. A substantial portion of the water vapor is condensed from the primary stripper gas effluent in cooler/condenser 50 by indirect transfer of heat to a cooling medium. In accordance with the present invention, stripped condensate in stream 51 flowing to cooler/condenser 50 from a condensate stripper or water column 60 (the operation of which is described herein below) serves as the cooling medium and the latent heat of condensation is transferred to the stripped condensate thereby generating steam that is used as a stripping medium in absorption liquor stripper 30. As shown in FIG. 1, stripped condensate stream 51 exiting column 60 is directed to a vapor liquid separator 52 and circulates via line 54 between the separator and cooler/condenser 50 where transfer of heat from the primary stripper gas generates steam for the stripper. Stripped condensate and steam are separated in separator 52, the steam is directed to stripper 30, at least a portion of the condensate circulates to primary stripper gas cooler/condenser 50 via line 54 and another portion may optionally be recirculated and combined with regenerated sulfur dioxide absorption solution 15 via line 55 and returned to absorber 11 and/or a portion 56 may be purged from the system. Alternatively, the condensate side of stripper gas cooler/condenser 50 may be designed to allow disengagement of steam from water within the heat exchanger itself, allowing a steam flow free of entrained water to flow directly from the cooler/condenser to the absorber, without the need for a separate vapor/liquid separator.

Steam generated in primary stripper gas cooler/condenser 50 is introduced to stripper 30 via line 57 where it contacts the absorption liquor in vapor/liquid contact zone 32, both supplying heat to the absorption liquor and functioning as a stripping gas for removing sulfur dioxide from the liquid phase. Heating of the liquid phase in the absorption liquid stripper reduces the equilibrium concentration of sulfur dioxide therein and enhances the driving force for transfer of sulfur dioxide to the vapor phase. In transferring heat to the liquid phase, steam generated from stripped condensate in cooler/condenser 50 partially condenses within the stripper, thus functioning essentially as a condensable stripping gas.

Optionally, stripping heat supplied by steam generated from stripped condensate in the primary stripper gas cooler/condenser may be supplemented by heat supplied from an extraneous source in a reboiler 37 through which liquid phase from the absorption liquor stripper is circulated. The auxiliary reboiler provides full flexibility in the water balance control of the process. Typically, absorption liquor to be passed through the reboiler is withdrawn from a sump of the stripper and returned to the lower portion of the vapor/liquid contact zone 32 above the sump.

In primary stripper gas cooler/condenser 50, most of the water vapor content of the primary stripper gas effluent 33 is condensed and thus most of the latent heat removed by transfer to stripped condensate returning from condensate stripper 60. Aqueous condensate obtained by condensing water vapor from the primary stripper gas effluent comprises dissolved sulfur dioxide. This condensate is removed from cooler/condenser 50 and fed via line 58 to condensate stripper or water column 60 and heated (e.g., with steam or a reboiler) to desorb sulfur dioxide and produce a condensate stripper gas comprising water vapor and sulfur dioxide desorbed from the aqueous condensate. As shown in FIG. 1, condensate stripper gas is combined with wet sulfur dioxide-containing vent gas 59 from primary stripper gas cooler/condenser 50. The combined final condensate stripper gas (wet recovered $SO_2$ stream) 61 exiting the top of condensate stripper column 60 is cooled to a temperature normally below about 70° C. in a low temperature condenser 62 (e.g., with cooling water at 50° C.) to condense water vapor and produce a product stream 63 comprising recovered sulfur dioxide. As shown in FIG. 1, marginal additional condensate can be wrung out of the condensate stripper gas, or the combined final condensate stripper gas (wet recovered $SO_2$ stream) 61 exiting the top of condensate stripper column 60, by passing the gas first through a heat exchanger 64 in which the condensate stripper gas is cooled by transfer of heat to a portion of the exhaust gas 19 exiting absorber 11. After cooling, the recovered sulfur dioxide product stream 63 is removed from the sulfur dioxide recovery process and directed to a destination where it may be used, e.g., to the drying tower or a catalytic stage of a contact sulfuric acid plant for conversion to sulfur trioxide, to a Claus process operation for generating elemental sulfur, to an alkali metal sulfite or bisulfite manufacturing process, to a papermaking operation, or to a compression and refrigeration unit for liquefaction to liquid sulfur dioxide.

Stripped condensate stream 51 depleted in sulfur dioxide exits the bottom of condensate stripper column 60 and is directed to the primary stripper gas cooler/condenser 50 wherein condensation of water vapor from the compressed primary stripper gas effluent 33 transfers heat to the stripper condensate, thereby generating steam for use as a combined heating medium and stripping gas (e.g., as a condensing stripping medium) in absorption liquor stripper 30. Optionally, a portion may be purged from the system.

The extent of compression of primary stripper gas effluent 33 from absorption liquor stripper 30 is necessarily sufficient to bring the compressed vapor to a temperature high enough that steam having a pressure higher than the pressure in the lower (stripping) section of vapor/liquid contact zone 32 within tower 31 can be generated by heating stripped condensate in primary stripper gas cooler/condenser 50. But the extent of compression is preferably controlled to a minimum necessary for steam generated from stripped condensate to flow into the stripper. More particularly, it is preferred that steam is generated from stripped condensate at a temperature not more than about 30° C. higher than the temperature of the liquid phase within the absorption liquor stripper at liquid outlet 35 thereof, or more particularly, not more than about 20° C. or not more than about 5 to about 10° C. higher than the temperature of the liquid phase exiting the bottom of the vapor/liquid contact zone 32 within the stripper. In certain particularly preferred embodiments, the temperature of the steam produced by heating stripped condensate in the primary stripper gas cooler/condenser 50 is no more than equal to, or may be even lower than, the temperature of the liquid phase within the absorption liquor stripper at the liquid outlet thereof, or at the bottom of the vapor/liquid contact zone. More generally, it is preferred that the temperature of the steam generated in the primary stripper gas cooler/condenser 50 vary from the temperature of the regenerated absorption medium within the stripper at the liquid outlet thereof, or from the temperature of the liquid phase exiting the lower (stripping) section of the vapor/liquid contact zone within the absorption liquor stripper, by no more than about ±10° C. In order for steam to flow into the absorption liquor stripper, the pressure of the steam generated in the cooler/condenser 50 is necessarily higher than the total pressure in the stripper, and therefore higher than the equilibrium vapor pressure of the liquid phase within the stripping section the vapor/liquid contact zone, even at the liquid phase exit of the stripping section where the partial pressure of sulfur dioxide approaches zero as a limit.

The consequent vapor phase water pressure driving force thus causes condensation of water vapor to occur in the stripper irrespective of temperature differences between the vapor phase and the liquid phase, resulting in condensation and heating of the liquid phase within the stripping section of the vapor/liquid contact zone even if the steam is introduced into the zone is a temperature no greater than, or even slightly below, the temperature of the liquid phase. Because of the depressant effect of the solute, i.e., a sorbent such as a polyprotic carboxylic acid salt, in the liquid phase, the vapor pressure of the liquid phase may be slightly lower than the pressure of the steam at the same temperature, or even where the temperature of the liquid phase is slightly higher than the temperature of the steam.

To meet these preferred conditions, the log mean temperature differential ($\Delta t$) in the primary stripper gas cooler/condenser is not less than about 1.5° C., about 2° C., about 3° C., about 4° C., or about 5° C. and no greater than about 10° C., about 8° C., about 6° C. or about 5° C. For example, the log mean temperature differential ($\Delta t$) in the primary stripper gas cooler/condenser is from about 1.5° to about 10° C., or from about 2° to about 9° C., or from about 2.5° to about 8° C.

Depending on the overall process energy and water balance, the volume of stripped condensate from condensate stripper 60 may exceed the demand for steam in the absorption liquor stripper 30. Thus, the stripped condensate may be usefully divided between (i) a condensate stream directed to the primary stripper gas cooler/condenser 50 as a cooling fluid for condensing water from the stripper gas, thereby converting the stripped condensate at least in part to steam for introduction to the absorption liquor stripper; and (ii) a discharge water stream for removal of water from the process.

A portion of stripped condensate from condensate stripper 60 as discharge water may also optionally be used to condition the sulfur dioxide-containing source gas or feed gas stream 10. As shown in FIG. 1, stripped condensate from steam drum 52 is passed through line 70 and introduced into a saturator 71 upstream of sulfur dioxide absorber 11 with respect to feed gas flow. The saturator may comprise a one stage contactor (generally consisting of a packed column or tower containing random or structured packing or a spray column), wherein the stripped condensate contacts the gas stream, thereby increasing the humidity of the feed gas entering the sulfur dioxide absorber. The water stream exiting the saturator may be removed from the process. The saturator also cools the sulfur dioxide-containing gas by evaporative cooling and removes acid gases (e.g., sulfuric acid, hydrochloric acid, sulfur trioxide) prior to entering the absorber. The saturator advantageously permits humidification of the feed gas stream utilizing lower quality water, which provides an incremental cost savings as compared to humidifying the gas in the absorber where the water utilized should be deionized or distilled to avoid the build-up of impurities. Although the water stream exiting the saturator is saturated with sulfur dioxide, the volume of this stream is small. Moreover, where, e.g., sulfur dioxide is recovered from the tail gas of a sulfuric acid plant, the sulfur dioxide-laden water stream exiting the saturator can be used as dilution water in an $SO_3$ absorber. In an interpass plant, the water is advantageously used for dilution in the interpass absorber, but at worst, the minimal net flow of sulfur dioxide involved comes back through the sulfur dioxide recovery unit and is not lost from the process.

The process of FIG. 1 compresses the primary stripper gas effluent in order to provide the temperature differential whereby latent heat reclaimed by condensation of water vapor from the primary stripper gas is transferred to the stripped condensate for generation of the steam that is introduced to effect stripping of absorption liquor in the absorption liquor stripper. In accordance with the invention, other alternatives are provided for generating this temperature differential and driving the stripping operation.

Figure 2:
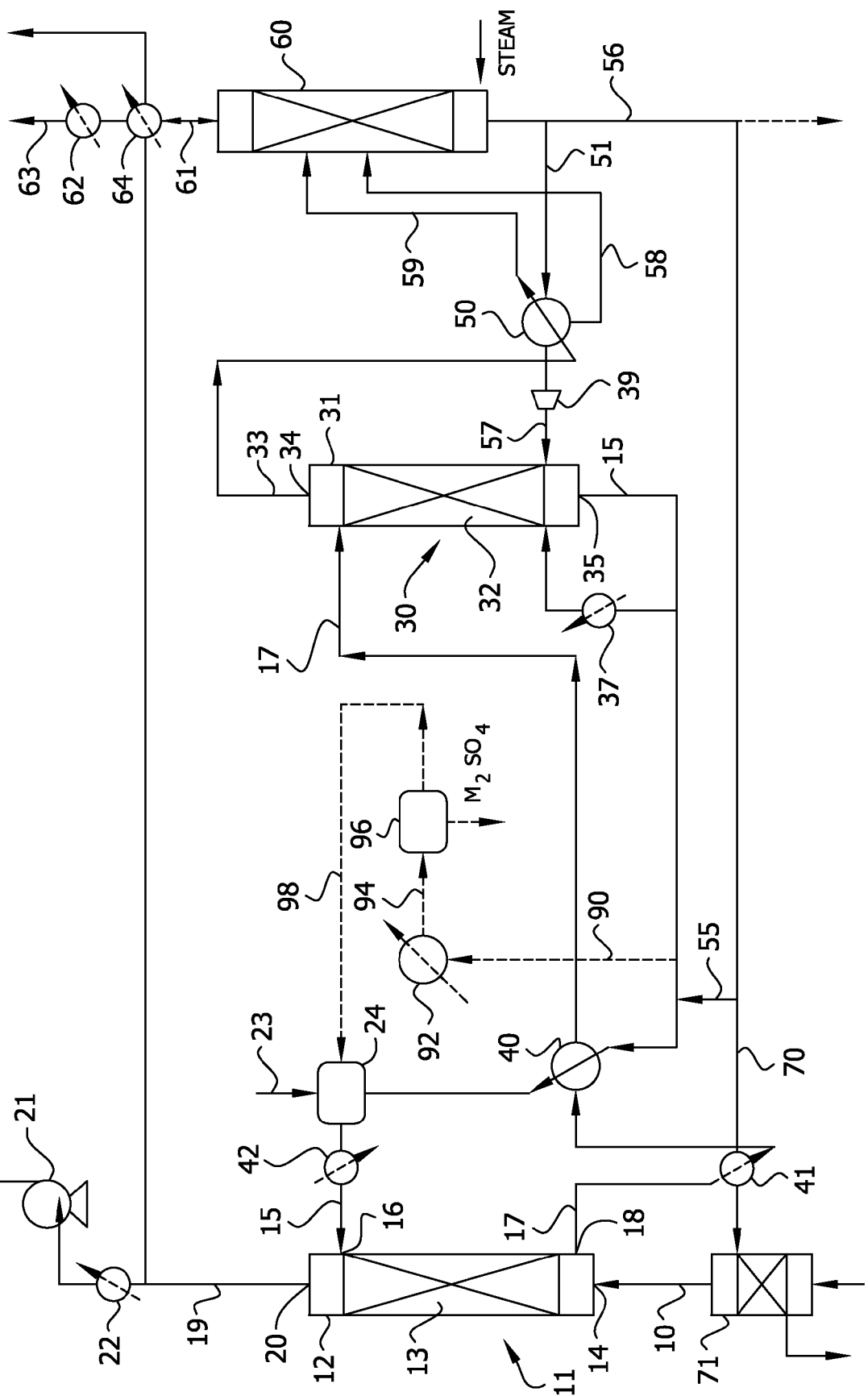

FIG. 2 illustrates an alternative to the process of FIG. 1 wherein the steam generated from the stripped condensate is compressed by a compressor 39 during flow between the steam outlet of the cooler/condenser 50 and the absorption liquor stripper 30. The drawing shows compression of the steam by a mechanical compressor, but the steam could also be introduced into the throat of a steam-jet ejector to achieve the requisite compression. The diameter of the stripper 30 is sized, and the packing or other mass transfer promoting structure within the vapor/liquid contact zone 32 of stripper 30 is designed, to avoid excessive pressure drop during passage of the gas/vapor phase upwardly through the zone. The primary stripper gas outlet 34 and line used to transfer the primary stripper gas effluent 33 to cooler/condenser 50 are also sized to avoid excessive pressure drop. By preserving a pressure on the primary stripper gas side of the cooler/condenser 50 that is higher than the pressure on the stripped condensate side of that exchanger, a temperature differential is established by which heat is transferred to the stripped condensate as water vapor condenses from the primary stripper gas effluent and steam is generated on the condensate side for use in stripper 30. The steam generated in the cooler/condenser 50 is introduced to the suction side of compressor 39 which compresses the steam for introduction into the stripper via line 57.

To recover the latent heat of condensation of water vapor from the stripping gas, compressor 39 increases the pressure of the steam to a level such that, when the primary stripper gas reaches cooler/condenser 50, the pressure on the stripper gas side of the cooler/condenser is higher than the pressure of the steam generated from the stripped condensate on the stripped condensate side of the cooler/condenser. More particularly, the extent of compression is sufficient such that the water saturation pressure at which water vapor condenses on the primary stripper gas side of the cooler/condenser is higher than the pressure at which steam is generated on the stripped condensate side of the cooler/condenser.

The temperature and pressure differential achieved in the process of FIG. 2 is preferably essentially the same as that which prevails in cooler/condenser 50 in the embodiment of FIG. 1 wherein the primary stripper gas effluent is compressed during flow from the gas outlet of the stripper to the gas inlet of the cooler/condenser. The absolute pressure prevailing in the vapor/liquid contact zone is preferably also in the same range for each of the embodiments respectively shown in FIGS. 1 and 2. In both cases, it is desirable to maintain a pressure slightly above atmospheric, e.g., about 15 to about 18 psia (about 100 to about 125 kPa absolute), in the stripper. However, because only steam is compressed in the process of FIG. 2, the optimal pressure within the absorption liquor stripping zone in the process of FIG. 2 may be marginally lower than the optimal pressure in the process of FIG. 1 wherein the sulfur dioxide component of the primary stripper gas must also be compressed while bringing the partial pressure of water vapor to a level at which the water vapor will condense at a temperature higher than the boiling water temperature on the stripped condensate side of cooler/condenser 50.

The remainder of the process of FIG. 2 is operated in a manner substantially identical to that described above with respect to FIG. 1.

Although the processes of FIGS. 1 and 2 provide comparable energy efficiency, an advantage of the process of FIG. 2 is the substantial absence of sulfur dioxide from the stream subject to compression. This means that the fluid being compressed is generally less corrosive than the fluid compressed in the process of FIG. 1, and thus provides savings in both maintenance and selection of materials of construction for the compressor or ejector.

Reliance on saturated steam generated from stripped condensate in the primary stripper gas cooler/condenser as the sole energy source for stripping sulfur dioxide from the absorption liquor can result in a net accretion of water in the regenerated absorption medium circulated back to the absorber, and ultimately in the sorbent medium circuit between the absorber and the stripper. In fact, any stripper operation that relies solely on live steam necessarily has this effect due to the increment of steam that must be added to provide the heat of vaporization of sulfur dioxide and the increment resulting from loss of heat to the environment. Thus, control of the water balance in this circuit requires some measure for removal of the water fraction that may otherwise be gained in this scheme of operation. Various options are available for this purpose. For example, energy supplied from an extraneous source in reboiler 37 may marginally increase the temperature of the primary stripper gas so that it carries a slightly higher water vapor load, and the primary stripper gas cooler/condenser can be operated at a marginally higher Δt and marginally higher vent gas temperature to remove a sufficient increment of water vapor to maintain the water balance. This may require marginally greater compression of the primary stripper gas in the embodiment of FIG. 1, or marginally greater compression of the stripping steam in the embodiment of FIG. 2. Alternatively, some or all the regenerated absorption liquor can by-pass interchanger 40 and/or trim cooler 42, thereby allowing the absorber to operate at a marginally higher temperature that incrementally increases the water vapor content of the exhaust gas to maintain the balance.

In typical operation of the process of FIG. 1, about a 2% gain in water volume is experienced during every turnover of the absorber/stripper circuit. In an embodiment wherein flue gas containing sulfur dioxide at levels reflecting the sulfur content of the coal is delivered to the absorber at 27° C., a balance can be achieved by by-passing the regenerated absorption medium around interchange 40 and trim cooler 42 and feeding the absorption medium into the absorber at 40° C. The exhaust gas leaving the absorber at 35° C. carries enough water vapor to balance the gain arising from the increment of steam necessary to vaporize the sulfur dioxide from the absorption liquor in the absorption liquor stripper.

Sulfur Dioxide Recovery from Rich Gas Streams

The process of the invention is suited for the recovery of sulfur dioxide from the tail gas of a contact sulfuric acid plant. However, it is applicable to other process operations that require sulfur dioxide recovery, including operations that generate relatively rich sulfur dioxide gas streams. Because the reactions for absorbing sulfur dioxide from a feed gas are typically exothermic, significant reaction heat is generated in the absorber where the process is used to recover sulfur dioxide from rich gases containing, e.g., 2 to 4 vol. % sulfur dioxide or higher, including gas streams wherein the sulfur dioxide content may be as high as 10 vol. %, 15 vol. %, 20 vol. %, 25 vol. %, 30 vol. %, 40 vol. %, or even higher. For example, the sulfur dioxide concentration may at least about 4 vol. %, or at least about 5 vol. %, or at least about 10 vol. %, or at least about 15 vol. %, or at least about 20 vol. %, or at least about 30 vol. %.

The process of the invention is quite readily adaptable to recovering sulfur dioxide from such rich sulfur dioxide-containing gas streams. However, where the sulfur dioxide content of the gas stream is high, sensible heat generated in the exothermic absorption reaction may sharply increase the temperature of the absorption liquor, in some instances to levels that can seriously compromise absorption efficiency and/or the absorptive capacity of the circulating absorption medium. For example, in an absorption system using tetraglyme as the sorbent, where the sulfur dioxide concentration of the incoming feed gas reaches 2.9 vol. %, the temperature of the absorption liquor can increase from a typically preferred temperature of 17° C. to a temperature of 30° C. at otherwise appropriate L/G ratios in the absorber. Where the sulfur dioxide content of the incoming gas is 43 mole %, the temperature can typically increase from 17° to 49° C. For a tetraglyme absorption system, such temperature rises may seriously compromise the capacity of the absorption medium for absorption of sulfur dioxide.

Figure 3:
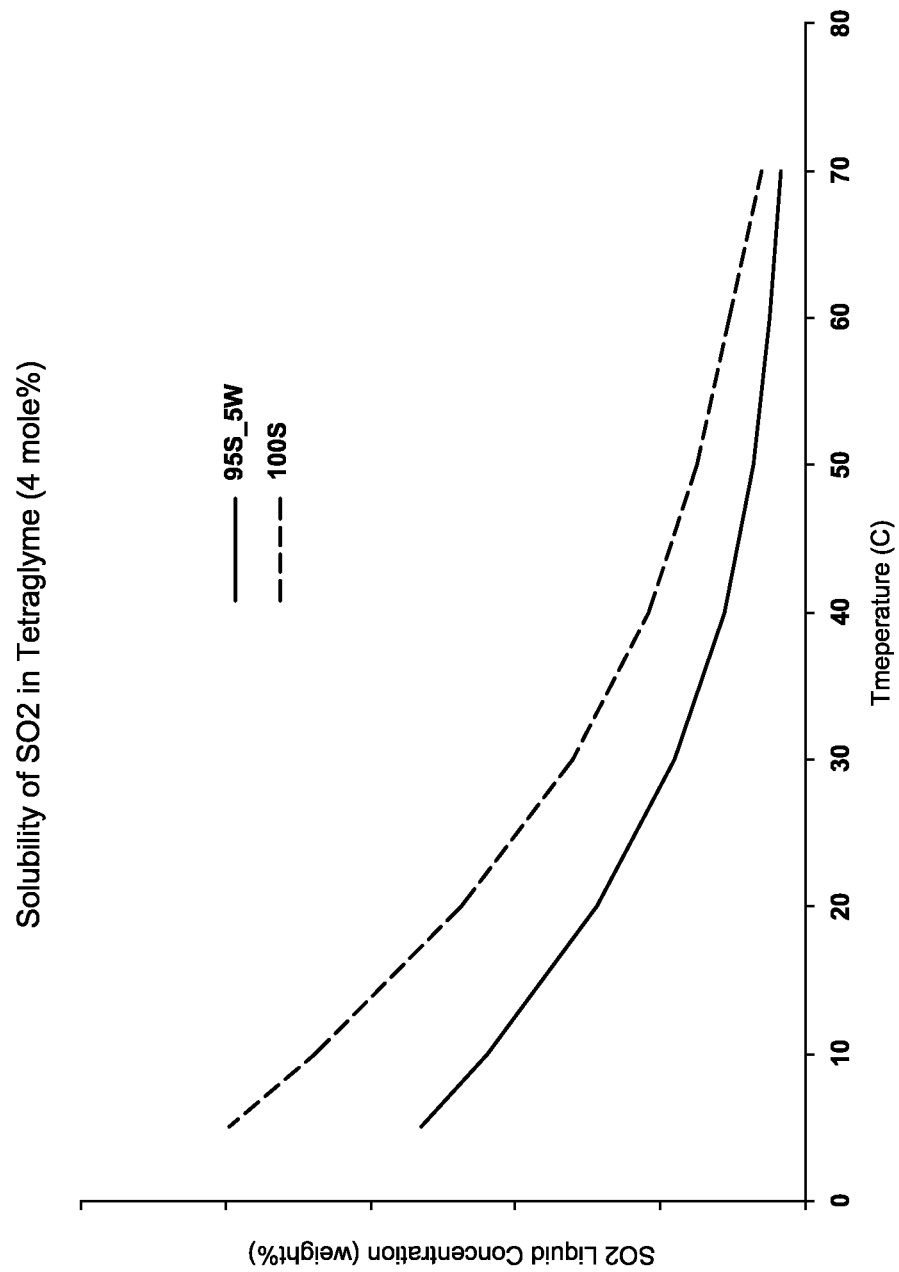
FIGS. 3 and 4 are curves plotting the solubility of sulfur dioxide in certain absorption solvents as a function of temperature.
Figure 4:
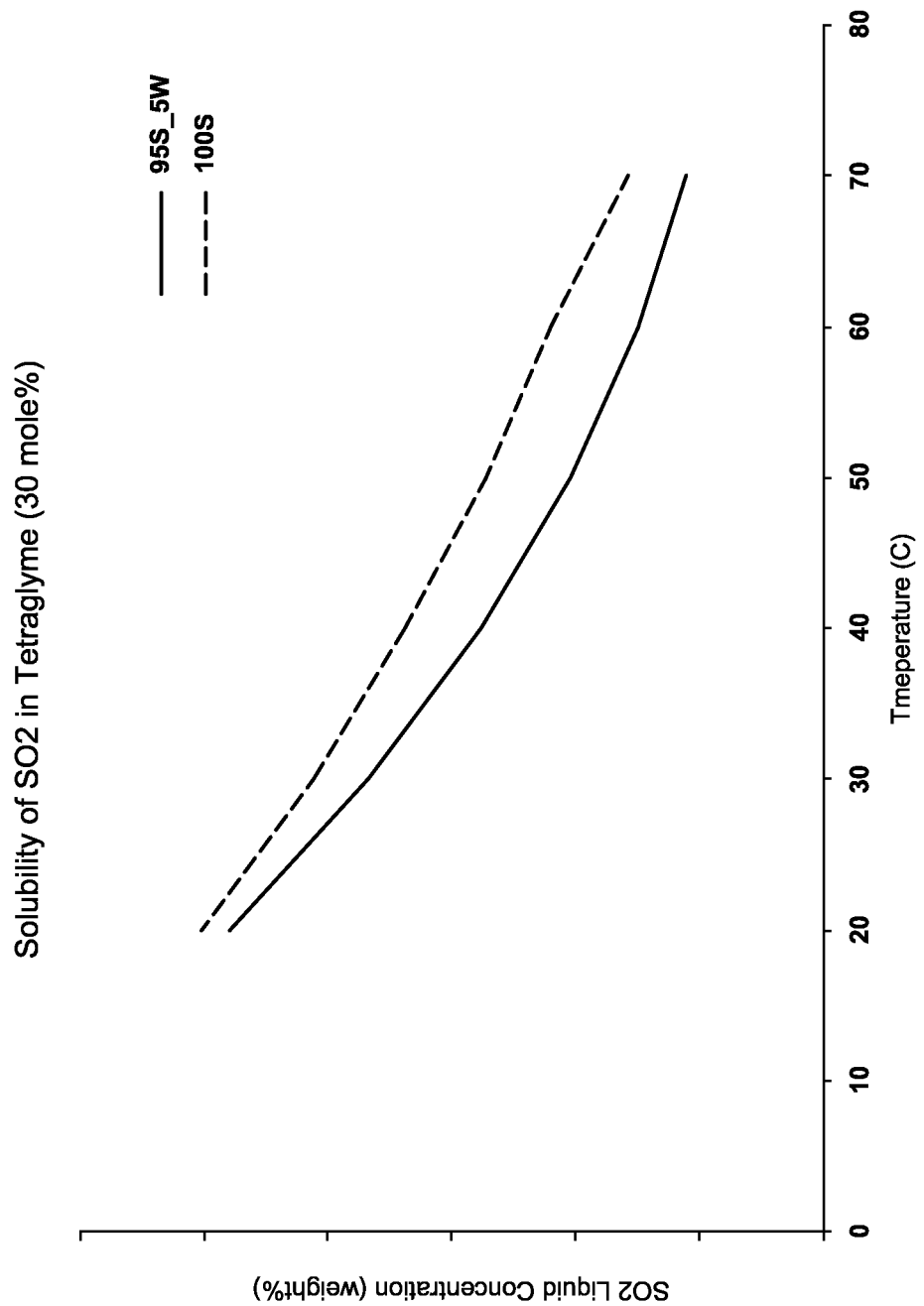

FIGS. 3 and 4 illustrate the adverse effect of temperature on the equilibrium absorptive capacity of two known sulfur dioxide absorption solvents. As illustrated in FIG. 3, using pure tetraglyme (100S) at 4 mole % $SO_2$ (100S) in the gas, the sorptive capacity of the aqueous absorption medium declines from about 13 wt. % to about 8 wt. % as the temperature rises even in the narrow range from 20° to 30° C. At 40° C., the absorptive capacity falls to about 5 wt. %, and at 50° C., it falls to about 4 wt. %. As illustrated in FIG. 4, where the gas feed contains 30 mole % $SO_2$, the absorptive capacity declines from about 25 wt. % at 20° C. to about 21 wt. % at 30° C., falls to about 17 wt. % at 40° C., and to less than about 14 wt. % at 50° C. As also shown in FIGS. 3 and 4, comparable declines in absorptive capacity are incurred using another tetraglyme sorbent, i.e., 95S_5W (95% tetraglyme). Thus, for rich gases containing more than 2 vol. % sulfur dioxide, increased aqueous absorption medium flows are generally required to reduce the extent of temperature rise in the liquid phase passing through the absorber which results in relatively lower sulfur dioxide concentrations in the sulfur dioxide-enriched absorption liquor.

The increased flow of absorption medium and absorption liquor taxes the absorption liquor stripper in two important ways. It increases the energy demand for heating the absorption liquor to the proper temperature for stripping the sulfur dioxide therefrom, thus reducing the energy efficiency of the process. But it also imposes an increased mass flow throughout the stripping column, which increases the diameter of the entire column required to accommodate the liquid flow without flooding the vapor/liquid contact zone. The higher liquid phase flow rates also dictate an increased diameter of the absorption column as well.

In accordance with a further preferred feature of the sulfur dioxide absorption process, cooling is provided at the base of the absorber in order to reduce the temperature rise in the absorption medium in its passage through the absorption (i.e., gas/liquid contact) zone, and thus enable both the absorber and stripper to be operated at relatively low L/G ratios. Controlling the temperature rise in the absorption medium, especially in the lower portion of the absorption zone, preserves the equilibrium capacity of the absorption medium, and thus preserves the driving force for mass transfer of sulfur dioxide from the gas phase to the liquid phase within the absorption zone as well as the driving force for reaction of sulfur dioxide with the sorbent in the liquid phase. Relatively lower liquid phase temperatures also favor the extent of conversion to the sulfur dioxide adduct within the liquid phase where the reaction between sulfur dioxide and sorbent is an exothermic equilibrium reaction. Preferably, absorption liquor is withdrawn from the gas liquid/contact zone within the absorber, circulated through an external heat exchanger and returned to the absorption zone. More particularly, the circulating absorption liquor is removed from the gas/liquid contact zone in a region spaced below the region to which the cooled circulating absorption liquor is returned to the zone, thus defining a section within the absorption zone below the region to which cooled absorption liquor is returned within which the bulk of the absorption of sulfur dioxide preferably occurs and the bulk of the heat of absorption is generated.

Figure 5:
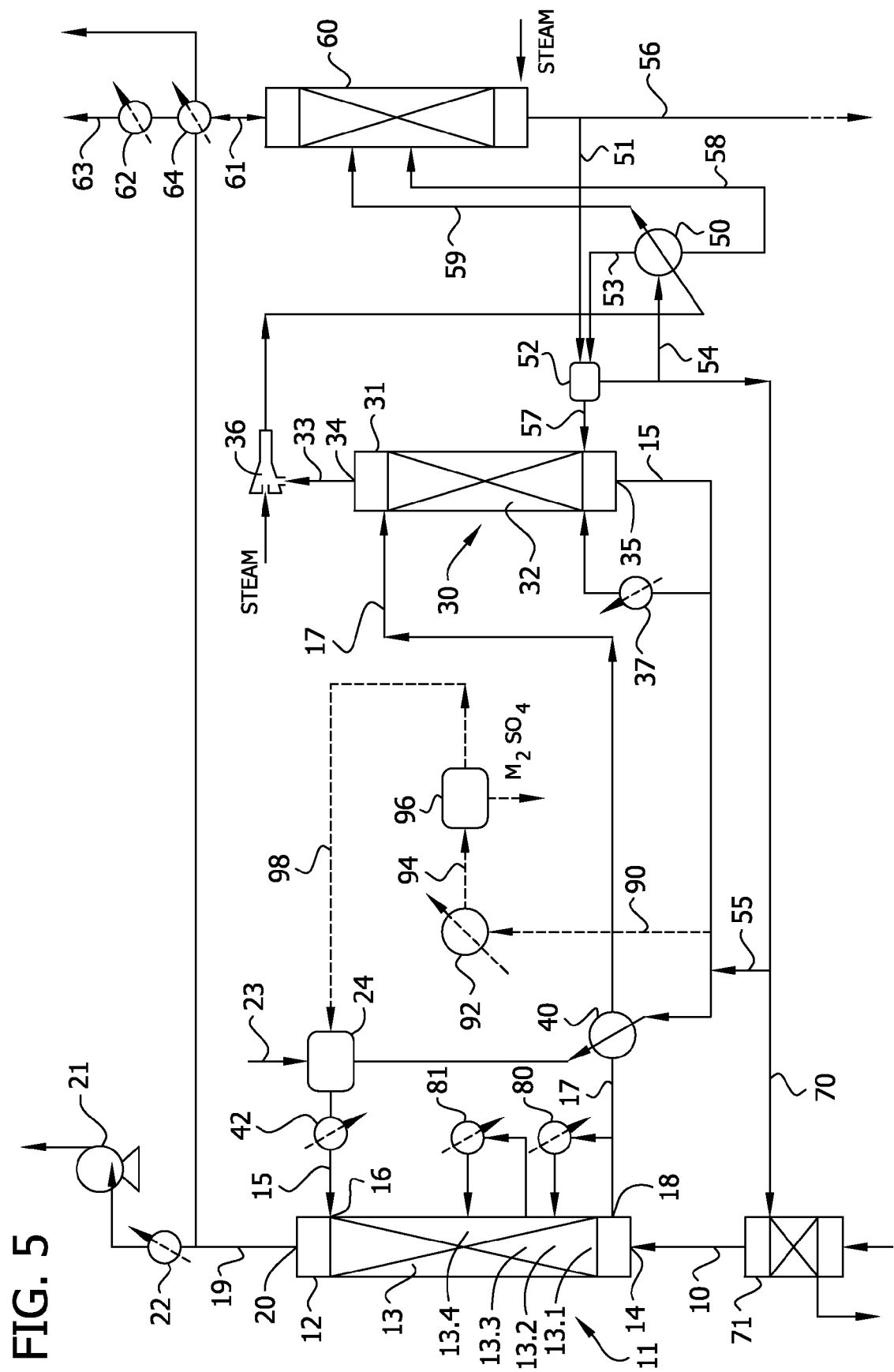
FIG. 5 is a flowsheet of an absorption/desorption process for selectively removing and recovering sulfur dioxide from a sulfur dioxide-containing source gas in which absorption liquor is circulated between the absorber and one or more external heat exchangers to cool the absorption liquor and enhance the capacity of the absorption medium for transfer of sulfur dioxide from the gas phase.

For example, as illustrated in FIG. 5, a portion of hot sulfur dioxide-enriched absorption liquor 17 is withdrawn from liquid exit 18 or withdrawn from a region 13.1 near the bottom of vertical gas/liquid contact zone 13 in absorber 11 and circulated through an external heat exchanger 80 where heat of absorption is removed by transfer to a cooling fluid. The cooled absorption liquor is returned to the absorber in a region 13.2 of the gas/liquid contact zone that is spaced above the region from which the hot absorption liquor is withdrawn, but spaced below the top of the gas/liquid contact zone. More preferably, the region 13.2 to which the cooled circulating absorption liquor is returned is in the lower portion of the gas/liquid contact zone.

Circulation of absorption liquor between the sulfur dioxide absorber and the external heat exchanger causes increased mass flow and unavoidable back mixing of the absorption liquor in the circulation section of the absorption zone falling between regions 13.1 and 13.2, and this can marginally offset the gain in mass transfer for removal of sulfur dioxide in this section of the zone. Preferably, therefore, return region 13.2 is spaced by the height of at least one transfer unit below the top of the gas/liquid contact zone, thereby defining a rectification section of the absorption zone comprising at least one transfer unit below the top of the zone. Preferably, the rectification section comprises at least two transfer units. It is also preferred that the return region 13.2 is spaced by the height of at least one transfer unit, more preferably at least two transfer units above withdrawal region 13.1. To accommodate adequate mass transfer capacity in both the circulation section of the absorption zone between return region 13.2 and withdrawal region 13.1 and the rectification section between return region 13.2 and the top of the absorption zone, the absorption zone as a whole preferably comprises at least three, more preferably at least four transfer units. Because both gas and liquid streams are in substantial plug flow within the rectification section, a maximum driving force for mass transfer is provided in that section, allowing reduction of the sulfur dioxide concentration in the exhaust gas to a level satisfying emission standards. Proper selection of the location for the circulating liquid return region 13.2 is based on selection of a region wherein sulfur dioxide level in the gas flowing upwardly therefrom is not high enough to generate absorption/reaction heat in the rectification section that would have a significant adverse effect on absorptive capacity of the aqueous absorption medium, or on the mass transfer driving force in the rectification section.

Preferably, where the sorbent is tetraglyme, region 13.2 to which cooled circulating absorption liquor is returned to the gas/liquid contact zone is maintained at a temperature not greater than about 40° C., more preferably not greater than about 30° C., most typically from about 15° to about 25° C. In a tetraglyme system, the temperature of region 13.1 from which the hot circulating absorption liquor is removed from the gas/liquid contact zone is preferably maintained at a temperature not greater than about 45° C., more preferably not greater than about 35° C., more typically from about 15° to about 30° C. Those skilled in the art will recognize that different, in some cases substantially different, temperature ranges are optimal for other sorbents. For example, where the sorbent is sodium malate, region 13.2 to which cooled circulating absorption liquor is returned to the gas/liquid contact zone is maintained at a temperature not greater than about 45° C., more preferably not greater than about 45° C., most typically from about 20° to about 40° C. In this case, the temperature of region 13.1 from which the hot circulating absorption liquor is removed from gas/liquid contact zone is preferably maintained at a temperature not greater than about 50° C., more preferably not greater than 40° C., more typically from about 25° to about 35° C. In each case, the rate of circulation between regions 13.1 and 13.2 is dictated by these temperature constraints and the unit energy generation of the absorption process.

Conveniently, a forward flow fraction of hot sulfur dioxide-enriched absorption liquor 17 is withdrawn from the circulating absorption liquor stream upstream of the external heat exchanger 80 and directed to absorption liquor stripper 30.

Figure 6:
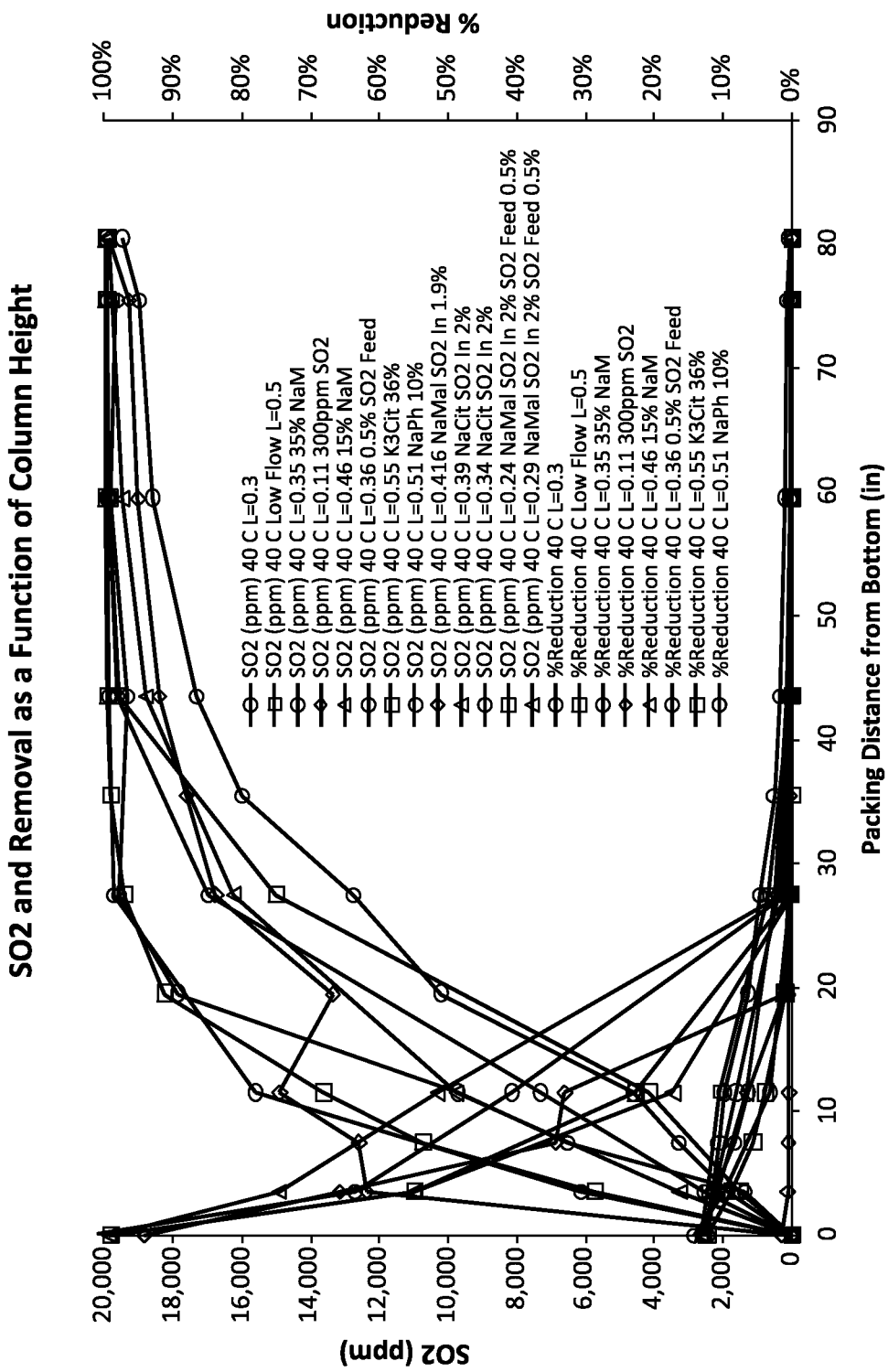
FIG. 6 plots sulfur dioxide content in the gas phase and percent recovery of sulfur dioxide from the gas phase as a function of distance from the bottom of a countercurrent absorber for various combinations of gas composition, absorption medium composition, and liquid flow rate.

Location of the circulating absorption liquor return region 13.2 can be selected based on the absorption profile for the sulfur dioxide absorption zone. Typical profiles using different absorption media are illustrated in FIG. 6.

Where absorption is immediate and substantially quantitative upon contact of the feed gas with the absorption medium in the gas/liquid contact zone, a single absorption liquor cooling circuit is ordinarily sufficient to preserve absorption efficiency and control the volumetric flow of absorption liquor to a level consistent with efficient energy usage in the absorption liquor stripper. However, where the affinity of the sorbent for sulfur dioxide is more limited, as is also desirable for purposes of efficient operation of the absorption liquor stripper, the sulfur dioxide concentration gradient through the absorption zone, i.e., the rate at which the concentration of sulfur dioxide in the gas stream (and the liquid stream) decrease with distance above the gas inlet to the absorption zone, may be only modest. In such circumstances, greater efficiency in operation of the absorber and the stripper may be realized by using two or more cooling loops spaced vertically along the gas flow path within the absorption zone. For example, as illustrated in FIG. 5, two such cooling loops are shown. In the second cooling loop, a second portion of hot sulfur dioxide-enriched absorption liquor descending gas/liquid contact zone 13 of absorber 11 is withdrawn from a region 13.3 above region 13.2 to which cooled circulating absorption liquor is returned to the gas/liquid contact zone in the first cooling loop and circulated through an external heat exchanger 81 where heat of absorption is removed by transfer to a cooling fluid. The cooled absorption liquor is returned to the absorber in a region 13.4 of the gas/liquid contact zone that is spaced above region 13.3 from which the hot absorption liquor is withdrawn, but spaced below the top of the gas/liquid contact zone.

Figure 7:
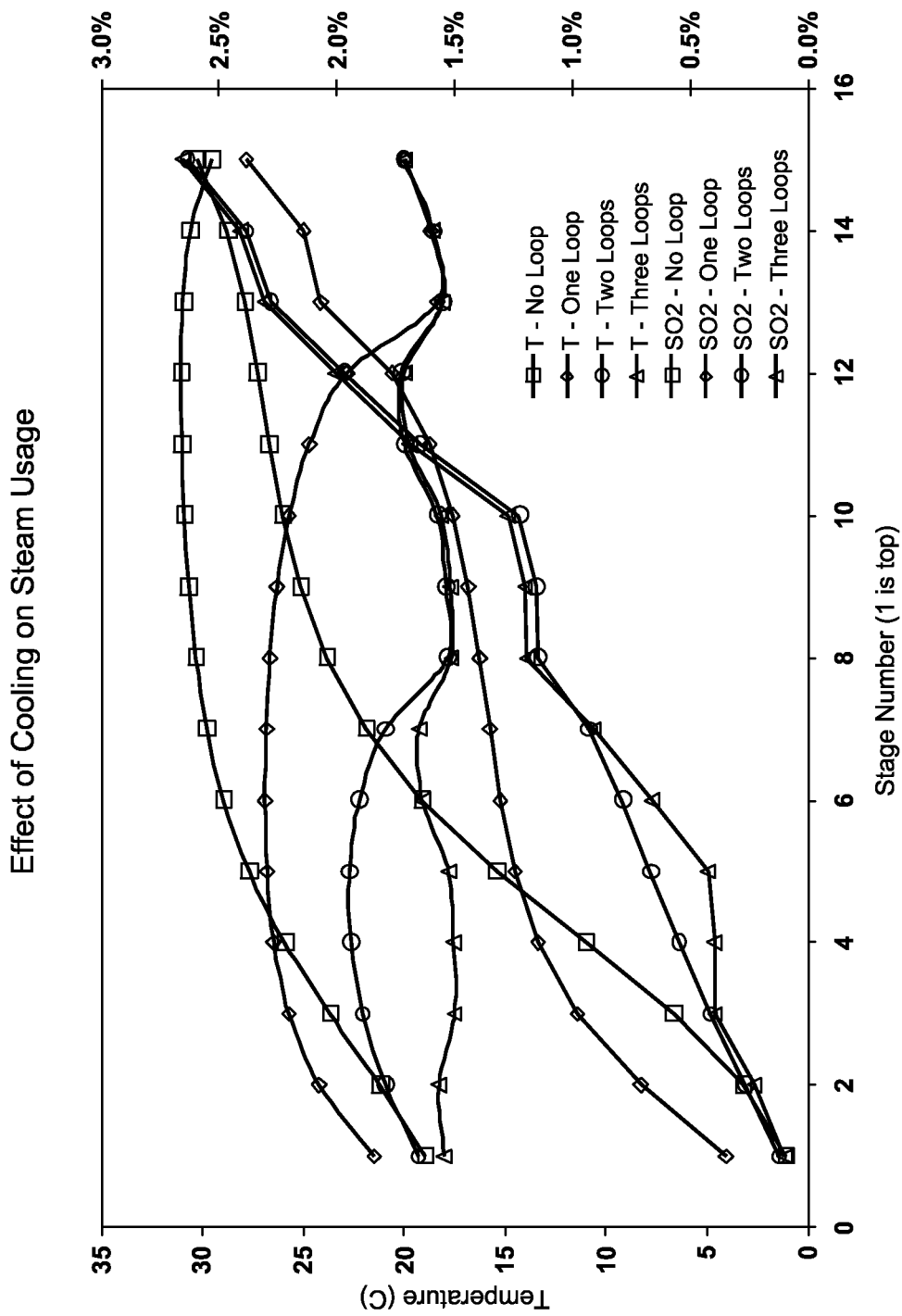
FIG. 7 depicts profiles of absorption liquor temperature and mole percent sulfur dioxide in the vapor phase for an absorption/desorption process for sulfur dioxide recovery in which different numbers of cooling loops are provided for the absorber.

FIG. 7 illustrates the operation of an absorber/stripper system in which sulfur dioxide has only a modest affinity for the sorbent, so that the sulfur dioxide gradient is relatively shallow. FIG. 7 plots the temperature of the absorption liquor and the sulfur dioxide concentration in the gas stream within the absorption zone, in each instance as a function of the location in the absorption zone expressed as the distance in transfer units from the top, i.e., gas outlet of the zone, with different curves for systems respectively containing no cooling loops, one cooling loop, two cooling loops, and three cooling loops. Data on the effect of one, two, or three cooling loops are also set forth below in Table 1.

TABLE 1

Impact of Cooling Loops on Steam Requirements

| | Number of cooling loops on absorber | | | |
|---|---|---|---|---|
| | 0 | 1 | 2 | 3 |
| Absorber Bottom Temperature (° C.) | 30 | 20 | 20 | 20 |
| Emissions ($SO_2$ ppm) | 929 | 948 | 970 | 985 |
| Solvent Flow (MM lb/hr) | 2.1 | 1.6 | 1.3 | 1.3 |
| Reboiler Duty (MM Btu/hr) | 70.5 | 59.4 | 53.3 | 52.7 |
| Steam: $SO_2$ Ratio | 1.1 | 0.93 | 0.83 | 0.82 |
| Savings on Steam | 0% | 15.70% | 24.40% | 25.20% |

The data plotted in FIG. 7 and tabulated in Table 1 are from a sulfur dioxide absorption system in which the absorber comprises 15 stages (essentially corresponding to transfer units). In each case where circulating absorption liquor is cooled, there is at least one loop wherein the withdrawal region is stage 15 and the return region is stage 13, i.e., the return region is spaced by the height of essentially two transfer units from the bottom of the absorption zone and spaced by the height of 12 units from the top of the zone. Where a second loop is added, the withdrawal region is stage 10 and the return region is stage 8, and where a third loop is used, the withdrawal region is stage 5 and the return region is stage 3.

These plots and tabulations graphically illustrate the value of one or more cooling loops in contributing to the overall energy efficiency of the process. As indicated in Table 1, one cooling loop decreases steam usage in the absorption liquor stripper by about 15% as compared to operation with no cooling. Operation with two cooling loops reduces steam consumption by 24% compared to operation with no cooling; and operation with three loops reduces steam consumption by 25% compared to operation with no cooling. Without cooling, the temperature reaches a maximum of 31° C. The maximum temperature drops to 27° C., 22.5, and 19° C., respectively with the introduction of one, two, or three cooling circuits.

By comparison with the system whose operation is reflected in FIG. 7 and Table 1, only a single cooling loop would typically be justified in a sulfur dioxide absorption process which uses a polyprotic acid such as sodium malate as the sorbent.

The remainder of the process as illustrated in FIG. 5 is operated substantially in the manner described above with reference to FIG. 1 or FIG. 2. However, it should be understood that controlling the temperature rise in the absorption medium within absorber 11 in accordance with the present invention may be practiced independently of providing a source of energy for generating stripping steam by compressing the primary stripper gas effluent or steam generated from the stripped condensate (i.e., the process may depend entirely on reboiler 37 as a source of energy for absorption liquor stripping column 30).

Tandem Rich and Lean Gas Absorption and Stripping Circuits

Figure 8:
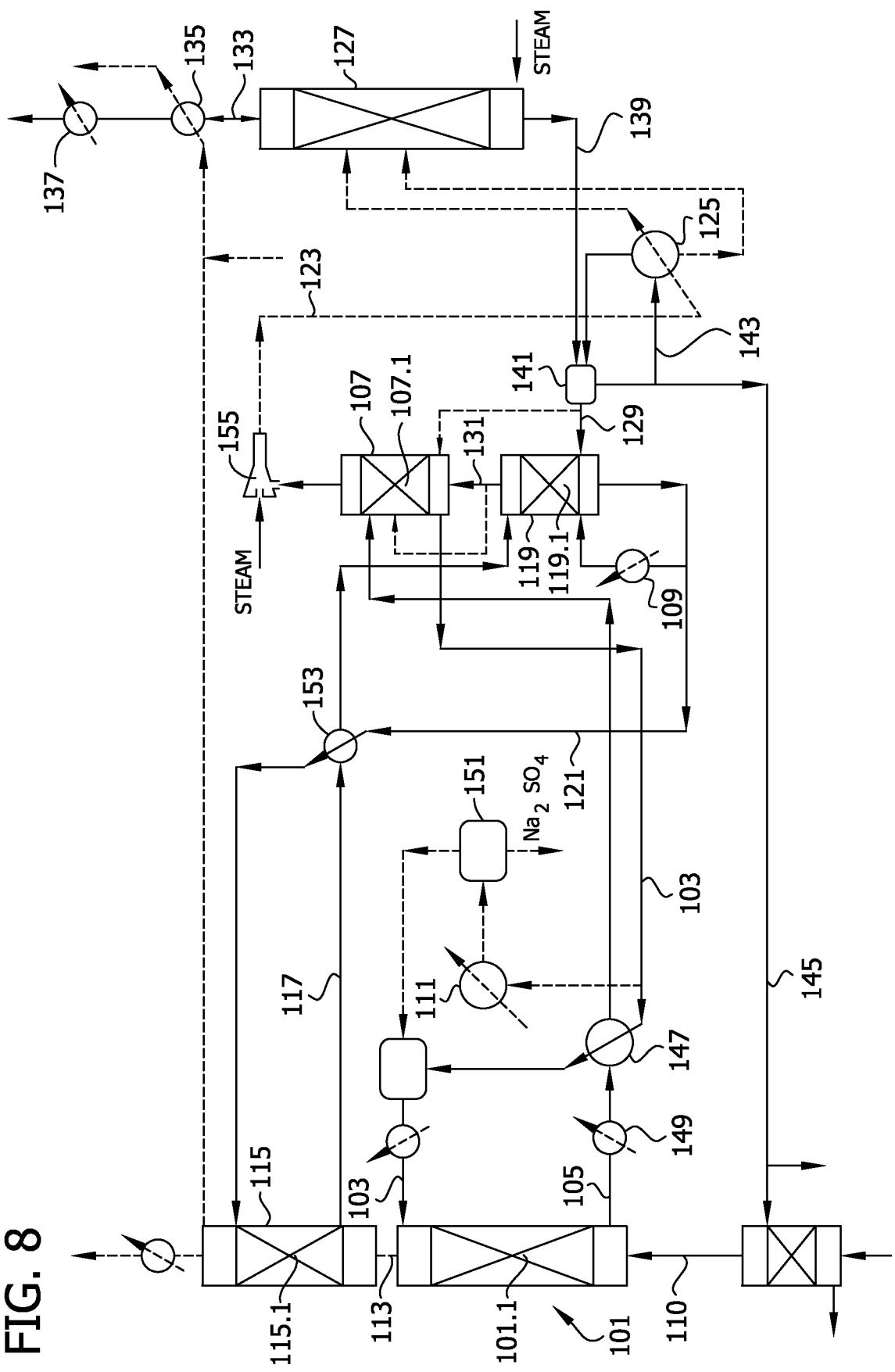
FIGS. 8 and 9 are alternative flowsheets of a process wherein the absorption of sulfur dioxide from a feed gas is divided between a rich gas absorption circuit comprising a rich gas absorber coupled to a rich absorption liquor stripper and a lean gas absorption circuit comprising a lean gas absorber coupled to a lean gas absorption liquor stripper.
Figure 10:
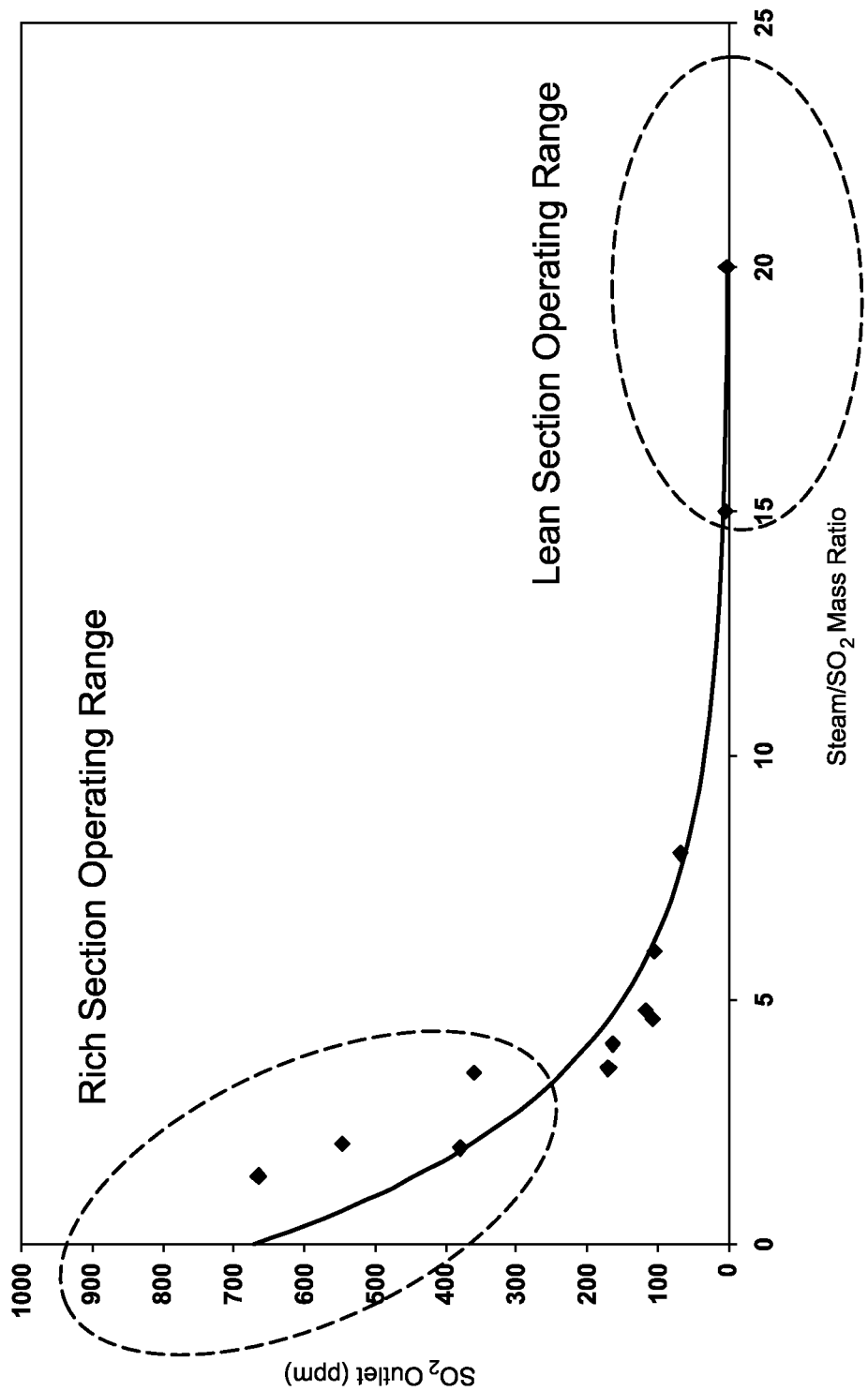
FIG. 10 is a linear scale plot of residual $SO_2$ in the exhaust gas from an absorber as a function of the ratio of steam fed to the stripper to $SO_2$ removed in the absorber in an absorption system containing a single absorber and stripper circuit.
Figure 11:
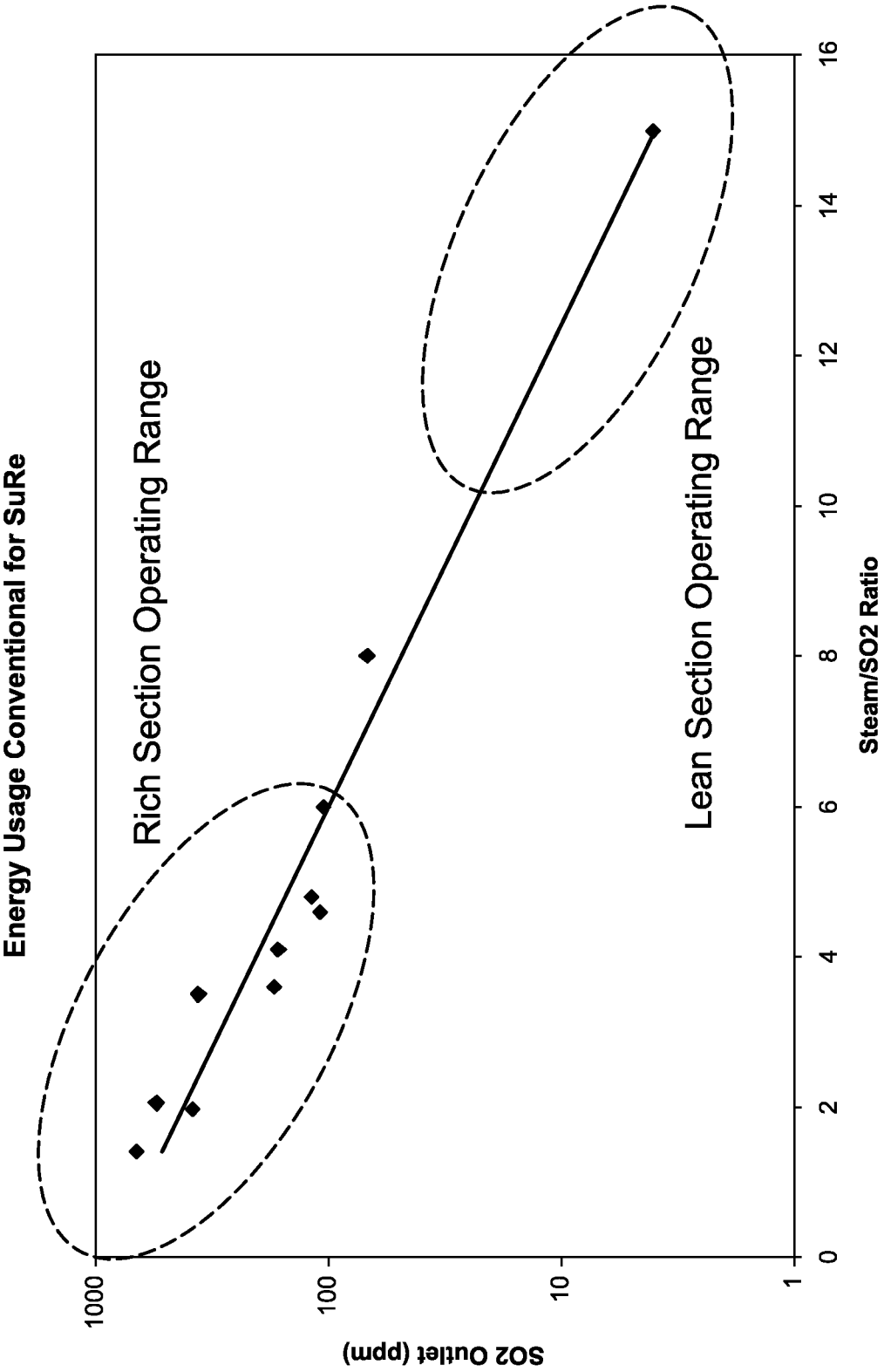
FIG. 11 is a plot similar to that of FIG. 10 but with the residual $SO_2$ content of the exhaust gas plotted on a logarithmic scale.
Figure 12:
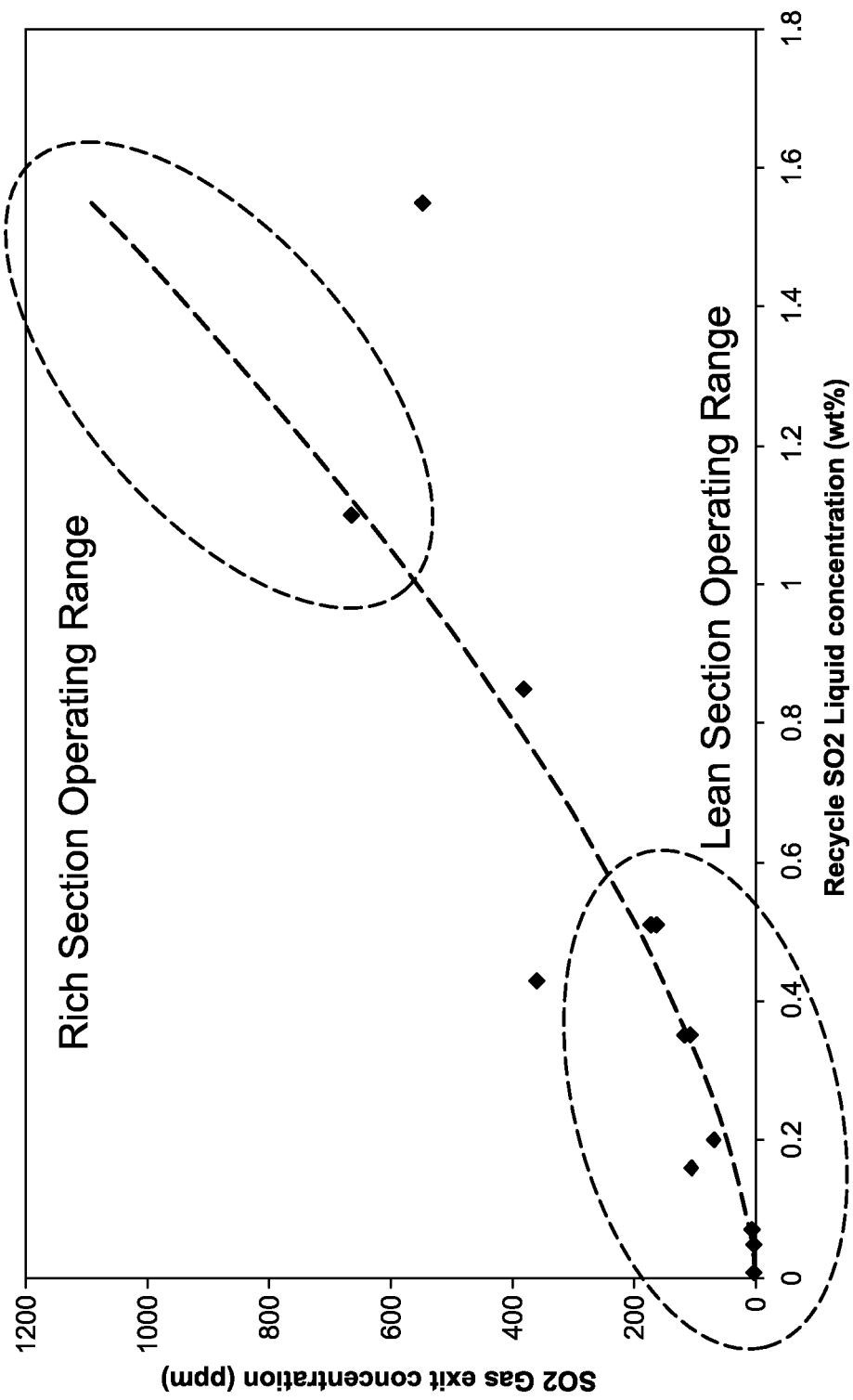
FIG. 12 is a plot which correlates to FIGS. 10 and 11 in which the residual $SO_2$ in the exhaust gas from the absorber is plotted on a log scale as a function of the residual $SO_2$ content of the regenerated absorption medium recycled from the stripper to the absorber, plotted on a linear scale.

FIG. 8 illustrates a system in which substantial energy savings while achieving significantly lower emissions are realized by dividing the contaminant gas absorption duty between two separate absorption and stripping circuits operating in tandem. As described in connection with FIG. 8, the process is applied to the recovery of sulfur dioxide. However, the process is applicable to recovery of other gases subject to absorption in an aqueous system to produce an absorption liquor in which there is a gross difference in volatility between the absorbed gas and solvent, typically water. In such absorption systems, as disclosed in co-pending Ser. No. 13/283,671, the absorption reaction is typically non-zero order. As illustrated in FIGS. 10 and 11, at any given L/G and sorbent to $SO_2$ ratio in the absorber, the residual $SO_2$ concentration in the absorber exhaust gas varies with the rate of steam to the stripper wherein the $SO_2$ is recovered from the absorption liquor. As illustrated in FIG. 12, this is because the residual $SO_2$ concentration in the regenerated absorption medium recycled to the absorber increases as the steam rate to the stripper declines, thereby reducing the driving force for $SO_2$ absorption. Dividing the absorption duty between two absorbers that are in series with respect to gas flow allows the bulk of the sulfur dioxide to be removed from the feed gas at modest L/G and sorbent to $SO_2$ ratios in a first rich gas absorber, producing a lean gas having a sulfur dioxide content that is much reduced, but typically not reduced to a level that satisfies emission standards and/or meets target sulfur yields. The remainder of the sulfur dioxide, down to an acceptable residual design target concentration, may then be removed from the lean gas in a lean gas absorber downstream of the rich gas absorber in the direction of gas flow, again at relatively modest L/G though relatively high sorbent to $SO_2$ ratio.

Referring to FIG. 8, It will be seen that each absorber is associated with a stripper for removing sulfur dioxide from the absorption liquor exiting the absorber. In operation of the process, a feed gas stream 110 comprising the source gas is contacted in the rich gas absorber 101 with an aqueous rich gas absorption medium 103. The bulk of the sulfur dioxide in the feed gas is removed from the gas stream, producing a lean gas 113 containing residual sulfur dioxide and a rich absorption liquor 105 containing sorbed sulfur dioxide. The rich gas absorption liquor is transferred to a rich absorption liquor stripper 107 where sulfur dioxide is stripped from the rich absorption liquor, preferably by contacting the absorption liquor with steam in the stripper. Preferably, the rich gas absorber 101 comprises a column containing a vertical gas/liquid contact zone 101.1 that contains packing, trays, or other means for promoting mass transfer between the gas phase and the liquid phase. Feed gas enters the bottom and lean gas exits the top of the gas/liquid contact zone and is withdrawn through a gas outlet for the absorber, while rich gas aqueous absorption medium enters the top of the zone and rich absorption liquor exits the bottom, i.e., the absorption medium and gas phase flow countercurrently through the zone. Rich absorption liquor 105 exiting the bottom of the rich gas absorption zone is withdrawn via a liquid outlet of the absorber and transferred to a rich absorption liquor stripper 107.

In its passage to the rich liquor stripper 107, the rich gas absorption liquor 105 is preferably preheated by recovery of energy from any of various other process streams, thereby conserving heat introduced into the process in other process operations from which such streams emanate. As a principal example, the absorption liquor may be passed through an interchanger 147 wherein heat is transferred from regenerated rich gas absorption medium 103 being returned from the rich liquor stripper to the rich gas absorber 101. Prior to entry into interchanger 147, the absorption liquor may optionally be passed through another heat exchanger 149 where it is heated by transfer of heat from another convenient source as referenced below.

The rich liquor stripper 107 preferably also comprises a column containing a stripping zone comprising a vertical vapor/liquid contact zone 107.1 that contains packing, trays or other means for promoting mass transfer between the liquid phase and the vapor phase. The stripper preferably also operates countercurrently with the rich absorption liquor introduced into the top of the zone and steam introduced into the bottom. Optionally, in lieu of steam or in addition to steam, the liquid phase may be circulated from or near the bottom of the zone through a reboiler (not shown) that imparts heat to the liquid phase for stripping of sulfur dioxide therefrom. Regenerated rich gas absorption medium 103 exits the bottom of the vapor/liquid contact zone, is withdrawn through a liquid outlet of the rich liquor stripper 107 and recycled to the rich gas absorber 101 for removal of sulfur dioxide from a further flow of feed gas. Advantageously, regenerated rich gas absorption medium is cooled on its return by transfer of heat to rich gas absorption liquor 105 in heat exchanger 147. If sulfate accumulates in the rich gas system absorption medium circuit, it can be removed by cooling a slipstream of the regenerated rich gas absorption medium in a heat exchanger 111 to a temperature sufficient to crystallize sodium sulfate which can then be removed by means of a filter or centrifuge 151.

Lean gas 113 containing $SO_2$ that has not been removed in the rich gas absorber exits the top of the rich gas absorption zone 101.1, is withdrawn from a gas outlet of the rich gas absorber 101, and is directed to the gas inlet of the lean gas absorber 115. The lean gas absorber preferably also comprises a column containing a vertical absorption zone comprising a gas/liquid contact zone 115.1 that contains means for promoting mass transfer such as packing or trays. Lean gas enters the bottom of the gas/liquid contact zone while lean gas absorption medium enters the top of the zone, the gas and liquid phases preferably flowing countercurrently through the zone. Residual sulfur dioxide in the lean gas is removed in the lean gas absorber and transferred to the absorption medium yielding a lean gas absorption liquor 117 that exits the bottom of the lean gas absorption zone 115.1 and is withdrawn from the lean gas absorber 115 through a liquid outlet thereof. A clean gas stream meeting a target specification for an acceptable level of emissions from the process and/or sulfur yield exits the top of the lean gas absorption zone and is withdrawn from the lean gas absorber through a gas outlet thereof. As described above, this gas may be passed through a mist eliminator and heated slightly to suppress the formation of a plume.

Lean absorption liquor 117 is directed to a lean liquor stripper 119. The lean liquor stripper preferably also comprises a column containing a vertical vapor/liquid contact zone 119.1 that contains packing, trays or other means for promoting mass transfer between the liquid phase and the vapor phase. The stripper preferably also operates countercurrently with the lean absorption liquor introduced into the top of the zone and steam introduced into the bottom. Optionally, in lieu of steam or in addition to steam, the liquid phase may be circulated from or near the bottom of the zone through a reboiler 109 which imparts heat to the liquid phase for stripping of sulfur dioxide therefrom. Regenerated lean absorption medium 121 exits the bottom of the vapor/liquid contact zone, is withdrawn through a liquid outlet of the stripper and recycled to the lean gas absorber. In its passage back to lean gas absorber 115, the regenerated lean gas absorption medium may optionally be cooled, e.g., in heat exchanger 153 by transfer of heat to tower water or other convenient cooling fluid. For example, as shown in FIG. 8, heat exchanger 153 may be an interchanger with heat transferred from the regenerated lean gas absorption medium being used to preheat the lean absorption liquor on its passage to the lean liquor stripper.

If and as sodium sulfate accumulates in the regenerated lean gas absorption medium, a purge stream may be diverted to a crystallization and filtration system where the sodium sulfate is removed. A common crystallizer/filter circuit can serve both the rich and lean absorber/stripper circuits. In such case, a purge fraction of the regenerated lean gas absorption medium is preferably blended with a purge fraction of the regenerated rich gas absorption medium that is delivered to the crystallizer. Although a common crystallizer can serve both circuits, separate solvent tanks are maintained for in process storage of the respective regenerated absorption media, adjustment of the pH thereof and makeup of sorbent.

In a preferred process as illustrated in FIG. 8, stripper gas from both strippers may conveniently be combined to provide a stripper process gas 123 that is preferably compressed in a steam ejector or compressor (not shown) and then cooled for condensation of water vapor in a cooler condenser 125. Condensate from the cooler/condenser is directed to a condensate stripper 127 where it is contacted with steam for stripping of residual $SO_2$. Vent gas from cooler/condenser 125 is combined with condensate stripper gas from condensate stripper 127 to produce a final combined stripper gas (wet recovered $SO_2$ stream) 133 that is typically further cooled, e.g., in heat exchangers 135 and 137 and removed from the process. Further aqueous condensate formed by cooling the wet recovered $SO_2$ stream in heat exchangers 135 and 137 is returned to condensate stripper 127. The cooling medium in recovered $SO_2$ cooler/condenser 135 may be, e.g., the exhaust gas from lean gas absorber 115 and the cooling medium in recovered $SO_2$ cooler/condenser 137 may be the pregnant rich gas absorption liquor exiting rich gas absorber 101, in which case heat exchanger 137 and heat exchanger 149 may be one and the same. Heating of the exhaust gas helps prevent formation of plume at the stack while preheating of the absorption liquor conserves energy in the rich liquor stripper. Cooling and condensing water from the recovered $SO_2$ stream helps condition this stream for downstream operations, e.g., it may reduce the load on the drying tower through which the recovered $SO_2$ may be passed before being introduced into the converter of a contact sulfuric acid plant.

In a preferred embodiment of the process as illustrated in FIG. 8, the stripper gas effluent from the lean liquor stripper, which comprises sulfur dioxide essentially saturated with water vapor at the temperature of lean absorption liquor in the top section of the lean liquor stripper, is used as a source of stripping steam for the rich liquor stripper. This flow pattern may be particularly advantageous where the gas stream entering the rich gas absorber has a relatively high $SO_2$ or other contaminant gas content, e.g., greater than about 40 vol. %, preferably greater than about 30 vol. %, more typically between about 0.2 and about 10 vol. %. Where the incoming gas stream has relatively low $SO_2$ content, e.g., less than about 5 wt. %, or between about 0.1 and about 2 vol. %, it may be necessary to provide a separate source of heat to the rich liquor stripper, either indirectly to a reboiler for the rich liquor stripper or directly via live steam injected directly into the stripping column itself.

In another preferred embodiment, live steam 129a from another source, preferably of lower $SO_2$ content than lean stripper process gas 131 and more preferably substantially free of $SO_2$, is introduced into the bottom of gas/liquid contact zone 107.1 within rich liquor stripper 107. In this embodiment, lean stripper gas 131 exiting lean liquor stripper 119 is preferably by-passed around the liquid exit at the bottom of rich liquor stripper gas/liquid contact zone 107.1 and is introduced into zone 107.1 at a point spaced sufficiently above the liquid phase (regenerated absorption medium) exit to enable stripping of $SO_2$ from the liquid phase with steam 129a that enters substantially free of $SO_2$. In this embodiment, the conduit 131a for delivery of lean stripper gas to stripper 107 should be amply sized to minimize pressure drop between the gas phase exit of stripper 119 and the point of entry of the lean stripper gas into rich liquor stripper contact zone 107.1.

In a further optional embodiment, the lean stripper gas 131 can entirely bypass the rich liquor stripper 107 via conduit 131b so that the stripping steam for the rich absorption liquor is substantially free of $SO_2$ other than that transferred from the rich absorption liquor in rich liquor stripping zone 107.1. Rich stripper gas 122 may then be combined with lean stripper gas 131 to form stripper process gas stream 123. Thus, in this embodiment, the two strippers run entirely in parallel rather than in series, but the effluent gases are still combined to form stripper process gas stream 123. To provide flexibility, both stripper 107 and stripper 119 are sized to carry the entirely stripping load in order to maintain operations if one or the other stripping column must be taken out of service. This capability can be of particular importance in high capital facilities that must be reliably operated at high production volumes with minimal process interruption or downtime, e.g., in sulfuric acid mfg. or in desulfurization units of a petroleum refining operation. In such mode of operation, when one of stripping columns must be taken out of service, the operation of the process is converted to a single absorption and stripping circuit in which, e.g., the regenerated absorption medium may be recirculated to the top of absorber 115, the liquid phase exiting absorber 115 may be delivered to the liquid inlet at the top of absorber 101, and absorption liquor exiting absorber 101 may be delivered to the single stripper that is functioning.

In yet another embodiment (not shown), a third stripping column is provided and sized so that any two of the strippers can be operated at one time according to the flowsheet of FIG. 8, with the other on standby service; or, if desired, operated in parallel with stripper 107 or 119 to provide added capacity for stripping either the rich or the lean absorption liquor during high throughput rich/lean operations.

In a further preferred embodiment, condensation of water vapor from a stripper process gas is used to generate stripping steam for one or both of the rich liquor and lean liquor strippers. The stripper process gas may comprise the rich stripper gas effluent from rich liquor stripper 107, the lean stripper gas from lean liquor stripper 119, or, as noted above, a combination of both streams. In a particularly preferred embodiment, as illustrated in FIG. 8, the stripper process gas essentially consists of rich stripper gas 123 drawn from rich liquor stripper 107, which includes $SO_2$ stripped from both the rich liquor and the lean liquor. Alternatively, stripper process gas 123 may be formed by combining rich liquor stripper gas 122 leaving rich liquor stripper 107 with lean liquor stripper gas 131b by-passed around rich liquor stripper 107 and mixed with rich stripper gas 122 downstream of stripper 107 with regard to gas phase flow. The stripper process gas is cooled in stripper process gas cooler 125 to condense water therefrom and provide a condensate that is directed to a condensate stripper 127 operated in essentially the same manner as the condensate stripper of FIGS. 1 and 2. It is also preferred that at least a fraction of the stripped condensate exiting condensate stripper 127 be directed back to the stripper process gas cooler 125 as a cooling fluid for condensing water from the stripper gas. It is still further preferred that the stripper process gas cooler be operated to generate steam from the stripped condensate, and that at least a portion of the steam 129 so generated be directed to one or both of the absorption liquor strippers 107 via conduit 129a and 119 via conduit 129 as a source of stripping steam. In a particularly preferred embodiment, as illustrated by solid flow lines in FIG. 8, the steam 129 generated by heat exchange between the stripper process gas and the stripped condensate in the stripper process gas cooler/condenser 125 is directed primarily to the vapor inlet of the lean liquor stripper 119, and that the source of steam 131 for the rich liquor stripper be primarily drawn from the gas effluent of the lean liquor stripper as further illustrated in FIG. 8. Thus, further energy efficiency is realized. Although, the driving force for desorption in the rich system stripper 107 may not be materially compromised by the small increment in gas phase $SO_2$ content contributed by $SO_2$ stripped in lean liquor stripper 119, any adverse effect can be avoided by directing a portion of the steam generated in cooler/condenser 125 directly to the rich liquor stripper via line 129a and introducing lean stripper gas into the rich liquor stripper at a point spaced above the liquid phase exit from rich liquor stripper zone 107.1.

As also illustrated in FIG. 8, it is further preferred that the stripper process gas 123 exiting the rich liquor stripper be compressed, e.g., via a steam jet ejector 155, to a pressure sufficient that it can be used to generate steam from stripped condensate in the stripper process gas cooler/condenser 125. Conditions of operation of the rich liquor stripper, vapor compression, and the stripper process gas cooler-condenser/stripper condensate boiler are substantially as described above with respect to FIG. 1.

As shown in FIG. 8, stripped condensate stream 139 exiting condensate stripper 127 is directed to a vapor/liquid separator 141 and circulates via line 143 between the separator and cooler/condenser 125 where transfer of heat from the stripper process gas generates steam 129 for lean liquor stripper 119. Stripped condensate and steam are separated in separator 141, the steam 129 is preferably directed to stripper 119, and at least a portion of the stripped condensate circulates to lean liquor stripper gas cooler/condenser 125 via line 143 for conversion to stripping steam. Other portions of the stripped condensate exiting vapor/liquid separator 141 may optionally be recirculated and combined with regenerated lean gas absorption medium 121 or rich gas absorption medium 103 (via line not shown) for return to lean gas absorber 115, rich gas absorber 101 or both, and the remainder of the stripped condensate 145 may be purged from the system.

Alternatively, the stripped condensate side of stripper gas cooler/condenser 125 may be designed to allow disengagement of steam from water within the heat exchanger itself, allowing a steam flow substantially free of entrained water to pass directly from the cooler/condenser to the absorber, without the need for a separate vapor/liquid separator. In this instance, stripped condensate exiting the stripped condensate boiler 125 may be distributed in the same manner as the stripped condensate exiting a vapor/liquid separator, as described above with reference to separator 141.

Steam generated in primary stripper gas cooler/condenser 125 is introduced to stripper 119 via line 129 where it contacts the lean absorption liquor in vapor/liquid contact zone 119.1, both supplying heat to the lean absorption liquor and functioning as a stripping gas for removing sulfur dioxide from the liquid phase. Heating of the liquid phase in the lean absorption liquid stripper reduces the equilibrium concentration of sulfur dioxide in the liquid phase and enhances the driving force for transfer of sulfur dioxide to the vapor phase. In transferring heat to the liquid phase, steam generated from stripped condensate in cooler/condenser 125 partially condenses within the lean liquor stripper, thus functioning essentially as a condensable stripping gas. Optionally, stripping heat supplied by steam generated from stripped condensate in the stripper process gas cooler/condenser may be supplemented by heat supplied from an extraneous source in a reboiler 109 through which liquid phase from the absorption liquor stripper is circulated. The auxiliary reboiler provides full flexibility in the water balance control of the process. Typically, absorption liquor to be passed through the reboiler is withdrawn from a sump of the stripper and returned to the lower portion of the lean liquor stripper vapor/liquid contact zone 119.1 above the sump.

Operation of a system that comprises separate rich gas and lean gas absorption and stripping circuits offers the opportunity for major energy savings by capitalizing on the gross difference in volatility between $SO_2$ and $H_2O$. Thus, the rich gas absorber does not need to achieve quantitative removal of sulfur dioxide, meaning that a relatively modest volume of aqueous rich gas absorption medium and a relatively low equivalents ratio of sorbent to $SO_2$ is effective to remove the bulk of the sulfur dioxide, sufficiently to impose only a modest load on the absorptive capacity of the lean gas absorber. For example, in the case of $SO_2$ absorption in a polyprotic carboxylic acid salt absorbent such as malate, the stoichiometric ratio of the rate at which sorbent is introduced into the rich gas absorber to the rate at which $SO_2$ is introduced into the absorber is preferably not greater than about 0.6, more preferably between about 0.3 and about 0.5. The mass ratio L/G in the rich gas absorber is typically between about 0.1 and about 50, more typically 0.1 to 40, preferably 0.1 to 30. The lower end of these ranges would generally be preferred where the inlet $SO_2$ concentration relatively low to modest, e.g., 5 vol. % while the upper end of the range would be preferred at high $SO_2$ concentration, e.g., 30-40% or higher. Together with the relatively low L/G, the maximum driving force that prevails in the rich gas absorber may typically produce a rich gas absorption liquor containing at least about 0.5 wt. % $SO_2$, more typically between about 0.8 and about 15 wt. % $SO_2$. Similar process parameters apply for $SO_2$ sorbents other than malate, and for sorption of other acid gases such as $CO_2$, $NO_x$, $H_2S$, or HCl, as well as for other absorbable gases such as $NH_3$.

Because the rich gas absorption liquor is relatively concentrated, $SO_2$ is readily recovered in the rich liquor stripper with only modest consumption of steam. For several reasons, only a relatively low steam to absorption liquid flow ratio is required in the rich liquor stripper. The relatively high sulfur dioxide concentration in the rich absorption liquor increases the equilibrium sulfur dioxide partial pressure in the vapor phase of the rich liquor stripper and thus favors mass transfer to the vapor phase. At the same time, because the lean gas exiting the rich liquor absorber can be cleaned up in the lean liquor absorber, a relatively high residual concentration of sulfur dioxide in the regenerated rich gas absorption medium can be tolerated. Given the gross difference in volatility between water and sulfur dioxide, only a relatively small ratio of steam to rich absorption liquor is necessary to achieve near quantitative removal of the $SO_2$ down to a level that has no material impact on the requisite $SO_2$ absorption capacity of the desorbed solvent returned to the rich gas $SO_2$ absorber. Thus, for example, the mass ratio of steam to $SO_2$ introduced into the rich liquor stripper may be controlled at a value no greater than about 8, more typically between about 0.2 and about 8, still more typically between about 0.3 and about 6, preferably between about 0.3 and about 4. This equates to substantially the same ratios of steam to $SO_2$ entering the rich liquor absorber. In the rich liquor stripper, the residual $SO_2$ concentration in the regenerated absorption medium is typically reduced to a level no lower than about 0.02 wt. %, or between about 0.02 wt. % and about 1.5 wt. %, or between about 0.02 wt. % and about 0.5 wt. % or between about 0.03 wt. % and about 0.3 wt. % where the $SO_2$ content of the source gas is less than 4%. At higher $SO_2$ content in the feed gas, the $SO_2$ content of the regenerated absorption medium may fall in a substantially higher range, e.g., at least about 0.3 wt. %, or between about 0.2 and about 8 wt. %, or between about 0.4 and about 7 wt. %, or between about 0.5 and about 6 wt. %, or between about 0.8 and about 15 wt. %.

Even under the relative coarse conditions maintained in the rich gas absorber, a high proportion, e.g., at least 85%, or more typically 90%, 95% or even 99% of the sum of the gases removed by the combined operation of the rich gas and lean gas absorbers can be removed in the rich gas absorber alone, and essentially identical proportions of the total incoming contaminant gas content can also be removed in the rich gas absorber. For example, in the case of $SO_2$ absorption in a malate or tetraglyme sorbent solution, the lean gas exiting the rich gas absorber typically contains no more than about 0.5 vol. %, more typically no more than about 0.4 vol. %, preferably between about 0.01 and about 0.3 vol. %, more preferably not more than about 2,000, and most preferably between about 100 and about 1,500 ppm $SO_2$ by volume. It should be understood that lowering the $SO_2$ level too far in the rich gas absorber may require reducing the $SO_2$ content of the regenerated rich gas absorption medium to very low level that is not needed for overall process efficiency, but which requires a more than optimal consumption of steam in the rich liquor stripper.

The $SO_2$ content of the rich stripper gas exiting the rich liquor stripper is preferably at least 15%, more preferably at least about 20%, still more preferably at least about 25% by volume. The rich stripper gas may typically contain between 10% and about 60%, or between 20% and 50%, or preferably between about 25% and about 40% $SO_2$ by volume. By way of further example, the $SO_2$ content of the rich stripper gas can be correlated to the $SO_2$ content of the feed gas to the rich gas absorber and the $SO_2$ content of the regenerated absorption medium. Thus, where the sulfur dioxide content of the feed gas is between about 1000 ppm and about 4000 ppm and the sulfur dioxide content of the regenerated rich gas absorption medium is between about 0.5 and about 2 wt. %, the sulfur dioxide content of the rich stripper gas effluent from the rich liquor stripper is between about 25% and about 45% by volume, which corresponds to a water vapor load substantially lower than the water vapor load in the stripper gas generated in a single absorber/stripper circuit. Taking another example, where the $SO_2$ content of the feed gas is much higher, i.e., about 40 vol. %, and the $SO_2$ content of the regenerated rich gas absorption medium is between about 1.5 and about 8.0 wt. %, the sulfur dioxide content of the rich stripper gas effluent from the rich liquor stripper is between about 40% and about 60% by volume. Such relatively high residual levels of sulfur dioxide in the regenerated rich gas absorption medium do not adversely impact the capability of the regenerated absorption medium to remove a high proportion of the $SO_2$ entering the process in the source gas and feed gas.

A higher ratio of sorbent to $SO_2$ may be required in the lean gas absorber than in the rich gas absorber in order to satisfy emissions specifications or meet sulfur yield targets, but the mass ratio L/G in the lean gas absorber is generally no higher than it would be in a single absorber as described in Ser. No. 13/283,671, e.g., not greater than about 0.8, between about 0.02 and about 0.6, between about 0.4 and about 0.4, 0.05 and about 0.3, more preferably between about 0.08 and about 0.25, or between about 0.1 and about 0.2. But where the feed gas has a high $SO_2$ content, e.g., 30-40% or higher, the mass ratio 4G in the lean gas absorber may be as high as 2.5 or higher. A relatively high equivalents ratio of sorbent to $SO_2$ is also typically required in the lean gas absorber, e.g., between about 1 and about 6, more typically between about 2 and about 4, but since the bulk of the $SO_2$ has already been removed in the rich gas absorber, neither the L/G nor the absolute sorbent flow to the lean gas absorber need be any higher, and can in general be significantly lower, than what are required for a absorber in a process based on a single absorber/stripper circuit. Thus, the stoichiometric ratio of the rate of introduction of sorbent into the lean gas absorber relative to the rate at which sulfur dioxide is introduced into the rich gas absorber is generally not more than about 0.8, preferably between about 0.02 and about 0.6, more preferably between about 0.04 and about 0.4. Even at these low sorbent flows, the sulfur dioxide content of the lean absorption liquor exiting the absorber is typically not greater than about 10 wt. %, or not greater than about 9 wt. %, or not greater than about 8 wt. %, or not greater than about 7 wt. % or not greater than about 6 wt. %, or not greater than about 5 wt. %, or not greater than about 4.5 wt. %, or not greater than about 4 wt. % typically between about 0.1 and about 8%, or between about 0.1% and about 5% by weight.

It is important to reduce the sulfur dioxide content of the regenerated lean gas absorption medium to a low level in order to assure a sufficient mass transfer and reaction equilibrium driving force for absorption in the lean gas absorber so that emission standards and/or yield targets are met, and therefore a high steam to liquid phase ratio is required to strip residual $SO_2$ from the lean absorption liquor. Preferably, the residual sulfur dioxide content of the regenerated lean gas absorption medium is between about 100 ppb and about 0.5 wt. %, or between about 500 ppb and about 0.2 wt. %, or between about 700 ppb and about 500 ppm. It is more particularly preferred that $SO_2$ content of the regenerated lean gas absorption medium be less than about 500 ppm, or less than about 100 ppm, more preferably less than about 50 ppm, still more preferably less than about 10 ppm by weight, typically 0.1 to 25 or 0.1 to 10 ppm by weight.

In the process of FIG. 8 wherein the lean liquor stripper $SO_2$ serves as the steam supply to the rich liquor stripper, the ratio of steam to lean absorption liquor fed to the lean liquor stripper is between about 0.05 and about 0.8, more typically between about 0.1 and about 0.5. Lower steam to lean liquor ratios may be sufficient where an independent steam supply is provided to the rich liquor stripper. This still affords a high ratio of steam to $SO_2$ in the lean liquor stripper, but because the sulfur dioxide load on the lean liquor stripper is very low, the steam load in the lean absorption liquor stripper remains low as a function of the sulfur dioxide flow into the system with the source gas and feed gas.

Generally, the $SO_2$ content of the lean stripper gas is between about 0.1% and about 10%, or between about 0.2% and about 6% by volume.

Vapor effluents (stripper gas) from the rich absorption liquor stripper and the lean absorption liquor stripper are advantageously combined either before or after condensation to generate a single condensate stream for transfer to the condensate stripper. However, the two streams can be separately fed to the condensate stripper, or even fed to separate strippers, if desired.

Although a relatively high steam to $SO_2$ ratio is required to strip residual $SO_2$ from the lean absorption liquor, the low volume of $SO_2$ to be removed from the lean liquor requires only a modest flow of stripping steam relative to the flow of lean absorption liquor and, as noted above, a low ratio to the sulfur dioxide load in the incoming feed gas to the rich gas absorber. Moreover, the flow volume of lean absorption liquor is also relatively low given the relatively minimal absorption load that remains after the $SO_2$ has been nearly quantitatively removed in the rich gas absorber. Because of the high residual $SO_2$ levels that may be tolerated in the regenerated rich gas absorption medium exiting the rich liquor stripper, together with the relatively low volumetric flow rate of lean gas absorption medium, the total steam demand for the combined operation of the two strippers is significantly lower than the steam demand for the absorption liquor stripper in a process utilizing only a single absorber/stripper circuit for the same emissions.

Thus, the total flow of condensate is modest, and the load on the condensate stripper(s) is correspondingly modest. The resulting low steam demand in the condensate stripper, together with the reduced net steam demand of the tandem rich and lean absorption and stripping circuits, results in the production of a final combined stripper gas (wet recovered $SO_2$ stream) having a relatively high $SO_2$ content. Because of the higher $SO_2$ to water ratio in the stripper process gas as compared to the stripper gas from a process having only a single absorber/stripper circuit, the equilibrium $SO_2$ content of the condensate may be marginally higher than the $SO_2$ content of the condensate from the single circuit process. High sulfur yield may still be assured by stripping the condensate from the stripper process gas cooler/condenser at a marginally higher steam to water ratio in the water column (condensate stripper), but even where this ratio is relatively high, any incremental increase in steam flow rate to the condensate stripper is much less than the incremental reduction in steam flow realized by obviating the need to attain quantitative removal of $SO_2$ from the solvent liquor flowing through the rich absorption liquor stripper. By capitalizing on the gross difference in volatility between water and $SO_2$, the overall steam demand of the process, including stripping steam for the rich liquor stripper, stripping steam for the lean liquor stripper, stripping steam for the condensate stripper, and steam to a jet ejector for compressing the stripper process gas relative to the sulfur dioxide content of the feed gas is generally not more than 15 lbs/lb. $SO_2$ or preferably between about 5 and about 10 lbs./lb. $SO_2$ at an $SO_2$ level of 1000 to 2000 ppm in the feed gas to the rich gas absorber, not more than 8 lbs./lb. $SO_2$ or preferably between about 1.5 and about 5 lbs./lb. $SO_2$ at an $SO_2$ level of 2000 ppm to 2 vol. % in the gas, not more than 4 lbs./lb. $SO_2$ or preferably between about 0.8 and about 3 lbs./lb. $SO_2$ at an $SO_2$ level of 2 to 4 vol. % in the gas, and not more than 3 lbs./lb. $SO_2$ or preferably between about 0.5 and about 2.5 lbs./lb. $SO_2$ at an $SO_2$ level greater than 4 vol. %. Additional steam may be required by the crystallizer for removing sulfate from regenerated absorption media, but this increment should be substantially the same in a rich/lean system as in a conventional single absorption/stripping system. At these rates of steam demand, the tandem rich/lean system can lower the $SO_2$ content of the exhaust gas from the lean gas absorber to ≤20 ppm, or even ≥10 ppm. Compression of the stripper process gas may enable even further reduction in these emission levels.

The energy saving principles discussed above may be summarized and elaborated as follows. Because of the relatively low steam flow rate required for the rich liquor stripper, the vapor effluent from the rich liquor stripper has a higher $SO_2$ content than the vapor effluent from a single absorber/stripper system which must be operated to achieve a lower steady state $SO_2$ content in the regenerated absorption medium. Because of the relatively small fraction of $SO_2$ remaining to be removed in the lean liquor stripper, and the modest volume of lean gas absorption liquor flow, the energy and steam flow demands of the lean liquor stripper are also low. Thus, the $SO_2$ content of combined gas effluents from the two absorption liquor strippers (which functions in FIG. 8 as the stripper process gas) is also higher than the vapor effluent from the single stripper system, as is the $SO_2$ content of the rich liquor stripper gas effluent even where the gas effluent from the lean liquor stripper is all directed to the vapor inlet of the rich liquor stripper, and the lean stripper gas is used as the source of stripping steam for the rich liquor stripper, as in the preferred embodiment illustrated in FIG. 8. This scheme recovers the further increment of $SO_2$ that is removed from the gas stream in the lean gas absorber 115, and achieves further energy efficiency by using the vapor component of the gas/vapor effluent from the lean liquor stripper as the stripping gas for the rich liquor stripper. The further increment of $SO_2$ that had been removed from the lean gas stream in the lean system absorber is removed from the lean liquor in the lean gas stripper and passes through the rich system stripper for ultimate recovery, e.g., as vent gas from the cooler/condenser 125.

Because of the resultant economy in steam consumption in stripping the rich and lean absorption liquor streams, the condensate obtained upon cooling the combined vapor effluents has a correspondingly high $SO_2$ content. As noted, this may require a somewhat higher ratio of steam flow to condensate flow in condensate stripper 129 than in the single absorber/stripper circuit process illustrated in FIG. 1. However, because of the relatively low volume of condensate in the process of FIG. 8, and the gross difference in volatility between $SO_2$ and water, $SO_2$ is still readily removed from the condensate at a steam flow that is low relative to the flow of feed gas and the $SO_2$ content thereof. Thermal compression of overheads vapor further contributes to energy efficiency. As illustrated in FIG. 8, the stripper process gas is compressed in a steam jet ejector 155, preferably increasing the stripper process gas pressure by between about 12 and about 18 psi above the pressure at the top of the rich liquor stripper which is preferably between about 16 and about 20 psia.

FIGS. 10 to 12 illustrate the capability of achieving 85-90% recovery of $SO_2$ in the rich gas system stripper at a modest steam consumption of 5-10 lbs. steam per pound $SO_2$ while achieving quantitative $SO_2$ recovery in the lean system stripper at a significantly higher steam to $SO_2$ ratio but at a much lower absolute rate of steam consumption. FIGS. 10 to 12 all reflect operation of a process in which $SO_2$ is removed from a feed gas containing 0.24% vol. % $SO_2$ in a single absorber/stripper circuit. FIG. 10 is a linear plot of the residual $SO_2$ in the exhaust gas from the absorber as a function of the ratio of steam fed to the stripper to the $SO_2$ entering the absorber, while FIG. 11 plots the residual $SO_2$ on a log scale vs. the steam to $SO_2$ ratio on a linear scale. FIG. 12 plots residual $SO_2$ in the exhaust gas as a function of the $SO_2$ content of the absorption medium, a variable inversely correlated to the steam/$SO_2$ ratio on the abscissa of FIGS. 10 and 11. Both parameters of FIG. 10 are on a linear scale. The three plots demonstrate that: (i) a large fraction of $SO_2$ can be removed at low expenditure of steam in a process consisting of a single absorber/stripper circuit, but this still leaves an unacceptably high concentration of $SO_2$ in the exhaust gas; (ii) a very high expenditure of steam per unit of incoming $SO_2$ is necessary in a single absorber/stripper circuit system to bring the $SO_2$ content of the exhaust gas down to level acceptable according to typical emissions standards; and (iii) these phenomena reflect the non-zero order nature of the absorption reaction and stripping operation.

By comparison, major efficiencies in steam and energy consumption are achieved in the process of FIG. 8 wherein the absorption load is divided between a rich gas absorber/stripper circuit, operated at low ratio of steam delivered to the rich liquor stripper relative to $SO_2$ entering the rich gas absorber in the feed gas, and a lean gas absorber/stripper circuit operating at a high ratio of steam delivered to the lean liquor stripper relative to the $SO_2$ content of the lean gas flowing from the exit of the rich gas absorber to the inlet of the lean gas absorber. FIGS. 10 and 11 confirm and graphically illustrate that, because a high though relatively rough fraction of the incoming sulfur dioxide is removed in the rich gas absorber, a relatively high $SO_2$ content can be allowed to remain in the regenerated rich gas absorption medium returned to the rich gas absorber, thus allowing the rich liquor stripper to be operated at a relatively low steam to incoming $SO_2$ ratio, affording net conservation of steam in this circuit. Because only a very minor fraction of the incoming $SO_2$ remains to be removed in the lean liquor stripper, even at very modest efficiency in the operation of the rich gas absorber, the $SO_2$ removal load on the lean liquor stripper is very low. While a high ratio of steam to the $SO_2$ content of the lean gas and the lean absorption liquor is required to provide a regenerated lean gas absorption medium capable of achieving emission standards and/or target sulfur yields by removal of residual $SO_2$ in the lean gas absorber, the absolute rate of requisite steam flow to the lean liquor stripper is low because of the very low $SO_2$ load imposed on the lean absorber/stripper circuit. This translates into a low mass flow rate of lean gas absorption medium to the lean gas absorber, a correspondingly modest to low steam rate to the lean liquor stripper, and a low ratio of total steam consumption relative to the $SO_2$ content of the incoming feed gas entering the rich gas absorber.

Thus, for example, to reduce the $SO_2$ content to 100-200 ppm in the lean gas 113 in the process illustrated in FIG. 8, the requisite ratio of steam entering the rich liquor stripper to $SO_2$ entering the rich gas absorber is between about 4 and about 15 preferably between about 5 and about 10 lbs. steam/lb. $SO_2$ at an $SO_2$ level of 1000 to 2000 ppm in the feed gas to the rich gas absorber, between about 2 and about 8 lbs steam/lb. $SO_2$ at an $SO_2$ level of 2000 ppm to 2 vol. % in the feed gas, between about 1 and about 4 lbs. steam/lb. $SO_2$ at an $SO_2$ level of 2 vol. % to 4 vol. % in the feed gas, and about 1 to about 3 lbs steam/lb. $SO_2$ at an $SO_2$ level greater than 4 vol. % in the feed gas. In order to reduce the $SO_2$ content of lean gas 113 from 200 ppm to achieve a typical emission standard of 50 ppm in the exhaust gas 18 from the lean gas absorber, the ratio of steam entering the lean liquor stripper to $SO_2$ entering the lean gas absorber is much higher than the corresponding ratio in the rich gas absorber stripper circuit. For example, the lean liquor stripper steam demand is typically at least about 15 lbs. per lb. $SO_2$ in the lean gas, e.g., between about 15 and about 100, more typically between about 10 and about 80 lbs. steam/lb. lean gas $SO_2$ at an $SO_2$ level of 200 ppm in the lean gas to the lean gas absorber, or between about 20 and about 120 lbs steam/lb. $SO_2$ at an $SO_2$ level of 100 ppm in the lean gas. However, because of the very low $SO_2$ content of the lean gas, the requisite flow rate of absorption medium to the lean gas absorber is relatively low, and the net steam demand in the lean liquor stripper is still very modest, both in absolute terms and as a function of the $SO_2$ content of the feed gas entering the rich gas absorber, i.e., between about 0.2 and about 5, more typically between about 0.2 and about 3 lbs. per pound $SO_2$ in the feed gas.

Moreover, especially where the lean liquor stripper gas 131 is directed to the rich liquor stripper to function as stripping steam for the rich absorption liquor, and the stripper gas exiting the rich liquor stripper functions as the stripper process gas that provides the energy for generating the stripping steam in stripper process gas cooler 125, the net total steam demand is no greater than the steam demand for the rich gas stripper alone, i.e., between about 4 and about 14 lbs./per lb. $SO_2$ at an $SO_2$ level of 1000 to 2000 ppm in the feed gas to the rich gas absorber, between about 2 and about 8 lbs/lb. $SO_2$ at an $SO_2$ level of 2000 ppm to 2 vol. % in the feed gas, between about 1 and about 4 lbs./lb. $SO_2$ at an $SO_2$ level of 2 vol. % to 4 vol. % in the feed gas, and between about 1 and about 3 lbs/lb. $SO_2$ at an $SO_2$ level greater than 4 vol. % in the feed gas.

More generally, the $SO_2$ or other contaminant gas content of the gas stream is reduced by one to three orders of magnitude in the rich gas absorber and another one to three orders of magnitude in the lean gas absorber, resulting in an overall reduction of three to six orders of magnitude through the rich/lean absorption system. Steam consumption varies only modestly with respect to the extent to which the contaminant gas content of the gas stream is reduced. At low concentrations of $SO_2$ in the feed gas, e.g., 1000 to 2000 ppm, the steam demand for reducing the $SO_2$ content by 3 to 5 orders of magnitude ranges between 5 and about 15, or between about 7 and about 12 lbs./lb. $SO_2$ removed; at a somewhat higher concentration in the feed gas, i.e., 2000 ppm to 2 vol. %, the steam demand for the same proportionate reduction in $SO_2$ content varies between about 3 and about 10, or between about 3 and about 8 lbs./lb. $SO_2$ removed; at a concentration of 2 to 4 vol. % $SO_2$ in the feed gas, the same proportionate reduction requires between about 2 and about 4 or between about 2.5 and about 4 lbs. steam/lb. $SO_2$ removed; at 4 to 20 vol. % $SO_2$ in the feed gas, the steam demand falls in the range of between about 1 and about 3.5, or between about 2 and about 3.5 lbs./lb. $SO_2$ removed; at 20 to 40 vol. % $SO_2$ in the feed gas, the steam requirement is between about 1 and about 3, or between about 0.8 and about 2.5 lbs./lb. $SO_2$ removed; and at 40 vol. % $SO_2$ in the feed gas, the steam demand is only 0.8 to 2.5 or between about 0.5 and about 2.5 lbs./lb. $SO_2$ removed. In each case, the recovered $SO_2$ stream has an $SO_2$ content ranging from 2 to 20× or more relative to the concentration of $SO_2$ in the feed gas. For typical $SO_2$-bearing waste streams such as the tail gas from a double absorption contact sulfuric acid plant, the rich/lean process using malate sorbent can economically yield an exhaust gas from the lean absorber having a residual $SO_2$ content <5 ppmv, or even <1 ppmv.

As indicated above the net (total) steam demand includes the sum of all steam supplied to the process from extraneous sources, including: (i) stripping steam for the rich liquor stripper; (ii) stripping steam for the lean liquor stripper; (iii) stripping steam for the condensate obtained in cooling the stripper process gas; and (iv) steam for a jet ejector for compressing the stripper process gas between the exit of the absorption liquor stripper(s) and the stripper process gas cooler/condenser which functions as a boiler for generating absorption liquor stripping steam, and/or a jet ejector for compressing the steam generated from stripped condensate in the stripper process gas cooler/condenser for use as stripping steam in one or more absorption liquor strippers.

Figure 9:
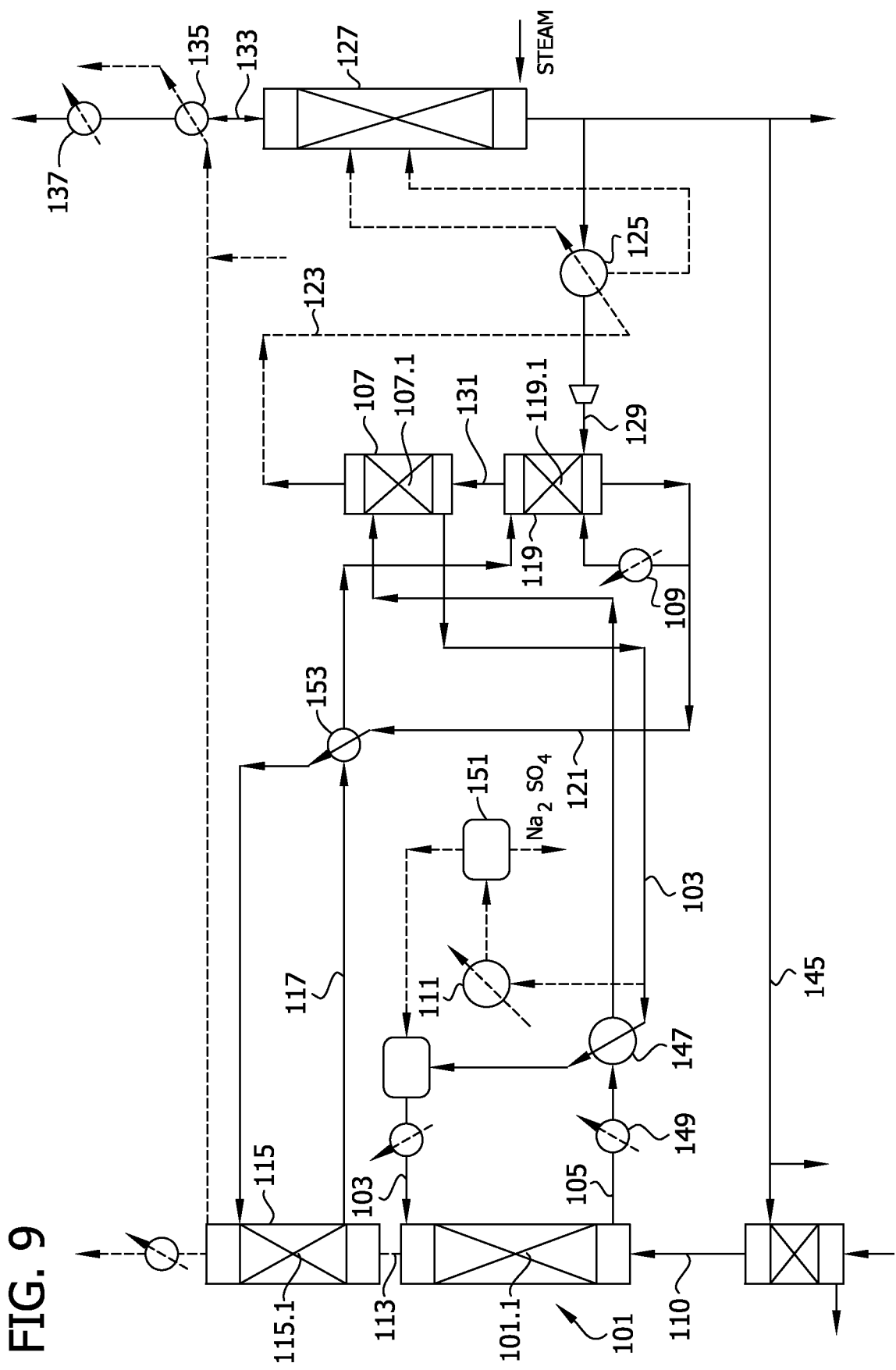

FIG. 9 illustrates a process which operates on exactly the same principle, according to the same parameters, based on the same flowsheet, and using the same equipment as depicted and described in FIG. 8, except that, rather than compressing the stripper process gas as illustrated in FIG. 8, the process of FIG. 9 instead compresses the steam generated in the stripper process gas cooler/condenser 125 in a manner exactly comparable to the process of FIG. 2 as described hereinabove. With respect to both FIG. 2 and FIG. 9, one skilled in the art will understand that, while compression of the steam is an alternative to compression of the stripper gas, the two are not mutually exclusive. Thus, the present invention includes a hybrid system combining the stripper gas compression of FIGS. 1 and 8 with the steam compression of FIGS. 2 and 9.

Tandem rich/lean absorption/stripping circuits provide the greatest advantage where the absorption step comprises a chemical reaction, more particularly where the absorption reaction is non-zero order, resulting in non-linear operating lines (liquid and gas $SO_2$ content profiles along the fluid flow paths through the absorber) with an especially sharp slope in the region of the absorber near the gas inlet as indirectly illustrated, e.g., in FIGS. 10 and 11. The tandem process can also be used in sorption processes that do not involve chemical reaction, but in most of these the absorber operating line is more linear and savings in steam consumption not as great.

Based on the disclosure provided herein, those skilled in the art will recognize that absorption and recovery of a contaminant gas may be conducted in a process comprising more than two absorption/stripping circuits in tandem. In many if not most instances, the incremental steam savings achievable in this manner may fail to justify the additional capital investment required. However, where the concentration of contaminant in the source gas is especially high and the departure from zero order in the absorption reaction is especially great, the use of three or even more absorber/stripper circuits in tandem may be worthwhile. Routing of steam/stripper gas stream in series from the lean-most to progressively richer liquor strippers may provide an additional advantage, though heat losses may, as a practical matter require supplemental steam.

Other process flowsheets can be implemented in accordance with the principles on which the rich/lean process of the invention is predicated.

In implementation of the rich/lean absorption concept, the process as described above operates at a relatively low L/G and typically also at a relatively low sorbent to inlet contaminant gas ratio in the rich gas absorber, thus resulting in relatively high concentrations of contaminant in the rich absorption liquor. High contaminant concentration in the liquid phase provides a substantial driving force for desorption in the rich liquor stripper, and thereby conduces to substantial recovery of contaminant gas at a relatively low ratio of stripping steam to contaminant gas entering the absorber.

Where the sorption comprises an acid/base reaction, another variable which affects the equilibrium distribution of contaminant between the liquid phase and the vapor phase in the rich liquor stripper is the pH of the rich absorption liquor. As applied to sorption of acid gases, it will be understood that "acid/base" reactions include reaction between an acid gas and a sorbent which may not necessarily be alkaline, but which has a $pK_a$ substantially higher than the $pK_a$ of the acid of which the contaminant gas is the anhydride, or to a reaction between a nucleophilic gas and a sorbent that may not necessarily be acidic but which has a $pK_a$ lower than an alkaline solution of which the contaminant nucleophile is the anhydride. Adjustment of pH applies to such reactions as well.

For example, in the sorption of $SO_2$ using a sorbent such as malic acid or malate salt, the pH of the rich absorption liquor affects the equilibrium distribution of $SO_2$ between the liquid phase and the vapor phase in the rich liquor stripper. As the pH decreases, the equilibrium is altered to distribute a relatively higher fraction of $SO_2$ to the gas phase at a given concentration of $SO_2$ and sorbent in the liquid phase. Thus, at any given inlet gas composition, L/G, and sorbent to $SO_2$ ratio in the absorber, the consumption of steam required to remove and recover a given fraction of the $SO_2$ in the rich liquor stripper varies directly with the pH of the rich absorption liquor exiting the absorber and entering the stripper, as does the steam consumption required to achieve an inversely correlative concentration of $SO_2$ in the lean gas stream exiting the rich gas absorber.

Figure 14:
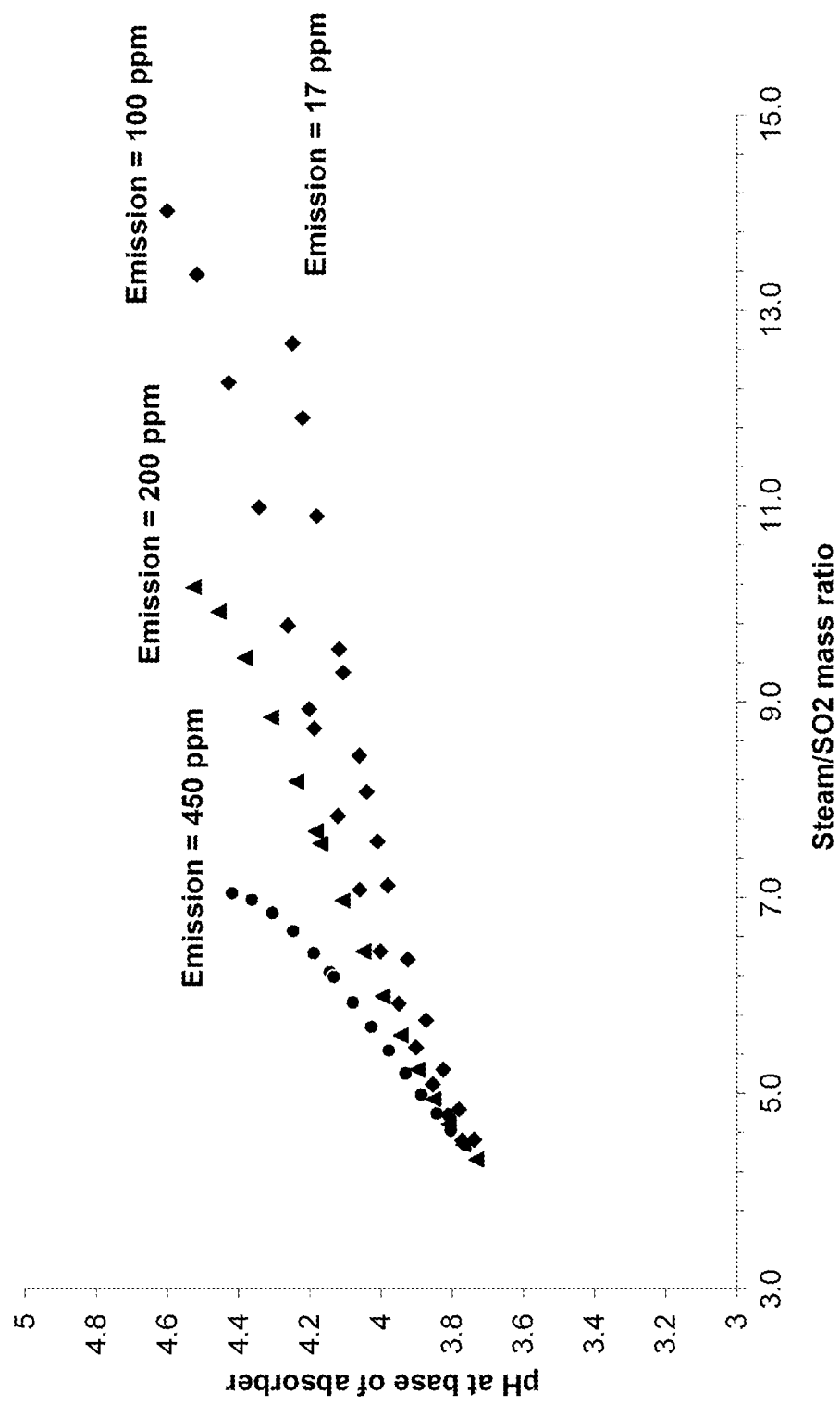
FIG. 14 is a plot of the effect of pH at the base of a malate $SO_2$ absorber on steam usage required to recover $SO_2$ in a process comprising a single absorber/stripper circuit while maintaining each of several discrete levels of emissions in absorber exhaust gas where the $SO_2$ content of the feed gas is 0.24 vol. % and the stripped absorption liquor is recycled to the absorber as the $SO_2$ absorption medium.

This effect is illustrated in FIG. 14. The curve defined by the circle data points illustrates the relationship between pH of the absorption liquor exiting the absorber vs. the steam consumed in the stripper to remove sufficient $SO_2$ from the regenerated absorption liquor so that the lean gas exiting the rich gas absorber has an $SO_2$ content of 450 ppm by volume. The curve defined by the triangular data points plots, as a function of pH, the steam/$SO_2$ ratio required to reduce the $SO_2$ content of lean gas stream to 200 ppm, the curve defined by the diamond-shaped data points plots steam/$SO_2$ ratio vs. pH required to reduce the $SO_2$ content of lean gas stream to 100 ppm, and the curve defined by the star-shaped data points plots steam/$SO_2$ ratio vs. pH required to reduce the $SO_2$ content of lean gas stream to 17 ppm. Based on the relationships illustrated in the data plots of FIG. 14, the pH of the absorption medium can be optimized in either an absorption system wherein rich and lean absorption and stripper circuits operate in tandem, or in a standard absorption system comprising a single absorber and stripper.

In a process consisting of only a single absorption and stripping circuit, the beneficial effect of lower pH in the rich absorption liquor on the efficiency of the stripper comes with a price since it ordinarily correlates with lower pH in the regenerated absorption medium entering the absorber, at least in the absence of measures to independently control pH by introduction of acid within the absorber and an offsetting increment of base into the regenerated absorption medium returned to the absorber. Lower pH in the regenerated absorption medium marginally reduces the absorption efficiency in the rich gas absorber. Preservation of absorption efficiency by independently controlling pH in the upper and lower sections of the absorber is feasible and within the scope of the invention as an optional mode of operation, but it also comes with a price in consumption of acid and alkaline materials used for pH adjustment.

The plots depicted in FIG. 14 do not reflect independent pH adjustment but instead subsume the favorable effect of lower pH on stripping efficiency and the lesser negative effect on absorption efficiency. Thus, in accordance with the invention, it has been found that, within optimal ranges as indicated by FIG. 14, the pH can be allowed to adjust to a level at which the beneficial effect on steam consumption in the rich liquor stripper outweighs the negative effect of lesser absorption efficiency in the rich gas absorber, and the benefit achieved by causing the pH to line out at the preferred value without addition of acid to the absorber or offsetting increment of base to the regenerated absorption medium. For example, for an absorber emission target of 200 ppm, requisite steam consumption per unit mass of $SO_2$ can be reduced from >10:1 to the neighborhood of 7:1 by adjusting the steady state pH of the absorption medium at the lower end of the absorber from a value of 4.5 to a value of 4.0. Even greater economies can be theoretically achieved by allowing the steady state pH to adjust to a value in the range of 3.6 to 3.8. The convergence of curves indicates that, in a single absorption and stripping circuit, it may be necessary to substantially escalate the solvent flow in order to assure adequate removal of $SO_2$ in the absorber while taking advantage of the indicated relationship by reducing the pH to a level at which the requisite steam/$SO_2$ ratio drops significantly below about 7 for the particular system on which FIG. 14 is based. However, in a rich/lean system, the lean gas absorber may operate stably at constant L/G and sorbent content of the absorption medium even at inlet contaminant gas content randomly varying within a range defined by other values indicated by FIG. 14.

Thus, while optimization of pH can yield benefits in steam consumption in a process comprising a single absorber/stripper circuit, substantial added advantage of the relationships illustrated in FIG. 14 can be gained in a process having rich and lean absorber/stripper circuits in tandem, as shown, e.g., in FIG. 8. In the single absorption/stripping circuit system from which FIG. 14 is derived, the pH of the lower end of the absorber can be established or allowed to adjust to a value in the neighborhood of 4.0 to 4.2 and the steam to the stripper set at a ratio to incoming $SO_2$ in a range that varies depending on the $SO_2$ content of the feed gas and the target level of emissions, but may typically be in the range of 2 to 10 lbs./lb. $SO_2$. In this mode of operation, the precise level of residual $SO_2$ in the lean gas stream may be somewhat volatile, but volatile within a relatively low range from which the lean gas absorber can further reduce the $SO_2$ content to exceptionally low levels that satisfy the most stringent environmental regulation.

The specific relationship between pH and contaminant gas emissions as illustrated in FIG. 14 is specific to sorption of $SO_2$ using a sorbent comprising malic acid or malate salt. However, similar relationships can apply to other sorption systems that comprise an acid/base reaction such as, e.g., the recovery of $H_2S$ using an amine sorbent or the recovery of ammonia using an acidic sorbent. In the case of ammonia, steam consumption may be reduced by a marginal increase rather than a decrease in the pH of the absorption medium.

As noted, the concept of pH adjustment can be applied to optimizing operation of an absorption system comprising an acid/base sorption reaction in a single absorber and stripper circuit. In either a single circuit or the rich gas absorption stripping circuit of a rich/lean system, the pH of the absorption medium in the absorber is adjusted to a value differing from the pH which affords the most favorable equilibrium for absorption but at which steam consumption in the stripper for reducing the contaminant gas content of the regenerated absorption medium to a target level is lower than the steam consumption for reducing the contaminant gas content of the regenerated absorption medium to such level in a comparative operation wherein the pH of the absorption medium is maintained at a value which affords the most favorable equilibrium for absorption. As a result, the contaminant gas content of the gas exiting the absorber may not be significantly higher, and for certain acid/base systems no higher, than the contaminant content of the exit gas in the comparative system.

Preferably, the gas stream flows countercurrently to the gas absorption medium stream in the gas absorber, and the pH of the absorption medium at the base of the absorber is adjusted to a value differing from the pH that affords the most favorable equilibrium for absorption. More generally, the pH is adjusted to the desired value in a region of the absorber from which the absorption liquor is withdrawn. Routine optimization can identify a pH for such region at which the benefit of reduced steam consumption exceeds any penalty resulting from marginal loss in absorption efficiency. In some systems, and especially in rich/lean systems wherein the loss in absorption efficiency in the rich gas absorber may be easily compensated for in the design and/or operation of the lean gas absorber, the benefit in reduced steam consumption is disproportionate to the penalty, if any, in absorption efficiency.

Where the contaminant gas comprises an acid gas such as $SO_2$ or $H_2S$, the absorption medium within the absorber, and most particularly at the base of a countercurrent absorber, is preferably adjusted to a value lower than the pH that affords the most favorable equilibrium for absorption. Where the contaminant gas comprises an alkaline gas such as ammonia, the absorption medium within the absorber is preferably adjusted to a value higher than pH that affords the most favorable equilibrium for absorption.

Exemplary sorbents for acid gases include malic acid and malate salts for absorption of $SO_2$ and amines for absorption of $H_2S$. Where $SO_2$ is recovered using a sorbent comprising malic acid or malate salt, the pH of the absorption medium within the absorber adjacent the absorption liquor outlet is maintained, e.g., at a value between 3.4 and 4.2, or between 3.4 and 4.0, or between 3.5 and 3.9, or between 3.6 and 3.8, or between 3.7 and 3.85 or between 4.0 and 4.2. In a rich/lean system, the pH of a malate salt absorption medium in the rich gas absorber is most preferably maintained in the range of 3.4 to 4.2. During startup, the initial pH is preferably established at a value between 3.2 and 3.6 by relative additions of malic acid and an alkaline material such as NaOH or KOH.

As a matter of process control, it may be preferable for the control variable to be the pH of the regenerated absorption medium exiting the absorption liquor stripper, as optionally adjusted by addition of caustic and malate to this stream before it is returned to the absorber. Although this pH may vary from the pH of the absorption liquor at the exit of the absorber, the preferred ranges of pH value as summarized immediately hereinabove apply to the regenerated rich gas absorption medium as well.

Where the absorption medium pH is maintained in the preferred ranges listed above, the consumption of steam in the stripper to achieve a satisfactory level of $SO_2$ in the regenerated absorption medium may be not greater than 7.5 lbs., or between 4.8 and 7.5 lbs. or between 5.0 and 7.0 lbs. per lb. $SO_2$ removed from the liquid phase in the stripper of a process comprising a single absorber/stripper circuit. As illustrated in FIG. 14, a satisfactory level of $SO_2$ in the regenerated absorption medium may be such as to yield a gas stream exiting the absorber having an $SO_2$ content less than 450 ppm, or less than 200 ppm, or less than 100 ppm, or even less than 17 ppm.

Typically, a level of 450 ppm SO₂ in the gas exiting the absorber would be acceptable in the operation of the novel rich/lean absorptions systems of the invention as illustrated, e.g., in FIG. 8. However, depending on the volume of gas, the regulatory regime and other circumstances, SO₂ levels 200 ppm or 100 ppm may be acceptable as a final exhaust gas effluent, and an SO₂ level no greater than 17 ppm would be acceptable in a majority of circumstances.

Where the pH of the absorption medium in a rich gas absorber of a rich/lean system is adjusted to reduce steam consumption, a pH closer to the optimum for gas/liquid equilibrium is preferably established and maintained in the lean gas absorber where steam consumption is relatively low in any case because the very low acid gas content of the lean absorption liquor does not create a high steam demand regardless of the pH. Thus, e.g., in a system for recovery of SO₂ using a malate sorbent, the pH of the absorption medium in the lean gas absorber may advantageously be maintained 0.1 to 0.5 units higher than the pH in the rich absorber. For purposes of process control, this same range of difference applies to the difference between the regenerated lean gas absorption medium and the regenerated rich gas absorption medium, and the difference in pH between the lean absorption liquor and rich absorption liquor as well. In a malate system, the pH in the lean absorber is preferably in the range of 3.8 to 4.4.

Where the pH in the absorber is adjusted away from optimum in order to minimize stripper steam consumption, the sacrifice in absorption efficiency can also be compensated for by addition of transfer units to the absorber, i.e., by addition of trays or packed height.

While adjusting the pH of the absorption medium can require an increased increment in acid or base added to the system, this is not necessarily the case. In systems wherein the pH tends to drift in a direction away from that prevailing at the optimal gas/liquid equilibrium, e.g., as resulting from formation of sulfates in an SO₂ removal circuit, acid or base may necessarily be added to prevent the pH from drifting too far in that direction. For example, caustic such as NaOH is steadily added during operation of a malate absorption medium for SO₂. In such operations, adjustment to a pH that is non-optimal for the absorption but pays ultimate dividends in steam consumption may be accomplished by merely forbearing from acid or base addition, or adding acid or base at a sub-stoichiometric level until a desired pH level is achieved, at which point addition may be resumed at the stoichiometric rate to preserve the steady state pH at the level desired.

The benefits of maintaining the pH of the aqueous phase in the stripper at a relatively low level are further illustrated in FIGS. 15-26, which graphically document the opportunities for enhancing the efficiency of contaminant removal, thereby achieving low contaminant gas emissions with minimal consumption of stripping steam.

In a rich/lean system, optimal control of the pH of the absorption media enables a given emission level, i.e., concentration of contaminant gas in the exhaust gas from the lean gas absorber, to be achieved with minimal consumption of stripping steam and/or with minimal emissions of residual contaminant gas in the lean absorber exhaust at a given rate of steam supply to the strippers. Where the contaminant gas comprises sulfur dioxide and the absorption media comprise aqueous solutions of malate ion, it has been found that performance approaching optimal can be achieved where the rich gas absorption medium contains between about 5 and about 30 weight % malate ion, the alkali metal hydroxide to malic acid ratio is in the range stated above, and the ratio of the active component flow of sorbent entering the rich gas absorber to SO₂ entering the absorber is between about 1 and about 20, or between about 2 and about 15, or between about 2.5 and about 12. This translates into an L/G at the bottom of the rich gas absorber with varies with the SO₂ content of the inlet gas as reflected in Table A below.

The malate ion content of the lean gas absorption medium is more preferably in the range between about 5 and about 35% by weight. Where the malate ion content falls in this range, it has been found that performance approaching optimal can be achieved where the alkali metal hydroxide to malic acid ratio is controlled as a function of the malate and sulfate content of the regenerated absorption medium, and the ratio of the molar flow of sorbent entering the lean gas absorber to SO₂ entering the absorber is between about 1 and about 15 or between about 2.5 and about 12. This translates into an L/G at the bottom of the lean gas absorber which varies with the SO₂ content of the inlet gas as also reflected in Table Z below. Typically, the optimal difference between the pH at the base (liquid phase exit) of the lean liquor stripper and the pH at the base of the rich liquor stripper is between about 0.2 and about 0.4.

TABLE A

| Inlet [SO₂], vol. % | Location | Rich Gas L/G × 0.2/[malate][a] | Lean Gas L/G × 0.2/[malate][a] |
|---|---|---|---|
| 30-50% | bottom of col. | 10-20 | 1.5-3.5 |
|  | top of col. | 25-50 | 1.5-3.5 |
| 15-30% | bottom of col. | 5-15 | 0.8-2.0 |
|  | top of col. | 8-16 | 0.8-2.0 |
| 5-15% | bottom of col. | 3-8 | 0.5-1.5 |
|  | top of col. | 3-10 | 0.5-1.5 |
| 2-5% | bottom of col. | 0.8-2.0 | 0.3-1.0 |
|  | top of col. | 0.8-2.0 | 0.3-1.0 |
| 0.2-2% | bottom of col. | 0.2-1.0 | 0.15-0.4 |
|  | top of col. | 0.2-1.0 | 0.15-0.4 |
| 0.01-0.2% | bottom of col. | 0.05-0.2 | 0.1-0.3 |
|  | top of col. | 0.05-0.1 | 0.1-0.3 |

Figure 15:
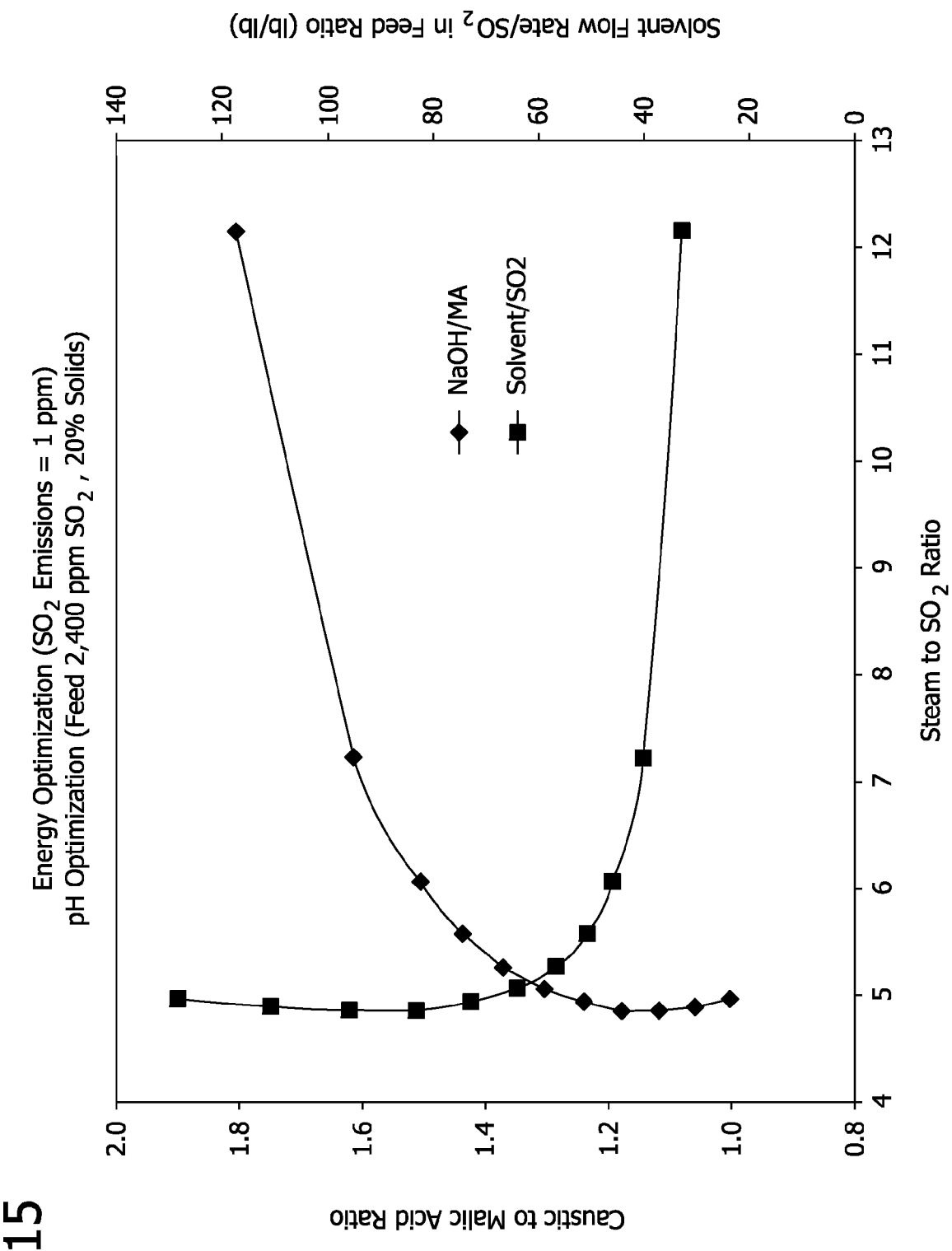
FIG. 15 is based on a mathematical model simulating operation of a single absorption and stripping circuit for recovery of $SO_2$, and both: (i) plots the ratio of steam to $SO_2$ in the stripper that is required to produce an exhaust stream containing 1 ppm $SO_2$ from a feed gas stream containing 2,400 ppm $SO_2$ as a function of the caustic/malic ratio in an absorption solvent comprising a sodium malate sorbent (20 wt. % solids); and (ii) for the same duty, correlates the solvent flow rate per unit $SO_2$ removed with the requisite steam/$SO_2$ ratio in the stripper.

[a]The L/G values entered in the table are for a process where the absorption media contained 20 wt. % Na malate; Per the relationship expressed in this heading L/G would be proportionately adjusted for changes in malate content Referring to the drawings, FIG. 15 depicts performance of a single absorption and stripping circuit for a feed gas containing 2,400 ppm by volume SO₂ using aqueous absorption media containing 20 wt. % solids, i.e., 20 wt. % Na malate. It will be understood that since the ratio of caustic to malic acid is generally greater than one, the 20% solids actually comprises a mixture of Na⁺ ions, malate anions, and free hydroxyl ions. As the caustic/malic ratio is pushed toward 1.0, a fraction of bimalate ions is also present. But the composition is approximately 20 wt. % sodium malate. Two relationships are plotted in FIG. 15. The curve based on the diamond shape data points plots the steam consumption per lb. SO₂ in the inlet gas stream required to achieve a given concentration of contaminant gas in the exhaust gas from the lean gas absorber, in this instance 1 ppm by volume. The curve based on the square data points plots the steam to SO₂ ratio as a function of the ratio of solvent flow rate to SO₂ in the feed, i.e.

$$\frac{L/G}{[SO_2 \text{ content of feed gas}]}$$

Figure 16:
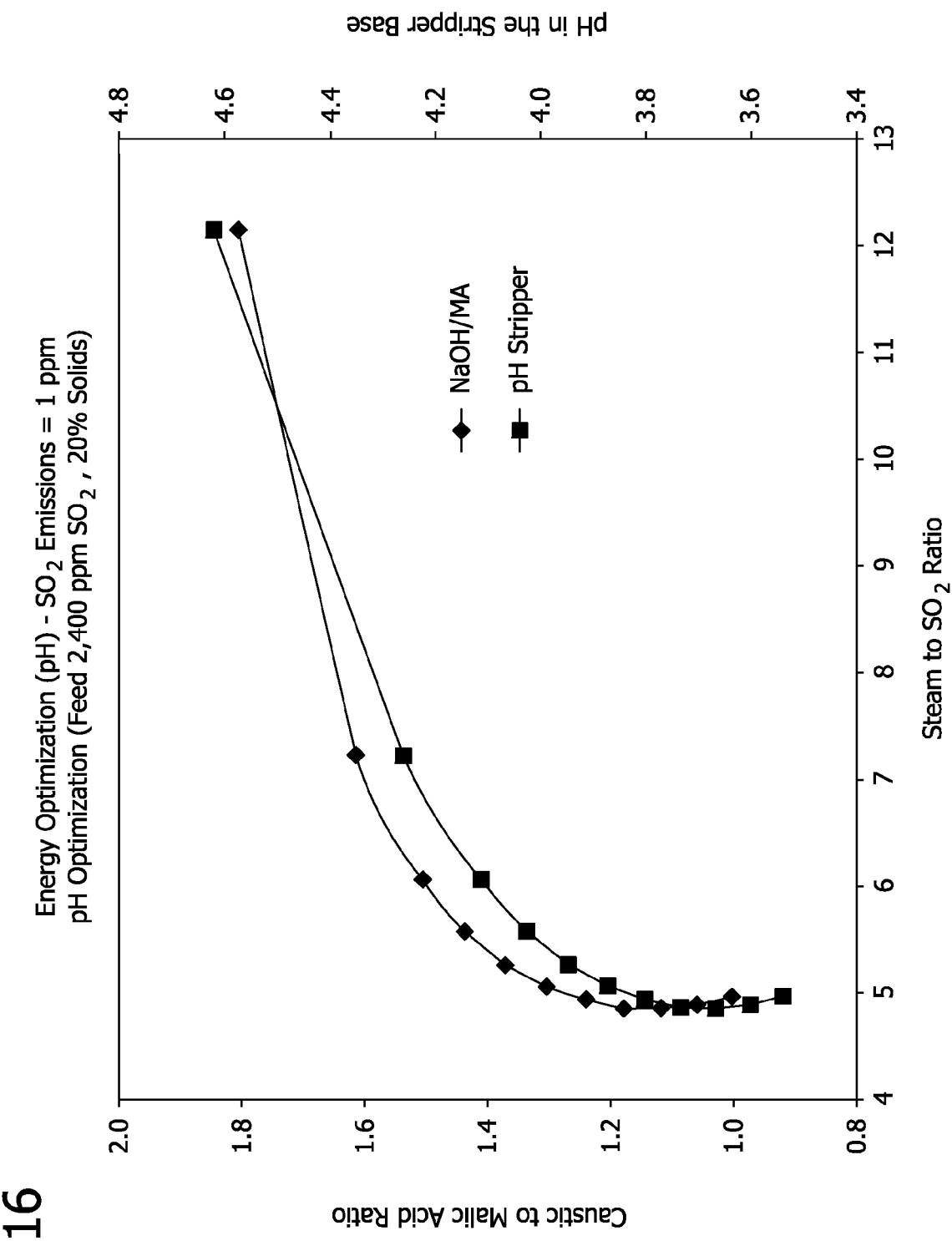
FIG. 16 also relates to mathematically simulated operation of a single absorption and stripping circuit and plots the steam to $SO_2$ ratio vs. both the caustic/malic ratio and the pH in the stripper base for producing an exhaust stream containing 1 ppm $SO_2$ from a feed gas stream containing 2,400 ppm $SO_2$ using an absorption solvent comprising a sodium malate sorbent containing 20 wt/% solids.

From the first of these curves, it will be seen that the steam demand remains substantially constant at a minimum level, in this instance 5 lbs. steam per lb. $SO_2$ in the inlet gas, over a relatively wide range of caustic to malic acid ratios, i.e., from 1.0 to about 1.4. Reasonably satisfactory performance is achieved even up to a ratio of about 1.45. Accordingly, as illustrated in FIG. 16, which reflects performance under the same conditions as FIG. 15, favorable steam efficiency is preserved over a modest range of pH of the regenerated absorption medium as measured at the bottom (liquid exit) of the rich liquor stripper, i.e., from pH 3.5 to roughly pH 4.0.

The second curve plotted in FIG. 15 reflects the effect of sorbent/$SO_2$ ratio as controlled by L/G at constant sorbent content of 20 wt. % in the absorption medium. At an (L/G)/[$SO_2$ content of feed gas] ranging from 130 down to 50, i.e., an L/G of approximately 0.3 to 0.12, equating to a sorbent to $SO_2$ molar ratio between about 11 and about 3, steam demand sufficient to achieve a 1 ppm level in the exhaust gas exiting the lean gas absorber remains essentially constant at 5 lbs./lb. $SO_2$. As the L/G falls below 0.12, i.e., the parameter (L/G)/[$SO_2$ content of feed gas] falls below 50, the steam demand increases sharply due to an insufficient driving force for mass transfer in the absorber.

Figure 17:
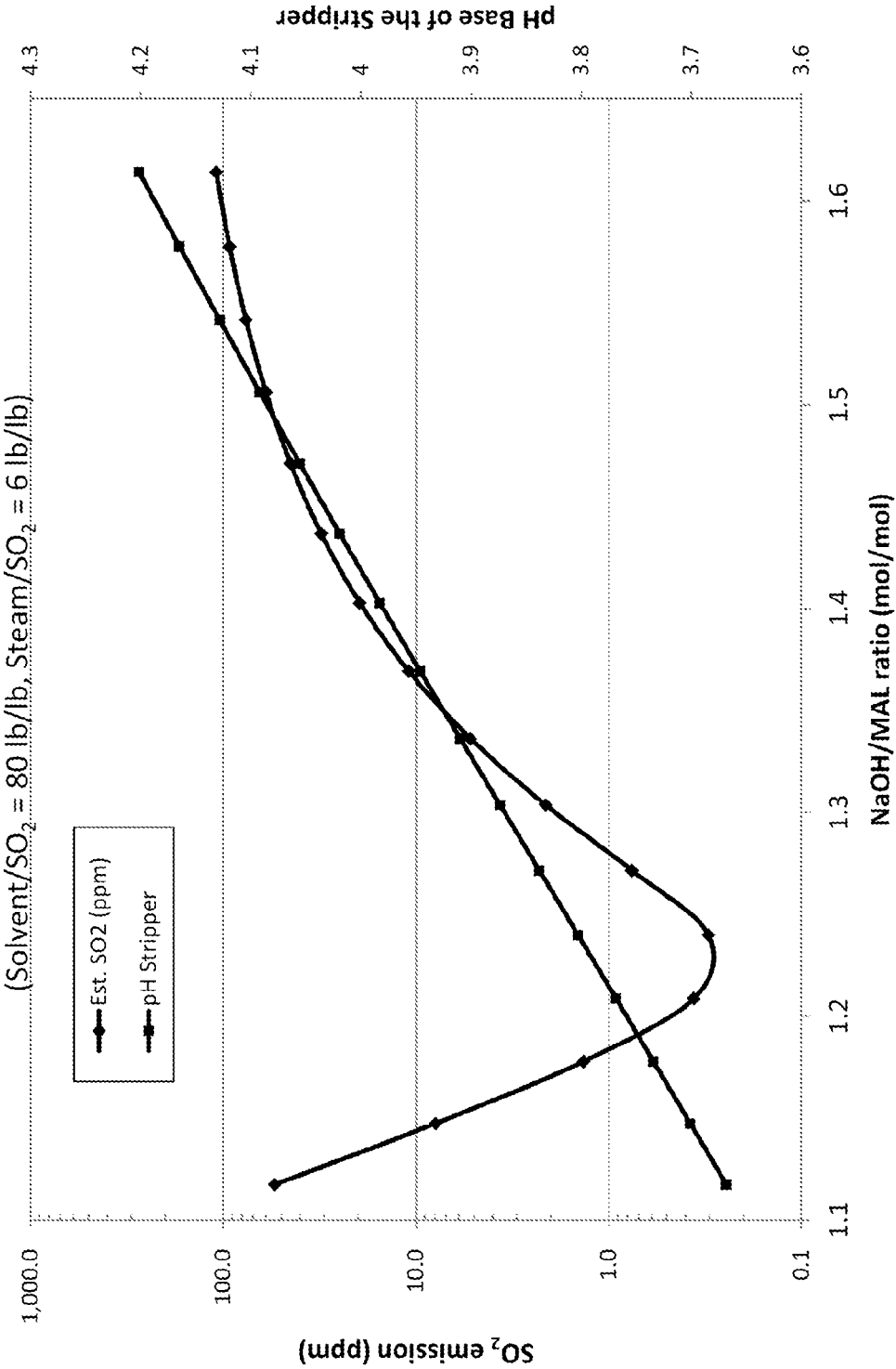
FIG. 17 plots both the $SO_2$ content of the exhaust gas ("$SO_2$ emissions (ppm)") and pH at the base of the stripper as a function of the caustic/malic ratio in the mathematical simulation of a single absorption and stripping circuit in which an exhaust gas containing 1 ppm $SO_2$ is produced from a feed gas containing 2,400 ppm $SO_2$ using an absorption solvent that contains sodium malate at a sorbent concentration of 20 wt. % solids, a solvent ratio of 80 lbs./lb. $SO_2$, and a steam supply to the stripper of 6 lbs./lb. of $SO_2$ recovered.

FIG. 17 plots both the pH of the regenerated absorption medium exiting the stripper and $SO_2$ emissions from the absorber vs. the caustic/malic acid ratio in the absorption medium, in each case based on a mathematical model of the process. The projection is based on an 20% solids in the aqueous absorption media, an absorber (L/G)/[$SO_2$ content of the gas]=80 lbs./lb., and a fixed steam/$SO_2$ ratio of 6 lbs./lb. It may be seen that a distinct optimum (minimum) in steam demand is projected at a caustic to malic ratio in the region of 1.20 to 1.25, equating to a pH slightly below 3.8. At lower pH, the efficiency of the absorber deteriorates. But FIG. 17 further illustrates that the quality of the exhaust gas declines as the ratio of caustic to malic increases significantly above 1.25. Although the higher pH absorption medium has a higher affinity for the contaminant acid gas ($SO_2$), the capability of the stripper for removal of the $SO_2$ from the aqueous phase begins to decline sharply as the pH increases above the 3.8 value indicated at the point of minimum $SO_2$ concentration in the exhaust gas stream. It has been discovered that the ability of the process to achieve exceptionally low emissions is quite sensitive to the $SO_2$ content of the regenerated absorption medium that is returned to the rich gas absorber.

Figure 18:
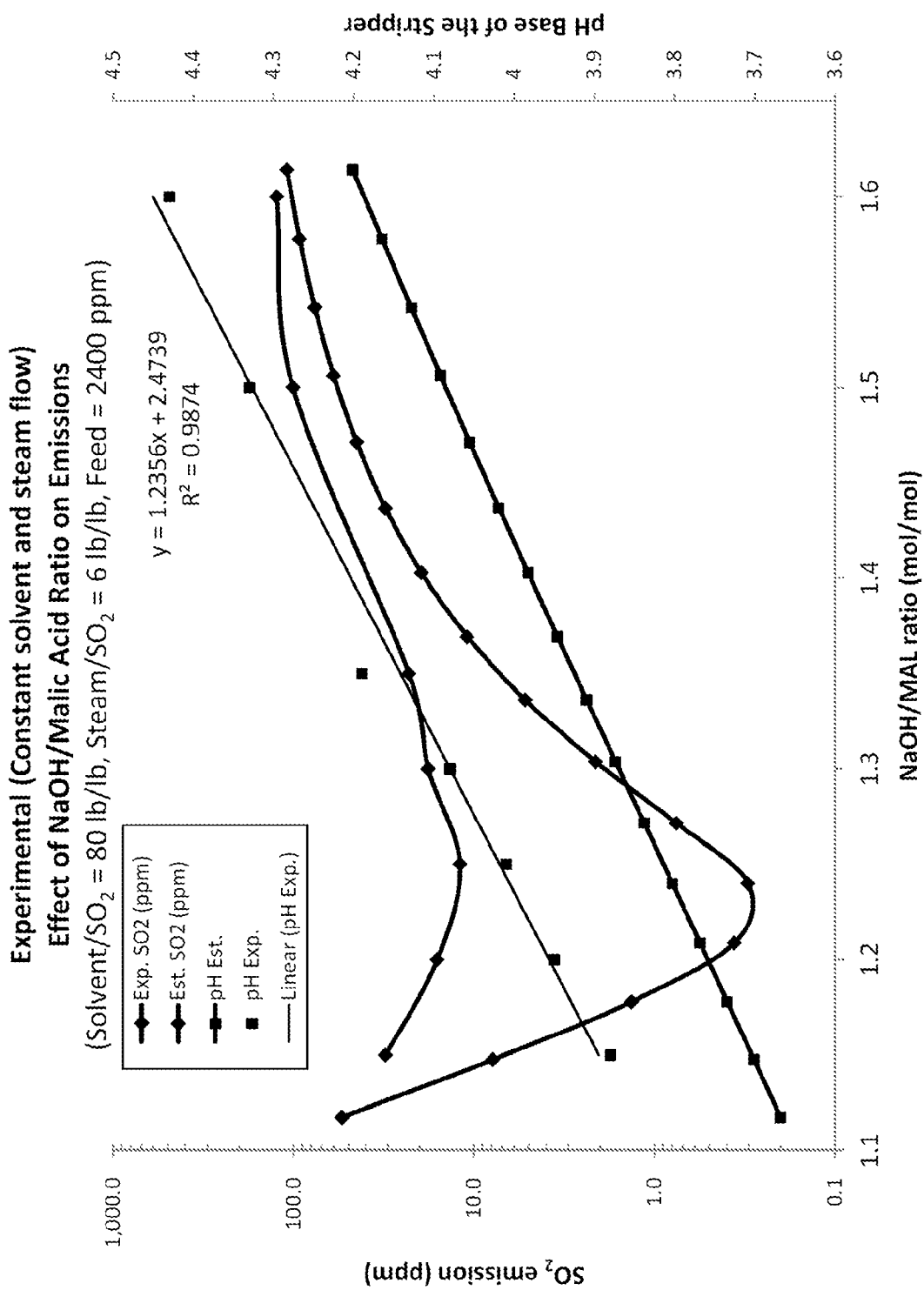
FIG. 18 includes the plots of FIG. 17 but overlays a plot of $SO_2$ emissions and pH as a function of caustic to malic ratio in an experimental operation under the same conditions and for the same duty as the simulated operation from which the data for the plots of FIG. 17 was obtained.

FIG. 18 overlays a plot of data from actual operation at an L/G=80 lbs./lb. and steam/$SO_2$ ratio of 6 lbs./lb. over the curves of FIG. 17. As in the curve derived from the model, the actual data reflect a minimum $SO_2$ emission at a caustic/malic ratio between 1.2 and 1.3. The minimum based on the actual data is not as sharp or as favorable as the minimum indicated by the model, but is still definitive. The optimum caustic/malic ratio appears to be very slightly higher than the optimum ratio based on the model, but the difference is insignificant. Moreover, the optimal caustic/malic ratio indicated for achieving minimum $SO_2$ emission based on the actual data is also in the region wherein minimum steam consumption is indicated by the data plotted in FIG. 15.

Figure 19:
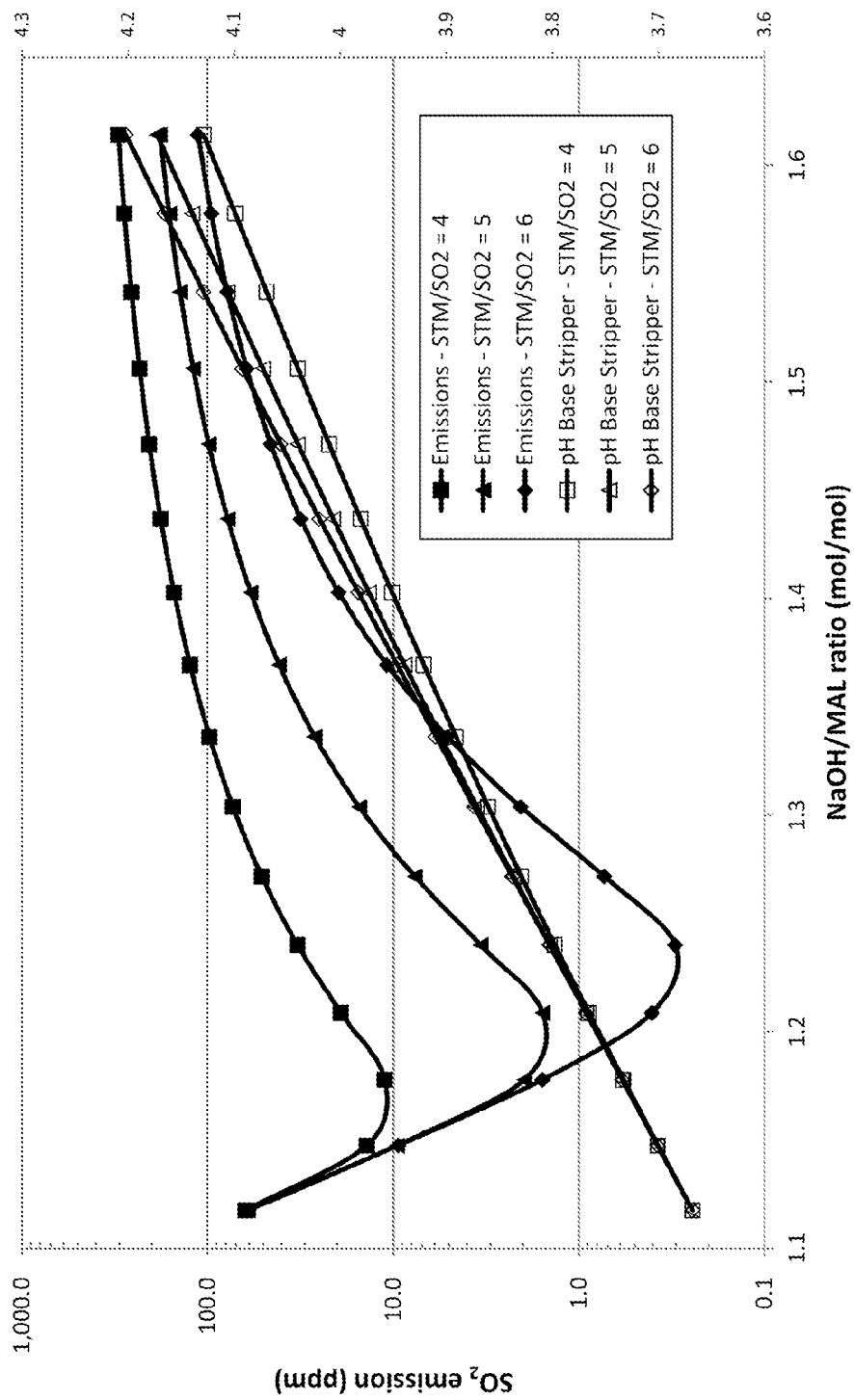
FIG. 19 plots the same relationship as FIG. 17 for simulated operation of an absorption and stripping circuit under the same conditions and for the same duty that is simulated in the plots of FIG. 17, except that FIG. 19 includes a family of curves for separate operations at a series of discrete steam to $SO_2$ ratios.

FIG. 19 is also similar to FIG. 17, except that FIG. 19 includes a family of curves for simulated operation at three discrete steam to $SO_2$ ratios, i.e., 4 lbs. steam/lb. $SO_2$, 5 lbs. steam/lb. $SO_2$, and 6 lbs. steam/lb. $SO_2$. It may be observed that the configurations of the curves in FIG. 19 are comparable to the curve of FIG. 17, except that the minimum $SO_2$ emission increases as expected as the steam/$SO_2$ ratio drops from 6 lbs./lb. to 5 lbs./lb. and 4 lbs./lb. Note also that the minimum is found at progressively lower caustic/malic ratios as the steam to $SO_2$ ratio decreases. In all cases, however, the minimum $SO_2$ emission falls in a region wherein minimum steam demand is required to achieve a given $SO_2$ emission level as reflected in FIG. 15.

Figure 20:
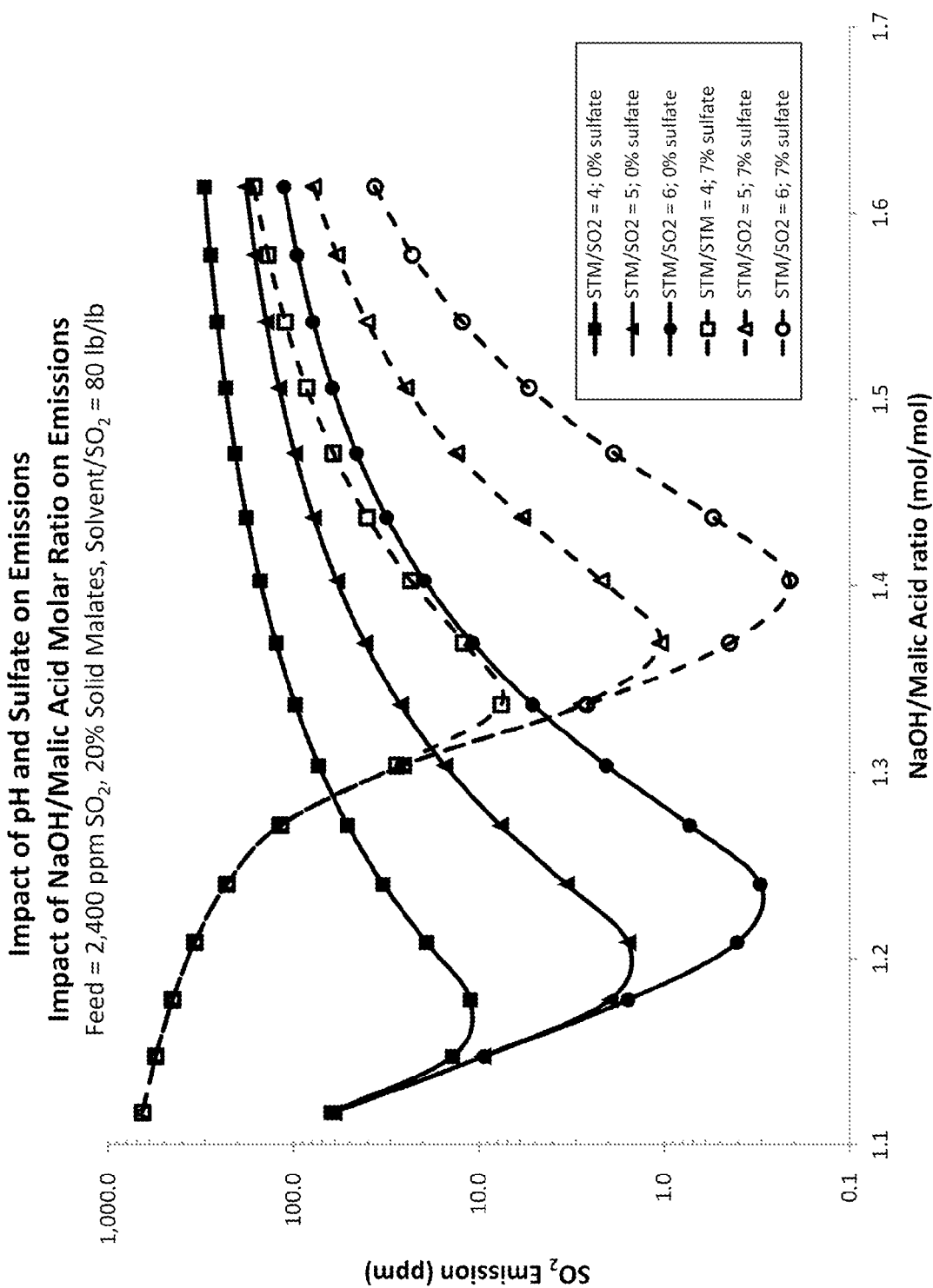
FIG. 20 presents two families of curves obtained from a process simulation for the same duty and under the same conditions as FIG. 19, one family of curves being for $SO_2$ emissions vs. caustic/malic ratio at three different discrete steam to $SO_2$ ratios where the absorption liquor contains 0% sulfate and the other family of curves being for $SO_2$ emissions at the same three discrete steam to $SO_2$ ratios but for an absorption liquor containing 7 wt. % sulfate ion.

FIG. 20 is a plot of curves comparable to those displayed in FIGS. 17-19. The curves of FIG. 20 are all based on a mathematical model of the process, stipulating a concentration of 2,400 ppmv $SO_2$ in the feed gas, 20% monosodium malate in the rich gas absorption medium, and a solvent/inlet $SO_2$ ratio of 80 lbs./lb. in the absorber. Curves are generated for operation at 4 lbs. steam/lb. $SO_2$, 5 lbs. steam/lb. $SO_2$, and 6 lbs. steam/lb. $SO_2$, respectively. One family of curves is plotted for the several discrete steam to $SO_2$ ratios wherein the solvent contains malate sorbent and no sulfate ion, and another family of curves is plotted for the same series of steam to $SO_2$ ratios wherein the solvent contains both malate sorbent and 7 wt. % sulfate ion. The distinctly different optima for the 0% vs. 7% sulfate cases is attributable to the effect of the significantly lower water content in the solvent that contains sulfate, plus the effect of the sulfuric acid dissociation equilibria on the malic acid equilibria and the consequent content of free malate ion vs. bimalate ion and undissociated malic acid. A lower caustic to acid ratio is required to lower the pH (relative to the sulfate case) which provides the lowest emissions of sulfur dioxide.

Figure 21:
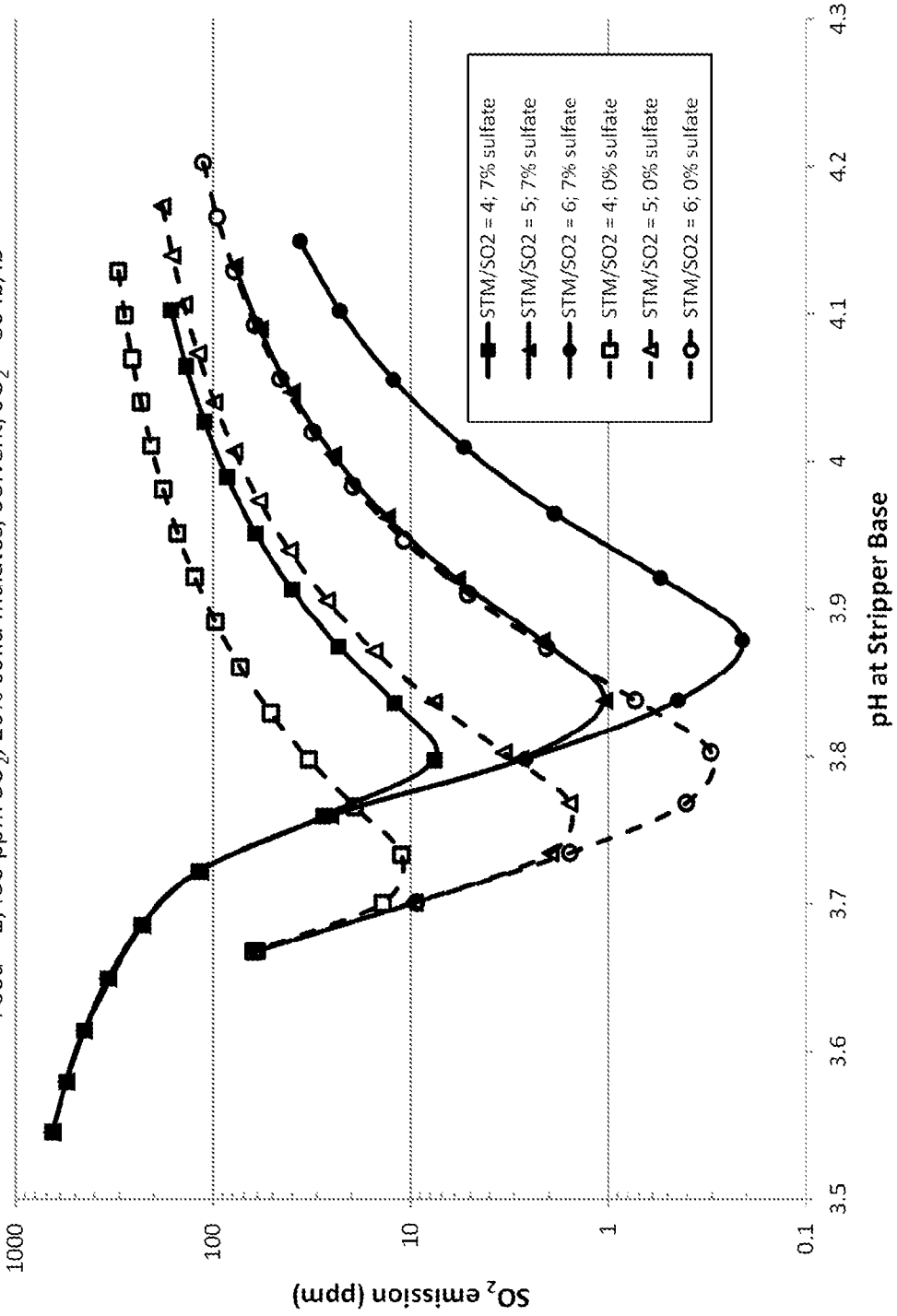
FIG. 21 presents two families of curves taken from the same six simulations as those of FIG. 19 except that $SO_2$ emissions are plotted against pH at the base of the stripper rather than against caustic/malic ratio.

FIG. 21 is similar to FIG. 20 except that each of the families of curves plots $SO_2$ emissions vs. pH rather than caustic/malic ratio at the rich liquor stripper base. The curves generated by the mathematical model and displayed in FIG. 21 are based on the same discrete series of conditions from which the data plotted in FIG. 20 were generated. Again, the steam rates are 6 lbs./lb. $SO_2$, 5 lbs./lb. $SO_2$, and 4 lbs./lb. $SO_2$, with one set of curves generated by the model based on 0% sulfate and the other set of curves generated based on 7 wt. % sulfate. Once again, and for the same reasons, the relationships of $SO_2$ emissions vs. pH for 7% sulfate is offset from the relationship for 0% sulfate.

Figure 22:
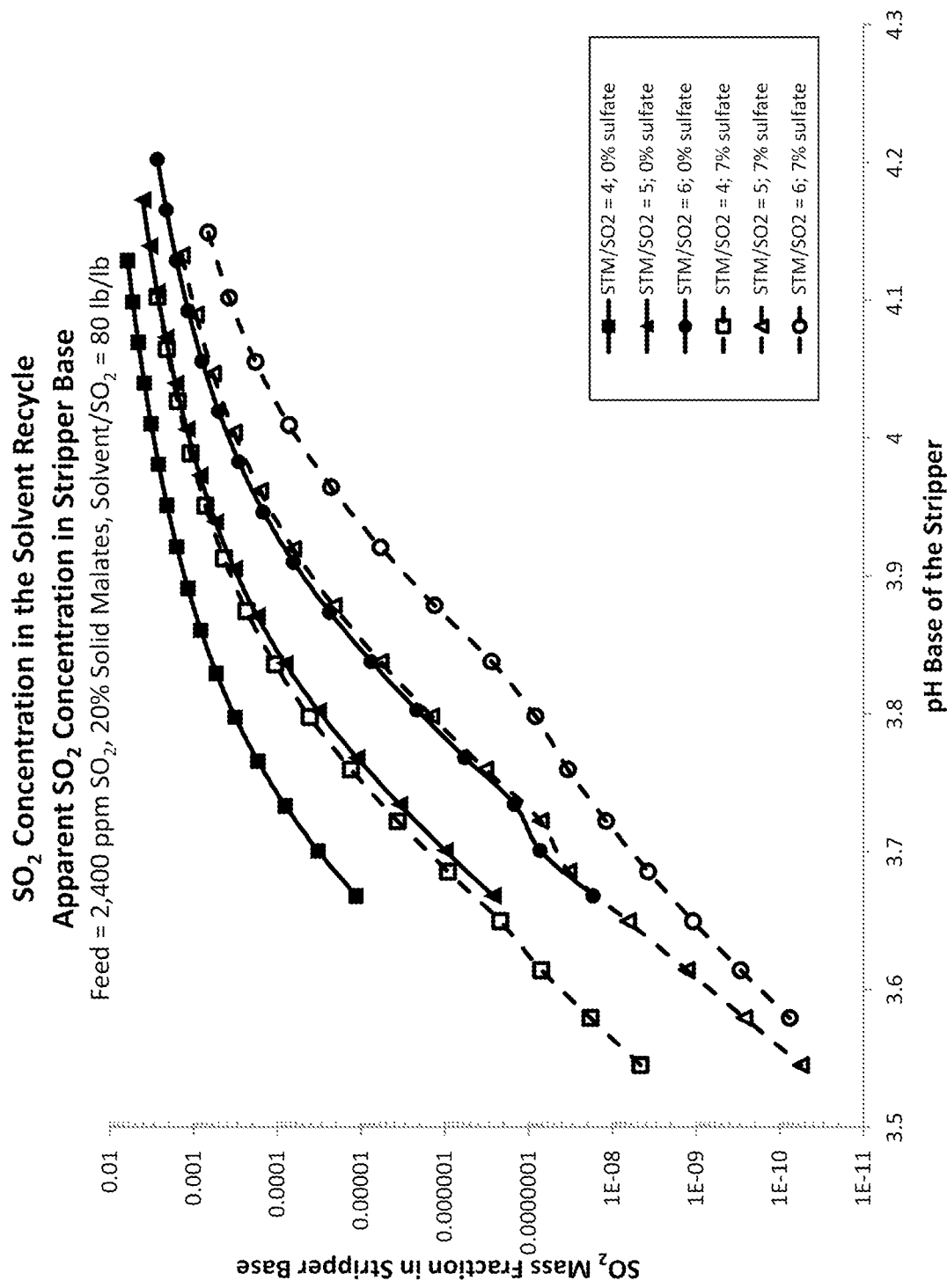
FIG. 22 presents two families of curves plotting $SO_2$ mass fraction at the stripper base vs. pH at the stripper base for the same six simulations to which the curves of FIGS. 20 and 21 relate.

FIG. 22 displays a family of curves based on the same simulations for which data is presented in FIGS. 17-21, except in this case the $SO_2$ content of the regenerated absorption medium in the rich liquor stripper base is correlated with the pH at the stripper base. Although the $SO_2$ content of the regenerated absorption medium is not critical for the rich gas absorber/stripper circuit in a rich/lean system wherein sulfur dioxide breaking through the rich gas absorber is picked up in the lean gas absorber, the $SO_2$ content of the regenerated absorption medium can be a critical variable in a single absorber stripper circuit where the exhaust gas leaving the absorber has a contaminant gas content that can be no lower than the concentration that is in equilibrium with the regenerated absorption medium entering the absorber.

FIG. 22 shows that a significant improvement in $SO_2$ removal is projected where the sulfate level is allowed to rise to a steady state level of 7 wt. %.

Figure 23:
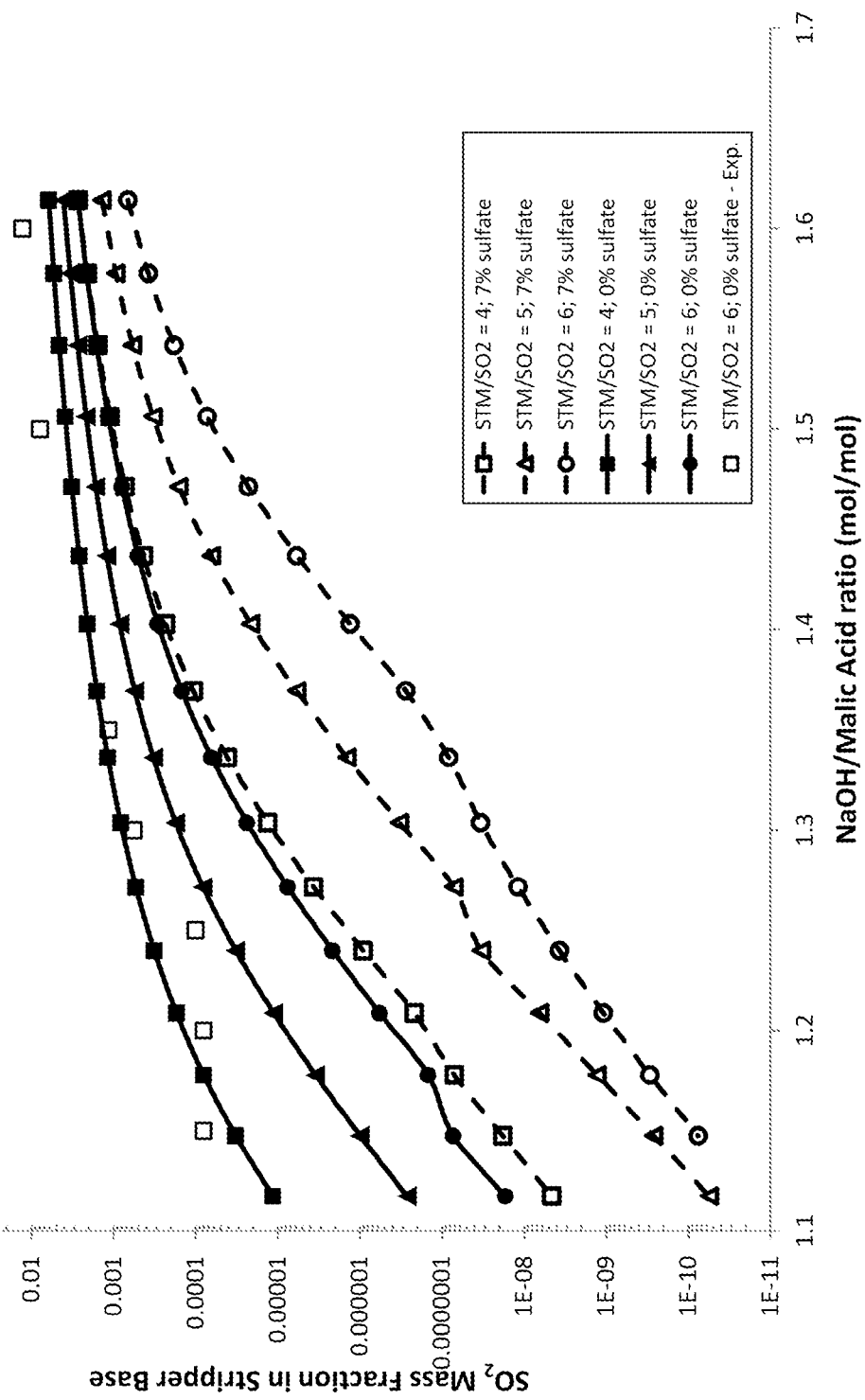
FIG. 23 presents two families of curves plotting $SO_2$ mass fraction at the base of the stripper vs. caustic/malic ratio for the same six simulations to which the curves of FIGS. 20-22 relate.

FIG. 23 is based on the same simulations as FIGS. 17-22 but in this case the $SO_2$ content of the regenerated absorption medium is plotted against the caustic/malic ratio. The square points on FIG. 23 represent empirical data taken under the same conditions as the simulation at 0% sulfate and a steam to $SO_2$ ratio of 6 lbs./lb. $SO_2$. In this case, it will be seen that the actual effect of lowering the caustic/malic ratio was less dramatic than projected in the simulation, but significant benefits are seen as the ratio is lowered from 1.5 to 1.25. It appears that the $SO_2$ level plateaus below a 1.25 ratio due to loss of analytical sensitivity.

Figure 24:
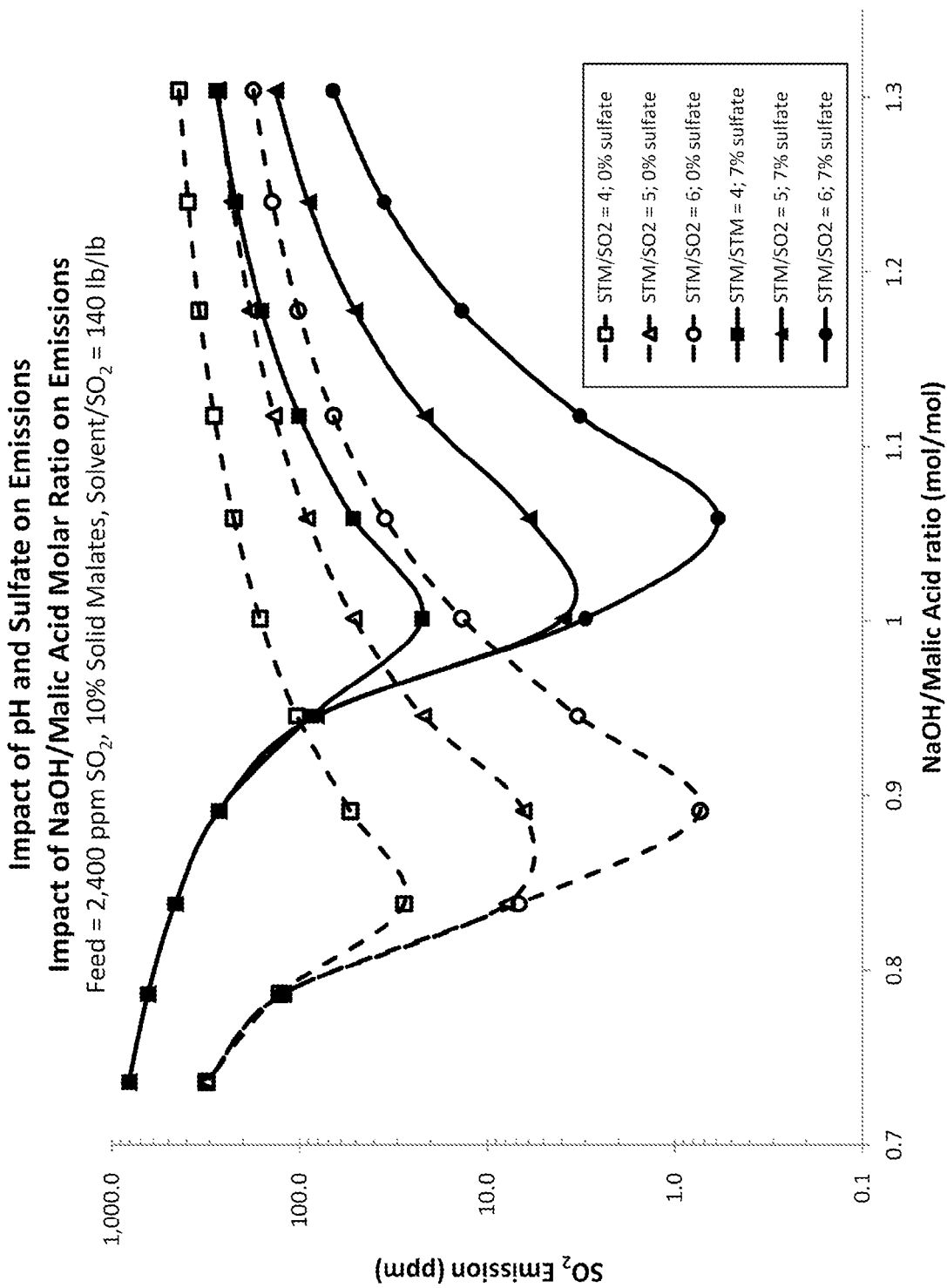
FIG. 24 presents two families of curves plotting $SO_2$ emissions vs. caustic/malic ratio at the stripper base for six process simulations under the same conditions as those to which FIGS. 20-23 relate except that the solids content of the solvent was only 10 wt. % but the solvent to $SO_2$ ratio was 140 lbs./lb. $SO_2$.

FIG. 24 presents two families of curves similar to those of FIG. 20, in both of which $SO_2$ emissions are plotted vs.

caustic to malic acid ratio. The simulated operations on which FIG. 24 is based differ from those of FIG. 20 in specifying a Na malate content of 10 wt. % rather than 20 wt. % and a solvent/$SO_2$ ratio of 140 lbs./lb. instead of 80 lbs./lb. Again the curves for operation with a absorption medium sulfate content of 7 wt. % are offset from the corresponding curves for operation with no sulfate in the absorption medium. The difference in the relationship arises from the effect of sulfate in crowding out water, and in altering the extent of protonation of malate anion. It will be noted that for both the 7% sulfate and 0% sulfate cases, the optimum caustic/malic ratios are significantly lower than those projected for the simulation runs plotted in FIG. 20. The ultimate minima are very slightly more favorable for the 20% solids/80 lbs. per lb. case than for 10% solids/140 lbs./lb. case, but the differences may not be significant so far as the $SO_2$ emissions criterion is concerned. The conditions of FIG. 24 also impose somewhat higher steam requirements due to sensible heat demands. Offset of the curves is attributable to the same factors identified with respect to FIG. 20

Figure 25:
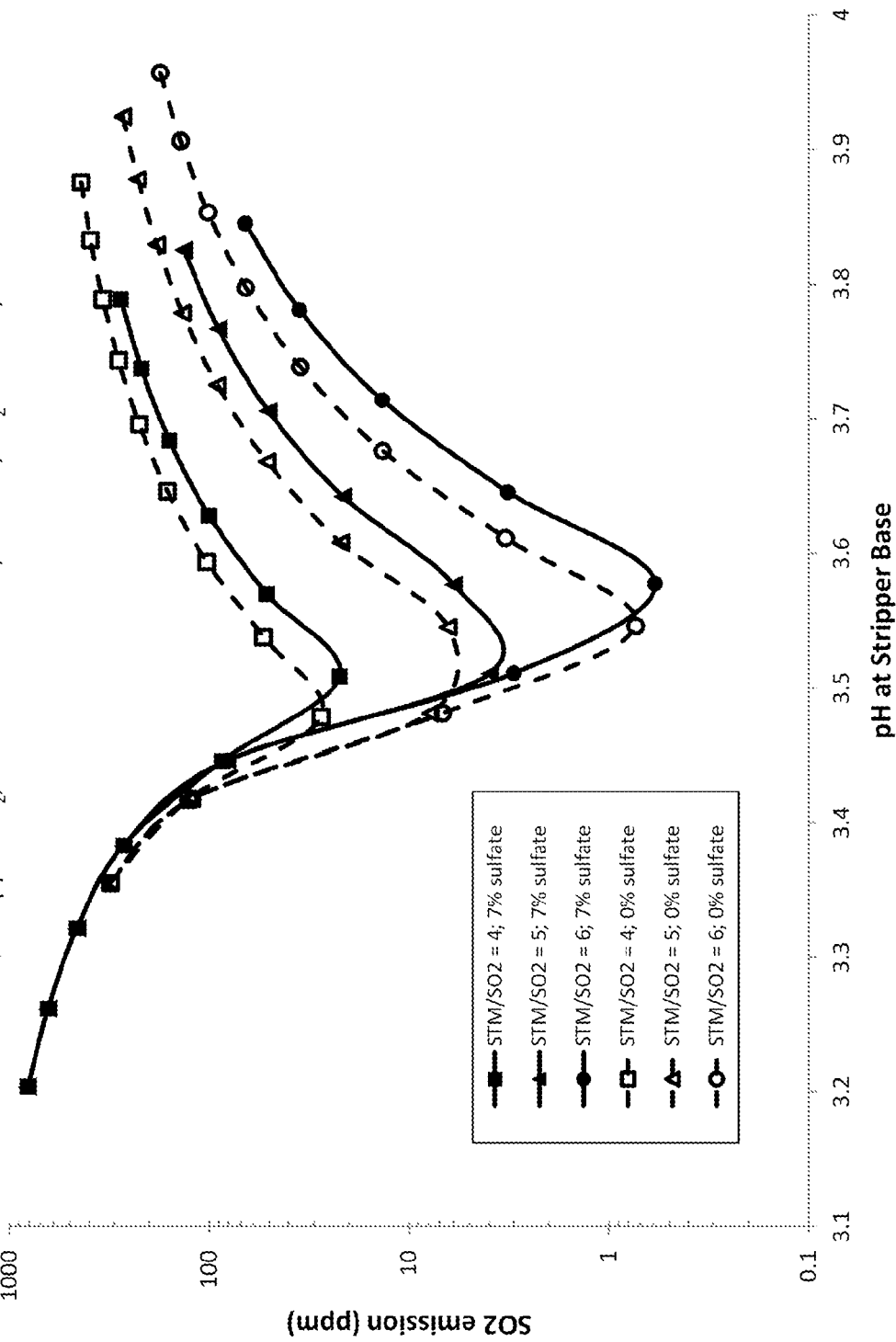
FIG. 25 presents two families of curves plotting $SO_2$ emissions vs. pH at the base of the stripper for the same six simulation as those to which FIG. 24 relates.

FIG. 25 plots a series of curves for $SO_2$ emissions vs. pH at the base of the stripper for the simulated runs of FIG. 24. Comparison with FIG. 21 indicates distinctly lower pH optima for the 10% malate/140 lbs. solvent per lb. $SO_2$ conditions. Again, offset of the 7 wt. % sulfate from the 0% sulfate curves is for the same reasons explained above.

Figure 26:
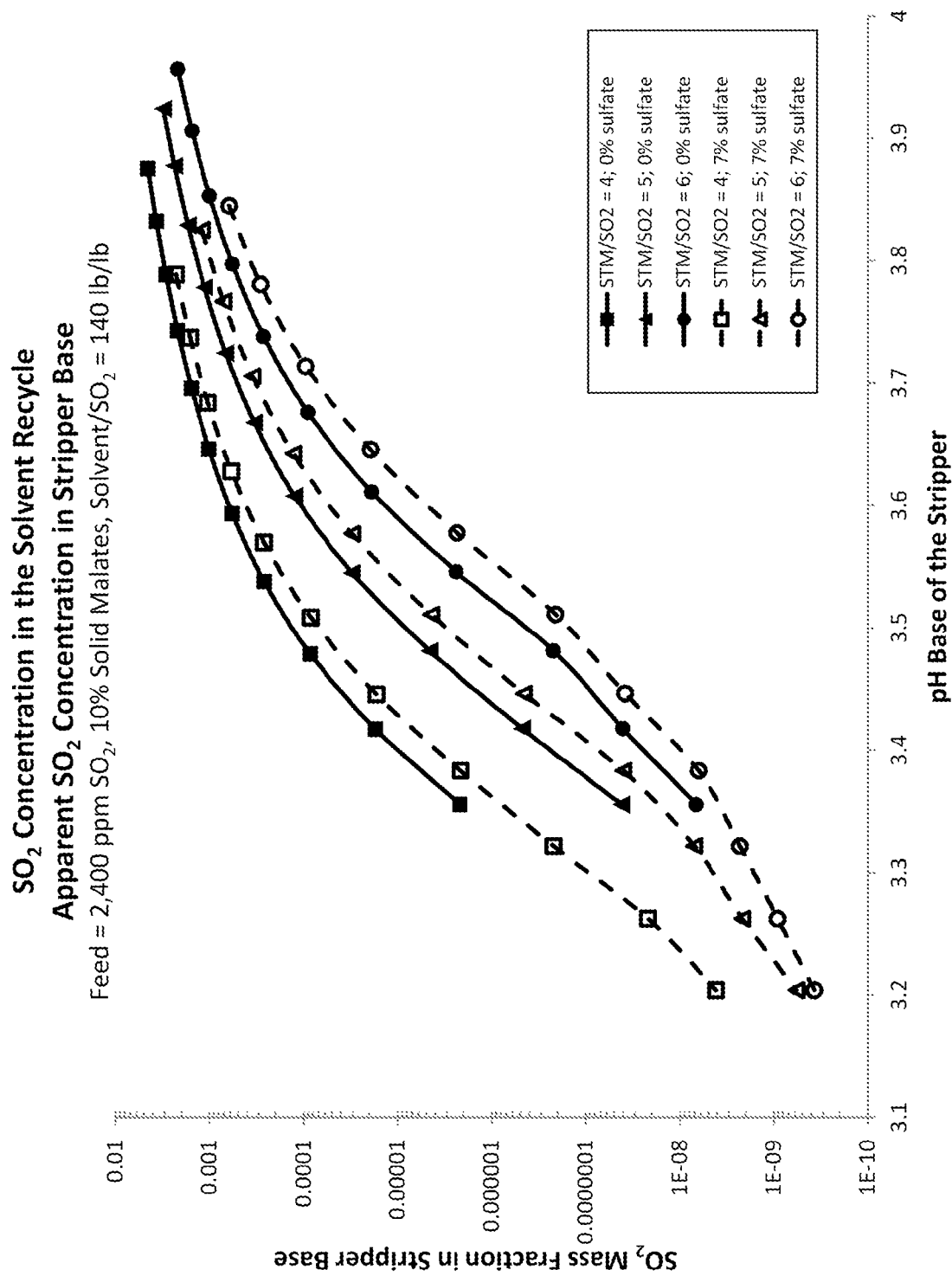
FIG. 26 presents two families of curves plotting $SO_2$ mass fraction at the base of the stripper vs. pH at the base of the stripper for the same six process simulations to which FIGS. 24 and 25 relate.

FIG. 26 presents curves comparable to those of FIG. 22 except that FIG. 26 relates to the same simulations on which FIGS. 24 and 25 are based.

Based on comparison of the data plotted in FIGS. 24-26 with those plotted in FIGS. 17-23, it may be preferably to control the ratio of sulfate to malate in the absorption medium to a value between about 0.9 and about 1.4, and the malate content of the absorption medium within a concentration range between about 10 and about 20% by weight.

In accordance with a further preferred feature of the sulfur dioxide absorption process, cooling is provided at the base of the rich gas absorber in order to reduce the temperature rise in the rich gas absorption medium in its passage through the absorption (i.e., gas/liquid contact) zone, and thus preserve the ability of both the rich gas absorber and the rich absorption liquor stripper to be operated at relatively low L/G ratios. Controlling the temperature rise in the absorption medium, especially in the lower portion of the rich gas absorption zone, preserves the equilibrium capacity of the absorption medium, and thus preserves the driving force for mass transfer of sulfur dioxide from the gas phase to the liquid phase within the absorption zone as well as the driving force for reaction of sulfur dioxide with the sorbent in the liquid phase. Relatively lower liquid phase temperatures also favor the extent of conversion to the sulfur dioxide adduct within the liquid phase where the reaction between sulfur dioxide and sorbent is an exothermic equilibrium reaction. Preferably, absorption liquor is withdrawn from the gas liquid/contact zone within the rich gas absorber, circulated through an external heat exchanger and returned to the absorption zone. More particularly, the circulating absorption liquor is removed from the gas/liquid contact zone in a region spaced below the region to which the cooled circulating absorption liquor is returned to the zone, thus defining a section within the absorption zone below the region to which cooled absorption liquor is returned within which the bulk of the absorption of sulfur dioxide preferably occurs and the bulk of the heat of absorption is generated.

Figure 13:
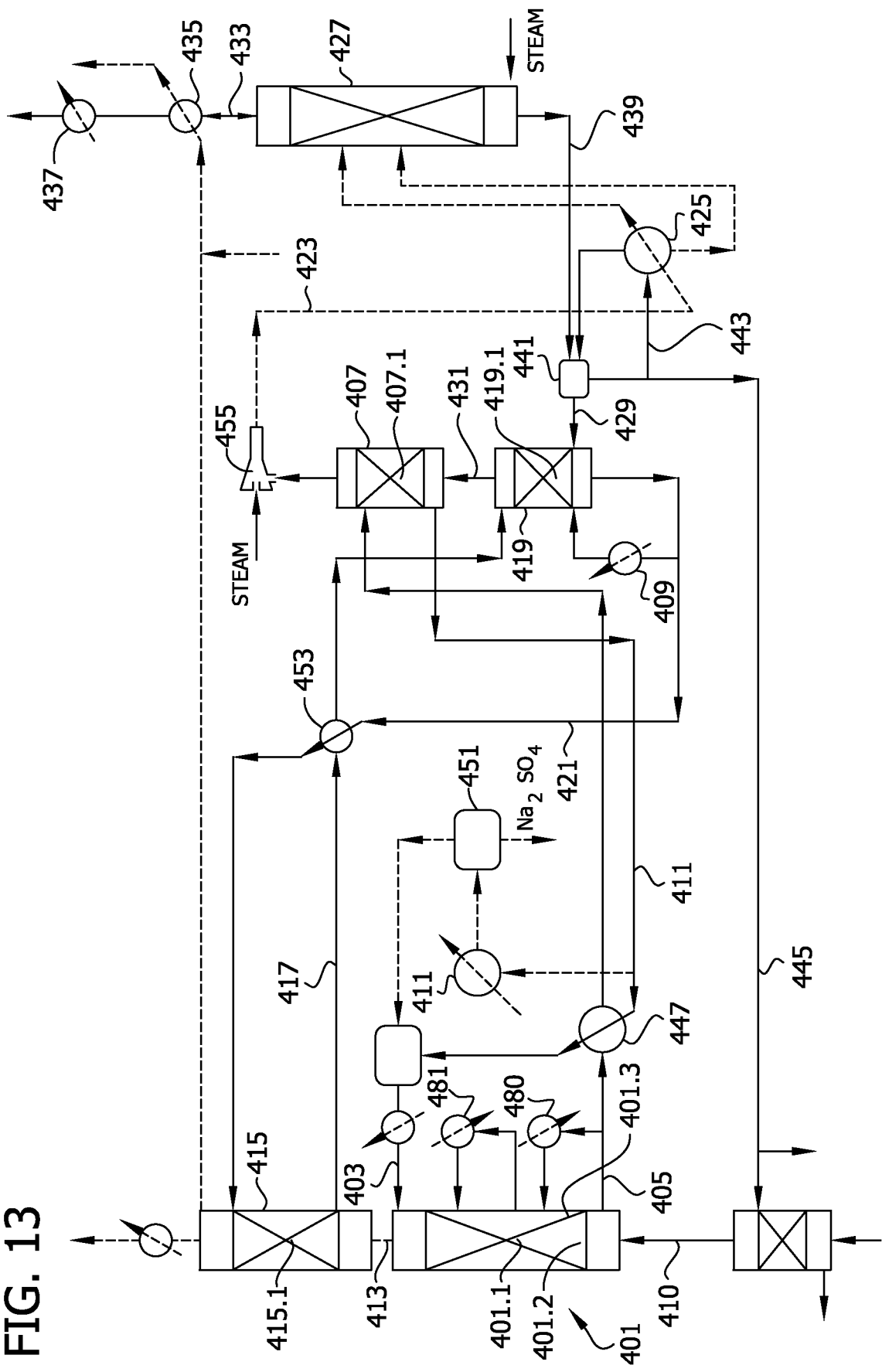
FIG. 13 is a flowsheet similar to FIG. 5, but as implemented in a process having separate rich and lean gas absorption and stripping circuits in tandem as illustrated in FIG. 8.

For example, as illustrated in FIG. 13, a portion of hot sulfur dioxide-enriched absorption liquor 405 is withdrawn from liquid exit 418 or withdrawn from a region 401.2 near the bottom of vertical gas/liquid contact zone 401.1 in absorber 401 and circulated through an external heat exchanger 480 where heat of absorption is removed by transfer to a cooling fluid. The cooled absorption liquor is returned to the absorber in a region 401.3 of the gas/liquid contact zone that is spaced above the region from which the hot rich absorption liquor is withdrawn, but spaced below the top of the gas/liquid contact zone. More preferably, the region 401.3 to which the cooled circulating absorption liquor is returned is in the lower portion of the gas/liquid contact zone.

Circulation of absorption liquor between the rich gas absorber and the external heat exchanger causes increased mass flow and unavoidable back mixing of the absorption liquor in the circulation section of the absorption zone falling between regions 401.2 and 401.3, and this can marginally offset the gain in mass transfer for removal of sulfur dioxide in this section of the zone. Preferably, therefore, return region 401.3 is spaced by the height of at least one transfer unit below the top of the gas/liquid contact zone, thereby defining a rectification section of the absorption zone comprising at least one transfer unit below the top of the zone. Preferably, the rectification section comprises at least two transfer units. It is also preferred that the return region 401.3 is spaced by the height of at least one transfer unit, more preferably at least two transfer units above withdrawal region 401.2. To accommodate adequate mass transfer capacity in both the circulation section of the absorption zone between return region 401.3 and withdrawal region 401.2 and the rectification section between return region 401.3 and the top of the absorption zone, the rich gas absorption zone as a whole preferably comprises at least three, more preferably at least four transfer units. Because both gas and liquid streams are in substantial plug flow within the rectification section, a maximum driving force for mass transfer is provided in that section, allowing reduction of the sulfur dioxide concentration in the exhaust gas to a level low enough that further absorption of $SO_2$ from lean gas in lean gas absorber 415.1 can satisfy emission standards and/or target sulfur yields. Proper selection of the location for the circulating liquid return region 401.3 is based on selection of a region wherein sulfur dioxide level in the gas flowing upwardly therefrom is not high enough to generate absorption/reaction heat in the rectification section that would have a significant adverse effect on absorptive capacity of the aqueous absorption medium, or on the mass transfer driving force in the rectification section.

As in the case of the absorber in the process of FIG. 5, the rich gas absorber 401 of FIG. 13 can be provided with multiple cooling loops as necessary to achieve proper control of the temperature of the absorption liquor within the absorber. FIG. 13 illustrates the presence of two cooling loops, but more are possible depending on the mass transfer rates, heat of absorption, sorbent kinetics, heat of sorbent/contaminant reaction, etc.

The remainder of the process of FIG. 13 is substantially as illustrated and described with respect to FIG. 9, but reference characters in FIG. 13 are in the 400 rather than the 100 series.

Preferably, where the sorbent is tetraglyme, region 401.3 to which cooled circulating absorption liquor is returned to the gas/liquid contact zone is maintained at a temperature not greater than about 40° C., more preferably not greater than about 30° C., most typically from about 15° to about 25° C. In a tetraglyme system, the temperature of region 401.2 from which the hot circulating absorption liquor is removed from the rich gas/liquid contact zone is preferably maintained at a temperature not greater than about 45° C., more preferably not greater than 35° C., more typically from about 15° to about 30° C. Those skilled in the art will recognize that different, in some cases substantially different, temperature ranges are optimal for other sorbents. For example, where the sorbent is sodium malate, region 401.3 to which cooled circulating absorption liquor is returned to the gas/liquid contact zone is maintained at a temperature not greater than about 45° C., more preferably not greater than about 45° C., most typically from about 20° to about 40° C. In this case, the temperature of region 401.2 from which the hot circulating absorption liquor is removed from gas/liquid contact zone is preferably maintained at a temperature not greater than about 50° C., more preferably not greater than 40° C., more typically from about 25° to about 35° C. In each case, the rate of circulation between regions 401.2 and 401.3 is dictated by these temperature constraints and the unit energy generation of the absorption process.

Conveniently, a forward flow fraction of hot sulfur dioxide-enriched absorption liquor 405 is withdrawn from the circulating absorption liquor stream upstream of the external heat exchanger 480 and directed to rich absorption liquor stripper 407.

Location of the circulating absorption liquor return region 401.3 can be selected based on the absorption profile for the sulfur dioxide absorption zone. Typical profiles using different absorption media are illustrated in FIG. 6.

Where absorption is immediate and substantially quantitative upon contact of the feed gas with the absorption medium in the gas/liquid contact zone, a single rich absorption liquor cooling circuit is ordinarily sufficient to preserve absorption efficiency and control the volumetric flow of absorption liquor to a level consistent with efficient energy usage in the absorption liquor stripper. However, where the affinity of the sorbent for sulfur dioxide is more limited, as is also desirable for purposes of efficient operation of the absorption liquor stripper, the sulfur dioxide concentration gradient through the absorption zone, i.e., the rate at which the concentration of sulfur dioxide in the gas stream (and the liquid stream) decrease with distance above the gas inlet to the absorption zone, may be only modest. In such circumstances, greater efficiency in operation of the rich gas absorber and rich absorption liquor stripper may be realized by using two or more cooling loops spaced vertically along the gas flow path within the absorption zone. For example, as illustrated in FIG. 13, two such cooling loops are shown. In the second cooling loop, a second portion of hot sulfur dioxide-enriched absorption liquor descending gas/liquid contact zone 401.1 of absorber 401 is withdrawn from a region 401.4 above region 401.3 to which cooled circulating absorption liquor is returned to the gas/liquid contact zone in the first cooling loop and circulated through an external heat exchanger 481 where heat of absorption is removed by transfer to a cooling fluid. The cooled absorption liquor is returned to the absorber in a region 401.5 of the gas/liquid contact zone that is spaced above region 401.4 from which the hot absorption liquor is withdrawn, but spaced below the top of the gas/liquid contact zone.

As those skilled in the art will understand, the rich absorber cooling system illustrated in FIG. 13, as implemented in a process otherwise illustrated in FIG. 8 wherein the stripper process gas is preferably compressed before introduction into the cooler/condenser, can as readily be implemented in the process otherwise illustrated in FIG. 9 where the steam generated in the cooler/condenser is preferably compressed before being directed to an absorption liquor stripper. Parameters of operation are the same as in FIG. 13 so far as cooling the rich liquor absorber is concerned, and the same as in FIG. 9 so far as steam compression and introduction of steam into the stripper are concerned.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description shall be interpreted as illustrative and not in a limiting sense.

What is claimed is:

1. A process for removing a contaminant gas from source gas and recovering the contaminant gas, the process comprising:
    contacting a feed gas stream comprising the source gas in a rich gas absorber with a rich gas aqueous absorption medium comprising a sorbent for a contaminant gas, thereby absorbing contaminant gas from the feed gas stream into the absorption medium and producing a lean gas from which contaminant gas has been removed and a rich absorption liquor containing sorbed contaminant;
    contacting the lean gas exiting said rich gas absorber in a lean gas absorber with a lean gas aqueous absorption medium comprising a sorbent for the contaminant gas, thereby absorbing residual contaminant gas from the lean gas into the lean gas absorption medium and producing an exhaust gas from which additional contaminant gas has been removed and a lean absorption liquor containing sorbed contaminant;
    heating said rich absorption liquor in a rich liquor stripper to desorb said contaminant from said rich liquor and thereby produce a regenerated rich gas absorption medium and a rich liquor stripper gas effluent from said rich liquor stripper, said rich liquor stripper gas comprising water vapor and contaminant gas;
    heating said lean absorption liquor in a lean liquor stripper to desorb contaminant gas from said lean liquor and thereby produce a regenerated lean gas absorption medium and a lean liquor stripper gas effluent from said lean liquor stripper, said lean liquor stripper gas comprising water vapor and said contaminant gas; and
    recirculating said regenerated rich gas absorption medium to said rich gas absorber for removal of contaminant gas from further flow of said feed gas and said regenerated lean gas absorption medium to said lean gas absorber for removal of contaminant gas from further flow of lean gas.

2. A process as set forth in claim 1 wherein heating said rich absorption liquor in said rich liquor stripper comprises contacting the rich absorption liquor with stripping steam.

3. A process as set forth in claim 1 wherein heating said lean absorption liquor in said lean liquor stripper comprises contacting said lean absorption liquor in said lean liquor stripper with stripping steam.

4. A process as set forth in claim 1 wherein contaminant gas removed from said feed gas in said rich gas absorber represents at least 85% of the sum of the contaminant gas removed in the rich and lean gas absorbers.

5. A process as set forth in claim 4 wherein contaminant gas removed from said feed gas in said rich gas absorber represents at least 85% of the contaminant gas contained in said feed gas.

6. A process as set forth in claim 1 wherein the contaminant gas content of the lean gas exiting the rich gas absorber is no greater than about 0.5% by volume.

7. A process as set forth in claim 1 wherein the relative flow rates of said rich gas absorption medium and said feed gas are such that the stoichiometric ratio of the rate at which sorbent is introduced into the rich gas absorber to rate at which contaminant gas is introduced into the rich gas absorber is not greater than about 0.6.

8. A process as set forth in claim 7 wherein the stoichiometric ratio of rate of introduction of sorbent into the rich gas absorber to the rate at which contaminant gas is introduced into the rich gas absorber is between 0.3 and 0.5.

9. A process as set forth in claim 1 wherein the mass ratio L/G in said rich gas absorber is between 0.1 and 50.

10. A process as set forth in claim 1 wherein the contaminant gas is selected from the group consisting of $SO_2$, $CO_2$, $NO_x$, $H_2S$, HCl and ammonia.

11. A process as set forth in claim 1 wherein said contaminant gas comprises an acid gas.

12. A process as set forth in claim 1 wherein said contaminant gas comprises sulfur dioxide.

13. A process as set forth in claim 12 wherein the sulfur dioxide content of said regenerated rich gas absorption medium exiting said rich liquor stripper is between 0.8 and 15 wt. %.

14. A process as set forth in claim 12 wherein the mass ratio of steam to rich liquor introduced into said rich liquor stripper is between 0.01 and 0.15.

15. A process as set forth in claim 12 wherein the mass ratio of steam introduced into said rich liquor stripper to the sulfur dioxide flow into said rich gas absorber is between about 0.2 and about 8.

16. A process as set forth in claim 12 wherein the sulfur dioxide content of the rich stripper gas effluent from the rich liquor stripper is at least about 15% by volume.

17. A process as set forth in claim 12 wherein the sulfur dioxide content of the rich stripper gas from the rich liquor stripper is between about 10% and about 60% by volume.

18. A process as set forth in claim 12 wherein the residual sulfur dioxide content of the regenerated rich gas absorption medium is at least about 0.3 wt. %.

19. A process as set forth in claim 12 wherein the sulfur dioxide content of the feed gas is between about 1000 ppm and about 4000 ppm, the sulfur dioxide content of the rich stripper gas effluent from said rich liquor stripper is between about 25% and about 40% by vol. and the residual sulfur dioxide content of the regenerated rich gas absorption medium is between about 0.5 wt. % and about 2 wt. %.

20. A process as set forth in claim 12 wherein the feed gas contains between about 4 vol. % and about 40 vol. % sulfur dioxide, the sulfur dioxide content of the rich stripper gas effluent from said rich liquor stripper is between about 40% and about 60% by vol., and the sulfur dioxide content of said regenerated rich gas absorption medium is between about 1.5 and about 8 wt. %.

21. A process as set forth in claim 12 wherein the sulfur dioxide content of said regenerated lean gas absorption medium is not greater than about 1 wt.

22. A process as set forth in claim 12 wherein the stoichiometric ratio of the rate at which sorbent is introduced into the lean gas absorber to rate at which sulfur dioxide is introduced into the lean gas absorber is between about 1 and about 6.

23. A process as set forth in claim 22 wherein the stoichiometric ratio of rate of introduction of sorbent into the lean gas absorber to the rate at which sulfur dioxide is introduced into the rich gas absorber is not more than about 0.8.

24. A process as set forth in claim 12 wherein the mass ratio L/G in said lean gas absorber is not more than about 0.8.

25. A process as set forth in claim 12 wherein the ratio of steam introduced into said lean liquor stripper to sulfur dioxide introduced into said lean gas absorber is between 8 and 20 lbs. steam per lb. $SO_2$.

26. A process as set forth in claim 12 wherein the sulfur dioxide content of the gas effluent from the lean liquor stripper is between 0.1 and 1.0% by volume.

27. A process as set forth in claim 12 wherein the net total steam demand for stripping SO2 from the rich liquor, lean liquor and stripper process gas condensate, and for compression of stripper process gas and/or steam generated from stripper condensate, is between about 5 and about 15 lbs./per lb. SO2 at an SO2 level of 1000 to 2000 ppm in the feed gas to the rich gas absorber, between about 3 and about 10 lbs/lb. SO2 at an SO2 level of 2000 ppm to 2 vol. % in the feed gas, between about 2 and about 3 lbs./lb. SO2 at an SO2 level of 2 vol. % to 4 vol. % in the feed gas, and between about 0.5 and about 2.5 lbs/lb. SO2 at an SO2 level greater than 4 vol. % in the feed gas.

28. A process as set forth in claim 12 wherein the overall steam demand of the process is generally not more than 15 lbs/lb. SO2 in the feed gas at an SO2 level of 1000 to 2000 ppm in the feed gas to the rich gas absorber, not more than 8 lbs/lb. SO2 at an SO2 level of 2000 ppm to 2 vol. % in the gas, not more than 4 lbs./lb. SO2 at an SO2 level of 2 to 4 vol. % in the gas, and not more than 3 lbs/lb. SO2 at an SO2 level greater than 4 vol. %.

29. A process as set forth in claim 12 wherein the sulfur dioxide content of the lean absorption liquor is not greater than about 10 wt.

30. A process as set forth in claim 12 wherein the ratio of the net steam to the lean liquor stripper to the $SO_2$ entering the rich gas absorber is between about 0.2 and about 5 lbs./lb.

31. A process as set forth in claim 1 wherein the ratio of steam entering the rich liquor stripper to $SO_2$ entering the rich gas absorber is between about 4 and about 15 or between about 5 and about 10 lbs./lb. $SO_2$ at an $SO_2$ level of 1000 to 2000 ppm in the feed gas to the rich gas absorber, between about 1.5 and about 8 lbs steam/lb. $SO_2$ at an $SO_2$ level of 2000 ppm to 2 vol. % in the feed gas, between about 1 and about 4 lbs. steam/lb. $SO_2$ at an $SO_2$ level of 2 vol. % to 4 vol. % in the feed gas, and between about 1 and about 3 lbs steam/lb. $SO_2$ at an $SO_2$ level greater than 4 vol. % in the feed gas.

32. A process as set forth in claim 1 wherein exhaust gas effluent from the lean absorption liquor stripper is directed to the rich absorption liquor stripper as a source of stripping steam.

33. A process as set forth in claim 1 further comprising:
condensing water from a stripper process gas comprising said rich stripper gas, said lean stripper gas or a combination thereof by indirect transfer of heat from the stripper process gas to a cooling medium in a process stripper gas cooler/condenser to thereby produce a contaminant-bearing condensate;
contacting the contaminant-bearing condensate exiting said stripper process gas cooler/condenser with steam in a condensate stripper to produce a stripped condensate and a condensate stripper gas effluent containing water vapor and contaminant;
wherein the cooling medium to which heat is transferred from the primary stripper gas effluent in said stripper process gas cooler/condenser comprises at least a portion of the stripped condensate, thereby generating steam from the stripped condensate; and introducing steam generated in said stripper process gas cooler/condenser into said rich liquor stripper, said lean liquor stream or to both said rich liquor stripper and said lean liquor stripper as stripping steam for contact with contaminant-bearing absorption liquor to desorb contaminant therefrom.

34. A process as set forth in any claim 33 wherein steam is generated from said stripped condensate at a pressure in excess of the pressure at the absorption medium outlet from an absorption liquor stripper into which the steam is introduced.

35. A process as set forth in claim 33 further comprising circulation of the liquid phase from said lean absorption liquor stripper through a reboiler wherein it is heated with steam from an extraneous source.

36. A process as set forth in claim 33 wherein:
a stripper process gas selected from the group consisting of rich stripper gas effluent, lean stripper gas effluent, and combinations thereof is compressed to a pressure higher than the pressure prevailing within the lean liquor stripper at the liquid outlet thereof;
water is condensed from said stripper process gas in a stripper process gas cooler;
the contaminant bearing condensate exiting said stripper process gas cooler is contacted with steam in a condensate stripper to provide a stripped condensate and a condensate stripper gas effluent that contains said contaminant gas;
heat is transferred from said stripper process gas to said stripped condensate in said stripper process gas cooler, thereby generating steam from said stripped condensate;
steam generated by heating said stripped condensate in said stripper process gas cooler is directed into said rich liquor stripper and/or said lean liquor stripper for contact with the absorption liquor and stripping of contaminant gas therefrom.

37. A process as set forth in claim 36 wherein compression of said stripper process gas increases its pressure by between 5 and 25 psi.

38. A process as set forth in claim 36 wherein stripper process gas is compressed by passage through a steam jet ejector and the compressed stripper process gas is introduced into said stripper process gas cooler.

39. A process as set forth in claim 36 wherein the log mean temperature differential ($\Delta t_m$) in said stripper process gas cooler/condenser is no greater than 10° C. and not less than 3° C.

40. A process as set forth in claim 36 wherein said condensate stripper gas is passed through a contaminant gas trim condenser for condensation of water vapor contained therein.

41. A process as set forth in claim 36 wherein the aqueous effluent from said condensate stripper is divided to provide: (i) a condensate stream directed to said stripper process gas cooler as a cooling fluid for condensing water from said stripper process gas, and to be converted at least in part to steam for introduction to said absorption liquor stripper: and (ii) a discharge water stream for removal of water from the process.

42. A process as set forth in claim 41 wherein the discharge stream is contacted with said feed gas in a saturator upstream of said rich gas absorber with respect to feed gas flow, thereby increasing the humidity of the source gas entering the rich gas absorber.

43. A process as set forth in claim 42 wherein the water stream exiting the saturator is removed from the process.

44. A process as set forth in claim 36 wherein the contaminant gas content of said stripper process gas is at least about 15% by volume.

45. A process as set forth in claim 36 wherein the contaminant gas content of said stripper process gas is between about 10% and about 60% by volume.

46. A process as set forth in claim 1 wherein said regenerated rich gas absorption medium is passed through a rich absorption liquor preheater in the course of recirculation from said rich absorption liquor stripper to said rich gas absorber, said rich absorption liquor is passed through said preheater in the course of transfer from said rich gas absorber to said rich liquor stripper, and heat is transferred from said regenerated rich gas absorption medium to said rich liquor within said preheater.

47. A process as set forth in claim 1 wherein said exhaust gas exiting said lean gas absorber is passed through a contaminant gas trim cooler wherein heat is transferred from a final effluent stripper gas stream to said exhaust gas, said final effluent stripper gas comprising a stream combining said condensate stripper gas and the vent gas from said stripper process gas cooler.

48. A process as set forth in claim 47 wherein said contaminant gas trim cooler is upstream of said trim condenser with respect to the flow of said final effluent stripper gas stream.

49. A process as set forth in claim 1 wherein sorption of said contaminant gas comprises an acid/base reaction between the contaminant gas and the sorbent, the pH of the absorption medium within the rich gas absorber being adjusted to a value differing from the pH which affords the most favorable equilibrium for absorption but at which steam consumption in the rich liquor stripper for reducing the contaminant gas content of the regenerated rich gas absorption medium to a target level is lower than the steam consumption for reducing the contaminant gas content of the regenerated rich gas absorption medium to such level in a comparative operation conducted under conditions essentially identical to the conditions under which said process is conducted except that in said comparative operation the pH of the absorption medium is maintained at a value which affords the most favorable equilibrium for absorption.

50. A process as set forth in claim 49 wherein the value to which the pH is adjusted is maintained in the absorption medium in a region from which said rich gas absorption medium exits the absorber.

51. A process as set forth in claim 49 wherein contaminant gas is removed from the lean gas in the lean gas absorber to yield an exhaust gas having a contaminant gas content meeting a defined emission limit.

52. A process as set forth in claim 49 wherein said contaminant comprises an acid gas and the pH of the absorption medium within the rich gas absorber is adjusted to a value lower than the pH that affords the most favorable equilibrium for absorption.

53. A process as set forth in claim 49 wherein the gas stream flows countercurrently to the rich gas absorption medium stream in the rich gas absorber, and the pH of the absorption medium at the base of the rich gas absorber is adjusted to a value differing from the pH that affords the most favorable equilibrium for absorption.

54. A process as set forth in claim 53 wherein the contaminant gas comprises sulfur dioxide, the sorbent comprises a malate salt, and the pH of the rich gas absorption liquor exiting of the rich gas absorber or the pH of regenerated rich gas absorption medium exiting the rich liquor stripper is maintained at a value between 3.4 and 4.2.

55. A process as set forth in claim 54 wherein the between the pH of the regenerated lean gas absorption medium is between about 0.5 and about 1.0 pH unit higher than the pH of the regenerated rich gas absorption medium, or the pH of the lean absorption liquor is between about 0.5 and about 1.0 pH unit higher than the pH of the rich absorption liquor.

56. A process as set forth in claim 53 wherein the steam consumption in the rich liquor stripper is not greater than 7.5 lbs. per lb. $SO_2$ removed from the liquid phase in the rich liquor stripper.

57. A process as set forth in claim 49 wherein the contaminant gas content of the gas exiting the absorber is not significantly higher than the contaminant gas content of the gas exiting the absorber in said comparative operation.

58. A process as set forth in claim 57 wherein the contaminant gas content of the gas exiting the absorber is no greater than the contaminant gas content of the gas exiting the absorber in said comparative operation.

59. A process as set forth in claim 1 wherein said contaminant gas comprises $H_2S$ and the sorbent comprises an amine.

60. A process as set forth in claim 1 wherein the pH of the rich gas absorption medium is regulated by addition of acid or base to the regenerated rich gas absorption medium returning to the rich gas absorber.

61. A process as set for in claim 60 wherein adjusting the pH of the absorption medium in the rich gas absorber comprises reducing the rate of addition of acid or base to the regenerated rich gas absorption medium in regulating the pH thereof.

\* \* \* \* \*